US007539551B2

(12) United States Patent
Komura et al.

(10) Patent No.: US 7,539,551 B2
(45) Date of Patent: May 26, 2009

(54) PORTABLE TERMINAL UNIT AND SOUND REPRODUCING SYSTEM USING AT LEAST ONE PORTABLE TERMINAL UNIT

(75) Inventors: Tatsumi Komura, Tokyo (JP); Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 623 days.

(21) Appl. No.: 10/202,318

(22) Filed: Jul. 24, 2002

(65) Prior Publication Data

US 2003/0023331 A1 Jan. 30, 2003

(30) Foreign Application Priority Data

Jul. 27, 2001 (JP) ............................. 2001-226882

(51) Int. Cl.
*G06F 17/00* (2006.01)
*H04H 40/00* (2008.01)

(52) U.S. Cl. ....................................... 700/94; 455/3.06

(58) Field of Classification Search .................. 700/94; 369/12, 11, 1, 2, 3–10; 455/3.06, 41.3; 381/300, 381/306, 307
See application file for complete search history.

(56) References Cited

U.S. PATENT DOCUMENTS 5,930,370 A 7/1999 Ruzicka
6,125,115 A * 9/2000 Smits ......................... 370/389
6,332,175 B1 * 12/2001 Birrell et al. ................ 711/112
6,453,160 B1 * 9/2002 Thomas et al. .............. 455/419
6,466,832 B1 * 10/2002 Zuqert et al. .................. 700/94
6,650,871 B1 * 11/2003 Cannon et al. ............. 455/41.2
6,941,246 B2 * 9/2005 Raykar et al. ............... 702/186
6,950,668 B2 * 9/2005 Brassil et al. ............... 455/517
7,142,807 B2 * 11/2006 Lee ........................... 455/3.01
2002/0072816 A1 * 6/2002 Shdema et al. ................ 700/94
2002/0187776 A1 * 12/2002 Brassil et al. ............... 455/417
2005/0141367 A1 * 6/2005 Morohashi ............... 369/47.12
2006/0270395 A1 * 11/2006 Dhawan et al. ............. 455/418

FOREIGN PATENT DOCUMENTS

JP 5-122789 5/1993
JP 7-312797 11/1995
JP 2000-49722 2/2000
JP 2000-78301 3/2000

OTHER PUBLICATIONS

Dictionary.com definition of loudspeaker.*

* cited by examiner

*Primary Examiner*—Sinh Tran
*Assistant Examiner*—Andrew C Flanders
(74) *Attorney, Agent, or Firm*—Scully, Scott, Murphy & Presser, P.C.

(57) ABSTRACT

A sound reproducing system including at least one portable terminal unit which acquires data including sound data. For example, the data may be multimedia data and is acquired from data delivery service and the like. Each of the at least one portable terminal unit comprises: a loudspeaker for reproducing sound from the sound data; and a sound data reproducing portion which makes the loudspeaker reproduce the sound based on the sound data and in cooperation with at least one sound devices. The sound devices may be other portable terminal units. By using a plurality of portable terminal units, it becomes possible to reproduce stereophonic sound, surround sound, and the like. It is also possible to reproduce image together with such sound.

28 Claims, 33 Drawing Sheets

FIG. 3A MULTIMEDIA DATA INCLUDING SOUND DATA, PROVIDED FROM DELIVERY SERVICE, ETC.

| | | | | | | | | | | | | | | | | | | | |
|---|---|---|---|---|---|---|---|---|---|---|---|---|---|---|---|---|---|---|---|
| ··· | FL | FR | RL | RR | L | R | LOW | HIGH | IMAGE | FL | FR | RL | RR | L | R | LOW | HIGH | IMAGE | ··· |

FIG. 3B RECEIVED/REPRODUCED DATA OF PORTABLE TERMINAL UNIT 1a

| | | | | | |
|---|---|---|---|---|---|
| ··· | (F)L | IMAGE | (F)L | IMAGE | ··· |

FIG. 3C RECEIVED/REPRODUCED DATA OF PORTABLE TERMINAL UNIT 1b

| | | | | | |
|---|---|---|---|---|---|
| ··· | (F)R | IMAGE | (F)R | IMAGE | ··· |

FIG. 3D RECEIVED/REPRODUCED DATA OF PORTABLE TERMINAL UNIT 1c

| | | | | | |
|---|---|---|---|---|---|
| ··· | RL | IMAGE | RL | IMAGE | ··· |

FIG. 3E RECEIVED/REPRODUCED DATA OF PORTABLE TERMINAL UNIT 1d

| | | | | | |
|---|---|---|---|---|---|
| ··· | RR | IMAGE | RR | IMAGE | ··· |

FIG. 3F RECEIVED/REPRODUCED DATA OF PORTABLE TERMINAL UNIT 1e

| | | | | | |
|---|---|---|---|---|---|
| ··· | LOW | IMAGE | LOW | IMAGE | ··· |

RECEIVED/REPRODUCED DATA
OF TELEVISION SET 120

| | | | | | |
|---|---|---|---|---|---|
| . . . | TV-OUT | IMAGE | TV-OUT | IMAGE | . . . |

FIG. 10A MULTIMEDIA DATA INCLUDING SOUND DATA, PROVIDED FROM DELIVERY SERVICE, ETC.

| | | | | | | | | | | | | | | | | | | | |
|---|---|---|---|---|---|---|---|---|---|---|---|---|---|---|---|---|---|---|---|
| ... | FL | FR | RL | RR | L | R | LOW | HIGH | IMAGE | FL | FR | RL | RR | L | R | LOW | HIGH | IMAGE | ... |

FIG. 10B RECEIVED DATA OF PORTABLE TERMINAL UNIT 1a

| | | | | | | | | | | | | | |
|---|---|---|---|---|---|---|---|---|---|---|---|---|---|
| ... | (F)L | (F)R | RL | RR | LOW | IMAGE | (F)L | (F)R | RL | RR | IMAGE | LOW | ... |

FIG. 10C DIVIDED REPRODUCTION DATA OF PORTABLE TERMINAL UNIT 1a

| | | | | | |
|---|---|---|---|---|---|
| ... | (F)L | IMAGE | (F)L | IMAGE | ... |

FIG. 10D DIVIDED TRANSFER DATA FROM PORTABLE TERMINAL UNIT 1a TO PORTABLE TERMINAL UNIT 1b

| | | | | | | | | | | | |
|---|---|---|---|---|---|---|---|---|---|---|---|
| ... | (F)R | RL | RR | LOW | IMAGE | (F)R | RL | RR | LOW | IMAGE | ... |

FIG. 10E DIVIDED REPRODUCTION DATA OF PORTABLE TERMINAL UNIT 1b

| | | | | | |
|---|---|---|---|---|---|
| ... | (F)R | IMAGE | (F)R | IMAGE | ... |

FIG. 10F DIVIDED TRANSFER DATA FROM PORTABLE TERMINAL UNIT 1b TO PORTABLE TERMINAL UNIT 1d

| | | | | | | | | | |
|---|---|---|---|---|---|---|---|---|---|
| ... | RL | RR | LOW | IMAGE | RL | RR | LOW | IMAGE | ... |

FIG. 10G DIVIDED REPRODUCTION DATA OF PORTABLE TERMINAL UNIT 1d

| | | | | | |
|---|---|---|---|---|---|
| ... | RR | IMAGE | RR | IMAGE | ... |

FIG. 10H DIVIDED TRANSFER DATA FROM PORTABLE TERMINAL UNIT 1d TO PORTABLE TERMINAL UNIT 1c

| | | | | | | | |
|---|---|---|---|---|---|---|---|
| ... | RL | LOW | IMAGE | RL | LOW | IMAGE | ... |

FIG. 10I DIVIDED REPRODUCTION DATA OF PORTABLE TERMINAL UNIT 1c

| | | | | | |
|---|---|---|---|---|---|
| ... | RL | IMAGE | RL | IMAGE | ... |

FIG. 10J DIVIDED TRANSFER DATA FROM PORTABLE TERMINAL UNIT 1c TO PORTABLE TERMINAL UNIT 1e (REPRODUCTION DATA OF PORTABLE TERMINAL UNIT 1e)

| | | | | | |
|---|---|---|---|---|---|
| ... | LOW | IMAGE | LOW | IMAGE | ... |

Figures 11A, 11B, 11C, 11D, 11E, 11F, 11G, 11H, 11I:
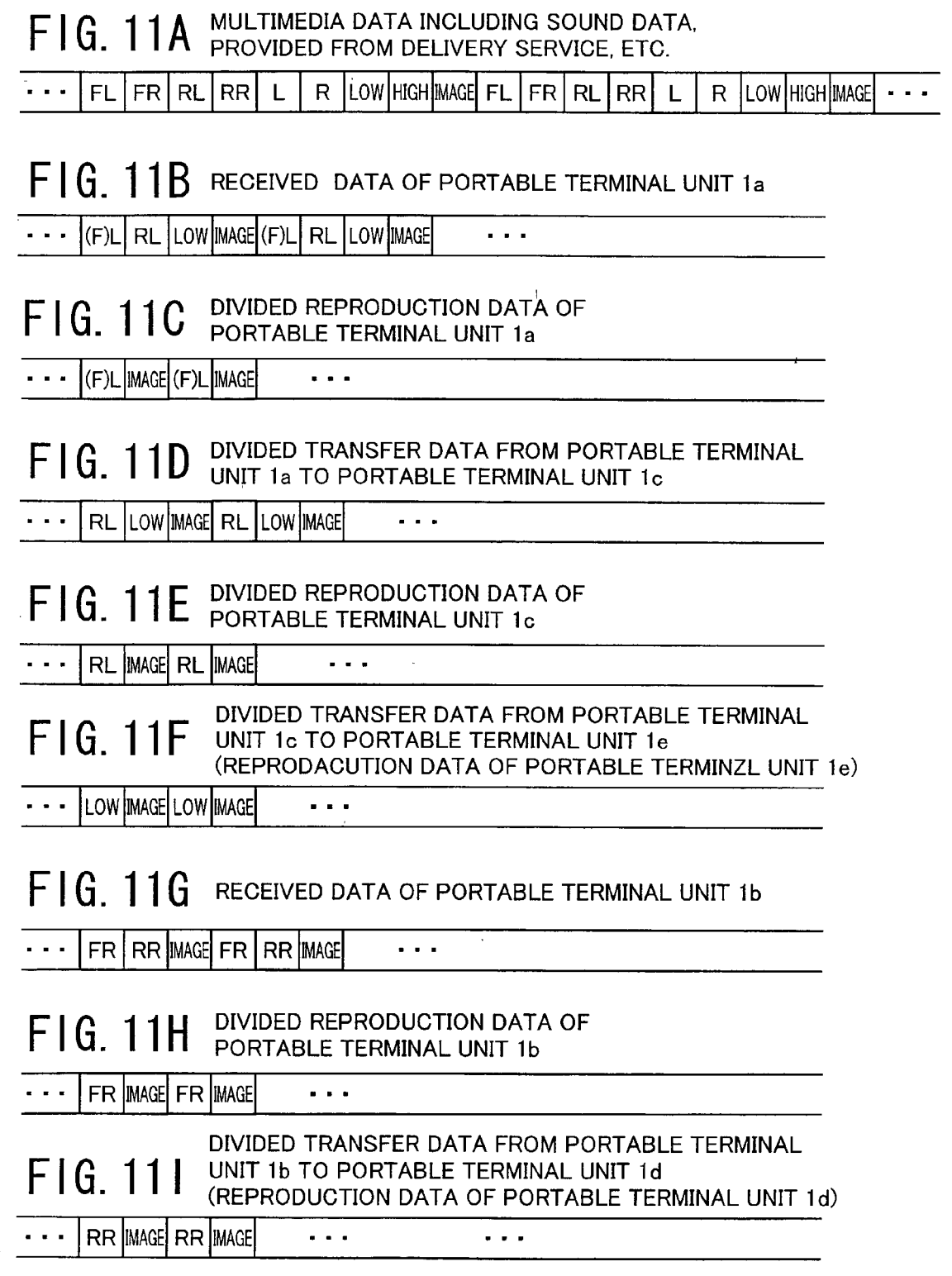

FIG. 11A MULTIMEDIA DATA INCLUDING SOUND DATA, PROVIDED FROM DELIVERY SERVICE, ETC.

| | | | | | | | | | | | | | | | | | | | |
|---|---|---|---|---|---|---|---|---|---|---|---|---|---|---|---|---|---|---|---|
| ・・・ | FL | FR | RL | RR | L | R | LOW | HIGH | IMAGE | FL | FR | RL | RR | L | R | LOW | HIGH | IMAGE | ・・・ |

FIG. 11B RECEIVED DATA OF PORTABLE TERMINAL UNIT 1a

| | | | | | | | | | |
|---|---|---|---|---|---|---|---|---|---|
| ・・・ | (F)L | RL | LOW | IMAGE | (F)L | RL | LOW | IMAGE | ・・・ |

FIG. 11C DIVIDED REPRODUCTION DATA OF PORTABLE TERMINAL UNIT 1a

| | | | | | |
|---|---|---|---|---|---|
| ・・・ | (F)L | IMAGE | (F)L | IMAGE | ・・・ |

FIG. 11D DIVIDED TRANSFER DATA FROM PORTABLE TERMINAL UNIT 1a TO PORTABLE TERMINAL UNIT 1c

| | | | | | | | |
|---|---|---|---|---|---|---|---|
| ・・・ | RL | LOW | IMAGE | RL | LOW | IMAGE | ・・・ |

FIG. 11E DIVIDED REPRODUCTION DATA OF PORTABLE TERMINAL UNIT 1c

| | | | | | |
|---|---|---|---|---|---|
| ・・・ | RL | IMAGE | RL | IMAGE | ・・・ |

FIG. 11F DIVIDED TRANSFER DATA FROM PORTABLE TERMINAL UNIT 1c TO PORTABLE TERMINAL UNIT 1e (REPRODACUTION DATA OF PORTABLE TERMINZL UNIT 1e)

| | | | | | |
|---|---|---|---|---|---|
| ・・・ | LOW | IMAGE | LOW | IMAGE | ・・・ |

FIG. 11G RECEIVED DATA OF PORTABLE TERMINAL UNIT 1b

| | | | | | | | |
|---|---|---|---|---|---|---|---|
| ・・・ | FR | RR | IMAGE | FR | RR | IMAGE | ・・・ |

FIG. 11H DIVIDED REPRODUCTION DATA OF PORTABLE TERMINAL UNIT 1b

| | | | | | |
|---|---|---|---|---|---|
| ・・・ | FR | IMAGE | FR | IMAGE | ・・・ |

FIG. 11I DIVIDED TRANSFER DATA FROM PORTABLE TERMINAL UNIT 1b TO PORTABLE TERMINAL UNIT 1d (REPRODUCTION DATA OF PORTABLE TERMINAL UNIT 1d)

| | | | | | | |
|---|---|---|---|---|---|---|
| ・・・ | RR | IMAGE | RR | IMAGE | ・・・ | ・・・ |

FIG. 18
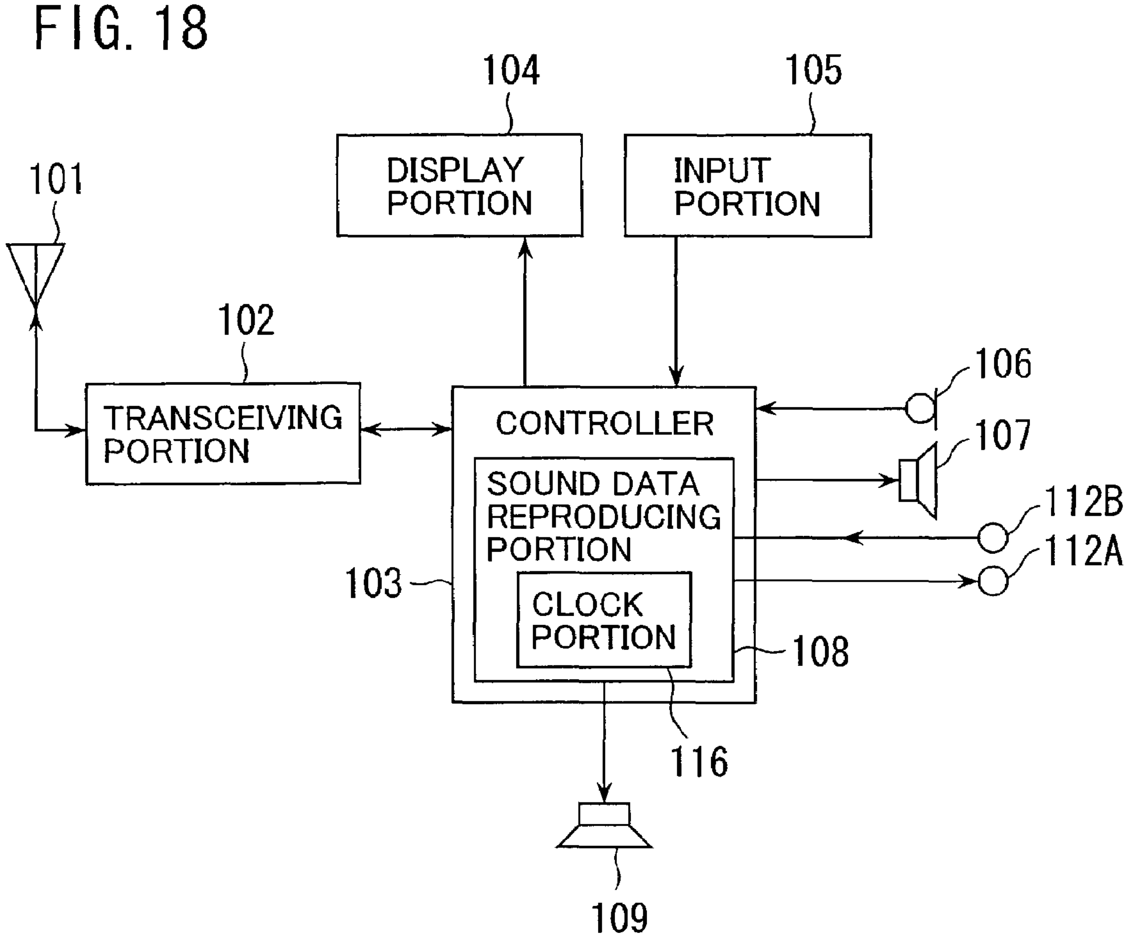
FIG. 19A
FIG. 19B
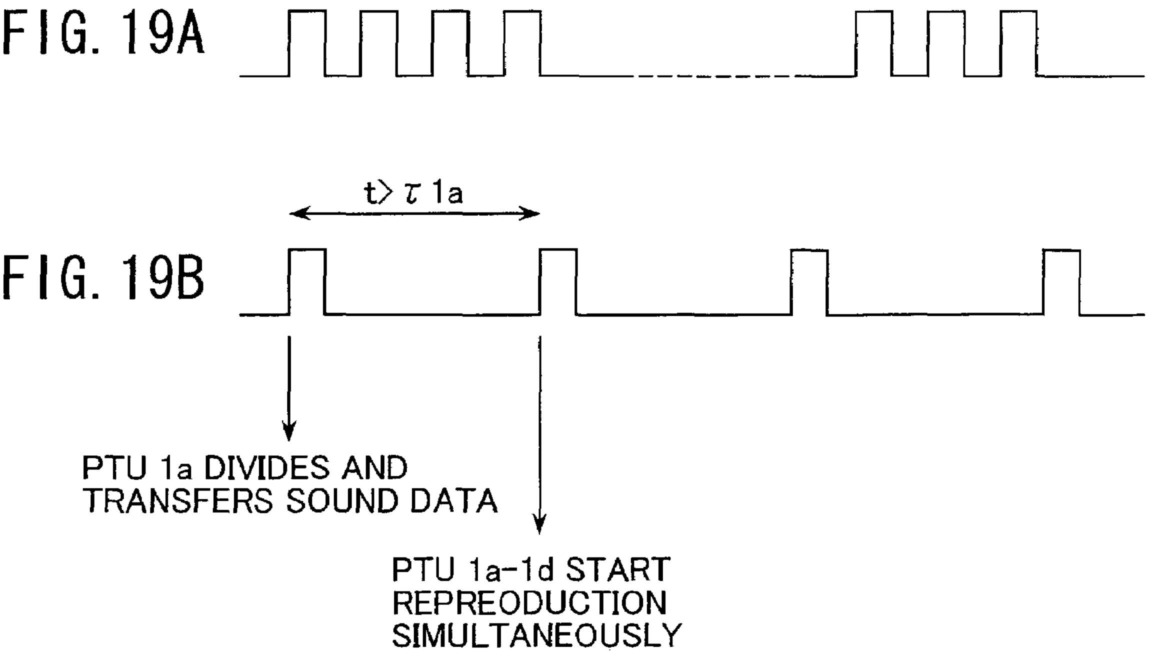

Figures 22A, 22B, 22C, 22D, 22E, 22F, 22G, 22H:
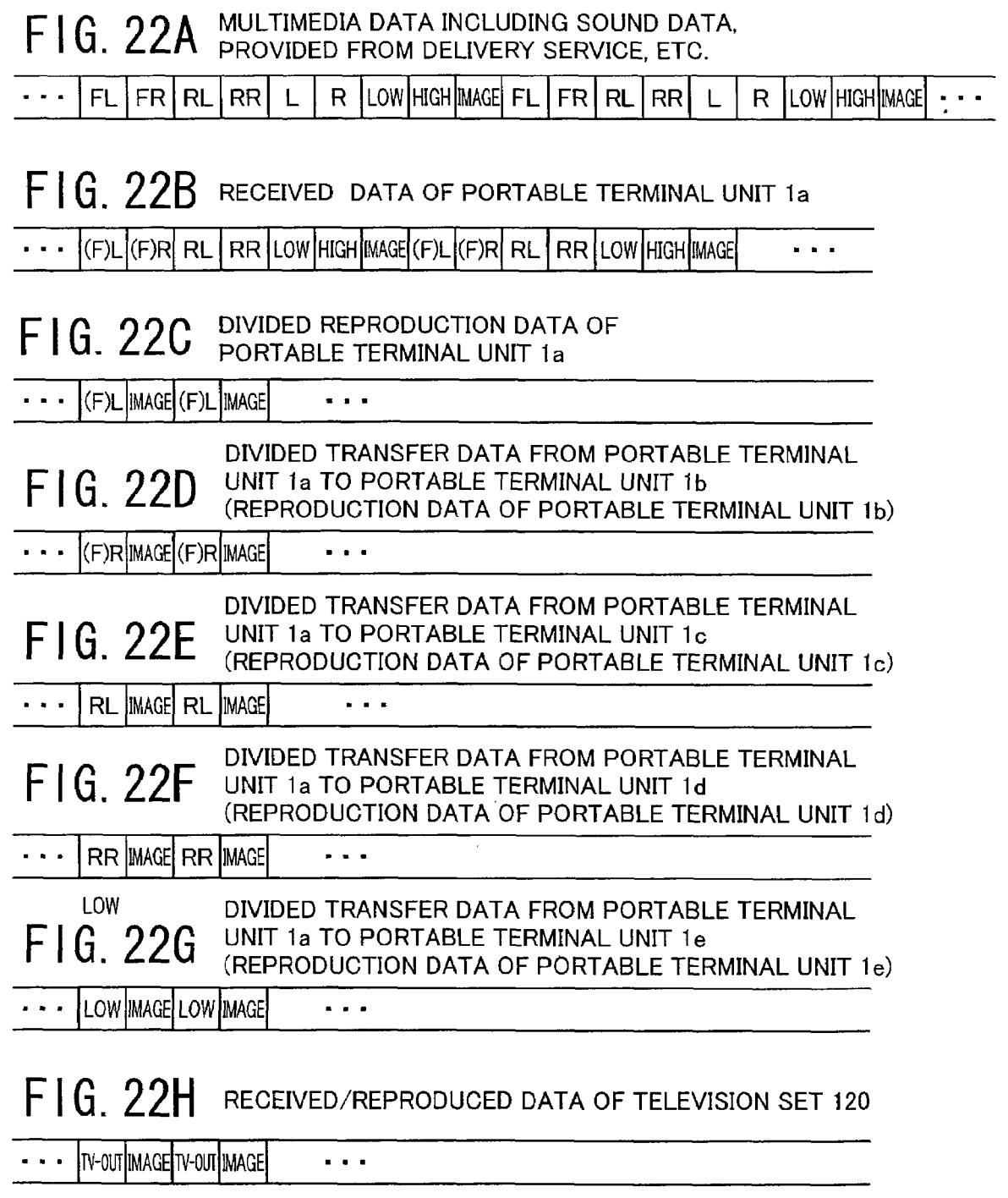

FIG. 22A MULTIMEDIA DATA INCLUDING SOUND DATA, PROVIDED FROM DELIVERY SERVICE, ETC.

| | | | | | | | | | | | | | | | | | | | |
|---|---|---|---|---|---|---|---|---|---|---|---|---|---|---|---|---|---|---|---|
| ... | FL | FR | RL | RR | L | R | LOW | HIGH | IMAGE | FL | FR | RL | RR | L | R | LOW | HIGH | IMAGE | ... |

FIG. 22B RECEIVED DATA OF PORTABLE TERMINAL UNIT 1a

| | | | | | | | | | | | | | | | |
|---|---|---|---|---|---|---|---|---|---|---|---|---|---|---|---|
| ... | (F)L | (F)R | RL | RR | LOW | HIGH | IMAGE | (F)L | (F)R | RL | RR | LOW | HIGH | IMAGE | ... |

FIG. 22C DIVIDED REPRODUCTION DATA OF PORTABLE TERMINAL UNIT 1a

| | | | | | |
|---|---|---|---|---|---|
| ... | (F)L | IMAGE | (F)L | IMAGE | ... |

FIG. 22D DIVIDED TRANSFER DATA FROM PORTABLE TERMINAL UNIT 1a TO PORTABLE TERMINAL UNIT 1b (REPRODUCTION DATA OF PORTABLE TERMINAL UNIT 1b)

| | | | | | |
|---|---|---|---|---|---|
| ... | (F)R | IMAGE | (F)R | IMAGE | ... |

FIG. 22E DIVIDED TRANSFER DATA FROM PORTABLE TERMINAL UNIT 1a TO PORTABLE TERMINAL UNIT 1c (REPRODUCTION DATA OF PORTABLE TERMINAL UNIT 1c)

| | | | | | |
|---|---|---|---|---|---|
| ... | RL | IMAGE | RL | IMAGE | ... |

FIG. 22F DIVIDED TRANSFER DATA FROM PORTABLE TERMINAL UNIT 1a TO PORTABLE TERMINAL UNIT 1d (REPRODUCTION DATA OF PORTABLE TERMINAL UNIT 1d)

| | | | | | |
|---|---|---|---|---|---|
| ... | RR | IMAGE | RR | IMAGE | ... |

LOW

FIG. 22G DIVIDED TRANSFER DATA FROM PORTABLE TERMINAL UNIT 1a TO PORTABLE TERMINAL UNIT 1e (REPRODUCTION DATA OF PORTABLE TERMINAL UNIT 1e)

| | | | | | |
|---|---|---|---|---|---|
| ... | LOW | IMAGE | LOW | IMAGE | ... |

FIG. 22H RECEIVED/REPRODUCED DATA OF TELEVISION SET 120

| | | | | | |
|---|---|---|---|---|---|
| ... | TV-OUT | IMAGE | TV-OUT | IMAGE | ... |

PORTABLE TERMINAL UNIT AND SOUND REPRODUCING SYSTEM USING AT LEAST ONE PORTABLE TERMINAL UNIT

FIELD OF THE INVENTION

The present invention relates generally to a portable terminal unit including a radio telephone such as a portable telephone, a personal handy phone system (PHS), a cordless telephone, a child unit of a party line, a personal digital assistants (PDA) and the like. More particularly, the present invention relates to a sound reproducing system and method of a portable terminal unit in which portable terminal units are mutually and organically coupled, or portable terminal unit or units are organically coupled with other audio system to realize high quality sound reproduction.

BACKGROUND OF THE INVENTION

Recently, portable terminal units such as portable telephones and the like become remarkably popular, and are carried by many people when they go outside.

Also, the portable terminal unit has become capable of providing multimedia services. Because of an increase in memory capacity, incorporation of storage media, an increase in a communication speed and the like, the portable terminal unit can handle a large capacity data such as image, music and the like.

In each of Japanese patent laid-open publication No. 2000-49722 and Japanese patent laid-open publication No. 2000-78301, there is disclosed a stereophonic reproducing technology in which headphones are used with a portable terminal unit.

However, in the above-mentioned conventional technologies, there is a problem that only a person who wears the headphones can listen to stereophonic music, surround sound and the like, but other surrounding persons can not listen thereto.

In order for the persons other than the person wearing the headphones to be able to listen to stereophonic music, surround sound and the like, it is necessary that a single portable terminal unit has a plurality of speakers for propagating sound into space. However, since the portable terminal unit usually has a small size, there occurs another problem that crosstalk becomes large and it is difficult to obtain sufficient stereophonic effect.

Further, there occurs still another problem that, in order to listen to the sound such as the surround sound and the like, it is necessary to connect other speakers to the portable terminal unit.

SUMMARY OF THE INVENTION

Therefore, it is an object of the present invention to provide a sound reproducing system and method of portable terminal units in which stereophonic sound, surround sound, home theater sound and the like can be conveniently and comfortably reproduced by using a simple structure.

It is another object of the present invention to provide a sound reproducing system and method of portable terminal units in which a plurality of persons can listen to stereophonic sound, surround sound, home theater sound and the like conveniently and comfortably by using a simple structure.

It is still another object of the present invention to provide a sound reproducing system and method of portable terminal units in which good stereophonic effect can be realized by using a simple structure.

It is still another object of the present invention to obviate the disadvantages of the conventional sound reproducing system and method.

According to an aspect of the present invention, there is provided a portable terminal unit which acquires data including sound data, the portable terminal unit comprising: a loudspeaker for reproducing sound from the sound data; a sound data reproducing portion which makes the loudspeaker reproduce the sound based on the sound data and in cooperation with at least one sound device.

In this case, it is preferable that the sound data is included in multimedia data.

It is also preferable that at least one of the sound devices is a portable terminal unit.

It is further preferable that the portable terminal unit has a display for displaying an image based on acquired image data.

It is advantageous that at least one of the sound devices has a display for displaying an image.

According to another aspect of the present invention, there is provided a sound reproducing system including at least one portable terminal unit which acquires data including sound data, wherein each of the at least one portable terminal unit comprises: a loudspeaker for reproducing sound from the sound data; a sound data reproducing portion which makes the loudspeaker reproduce the sound based on the sound data and in cooperation with at least one sound device.

By using this structure, it becomes possible to easily and comfortably reproduce stereophonic sound, surround sound, and also home theater sound.

In this case, it is preferable that the sound data is included in multimedia data. Thereby, it becomes possible to utilize the multimedia data, and to easily acquire sound source.

It is also preferable that at least one of the sound devices is a portable terminal unit. By this structure, it becomes possible to reproduce stereophonic sound, surround sound, and also home theater sound by using a plurality of portable terminal units.

It is further preferable that the portable terminal unit has a display for displaying an image based on acquired image data. Thereby, it is possible to use the portable terminal unit as a component for a home theater system.

It is advantageous that at least one of the sound devices has a display for displaying an image. By this structure, it is possible to use a television set, a personal computer and the like as the sound device, and to realize a home theater by using the display of the sound device.

It is also advantageous that the sound reproducing system has at least two displays disposed in the portable terminal units and/or the sound devices, and the at least two displays display mutually different images. By this structure, it is possible, for example, to display a part of an image displayed on a screen of one display on a screen of the other display. On the screen of the other display, it is possible to enlarge and display the part of the image displayed on the screen of the one display, and it is also possible to display a plurality of images each corresponding to the part of the image displayed on the screen of the one display.

It is further advantageous that the portable terminal unit has a function of dividing and/or distributing the acquired data. By this structure, it is possible to acquire data and to transfer the data to other portable terminal units by using serial connection, parallel connection or the like. Therefore, it is possible to save costs of acquiring the data.

It is preferable that the portable terminal unit has a storage for storing the acquired data. By this structure, it is not necessary to worry about the line connection time and to listen to the sound anytime and again and again as desired.

It is also preferable that the portable terminal unit transfers or transmits the data stored in the storage to at least one of sound devices. Thereby, by transferring the data, it is possible to listen to stereophonic sound, surround sound and the like anytime and again and again as desired.

It is further preferable that storing of the data into the storage and transferring the data to at least one of other sound devices are performed simultaneously. Thereby, it is possible to perform real time reproduction when the data is being stored.

It is advantageous that the portable terminal unit reproduces at least a part of the acquired data while transferring other portion of the acquired data to at least one of other sound devices. By this structure, it is possible to transfer data simultaneously with the reproduction of data.

It is also advantageous that the sound device reproduces the data while receiving the data from the portable terminal unit. By this structure, it is possible to reproduce the data simultaneously with the reception of data.

It is further advantageous that the reproducing operation of the portable terminal unit and the reproducing operation of the sound device are performed in cooperation with each other.

It is preferable that at least two portable terminal units acquire mutually different data respectively, and each of the portable terminal units transfers data separately to corresponding one of at least two sound devices, and wherein the data acquired in the portable terminal units and the data acquired in the sound devices are reproduced in cooperation with each other. Thereby, it is possible to reproduce stereophonic sound, surround sound and the like while reducing a processing load of the portable terminal unit(s) which acquire data.

It is also preferable that the data are transmitted to and/or received by the portable terminal unit via wireless or wired communication. In case the wireless communication is used, it is possible to avoid disadvantages caused by cables.

It is further preferable that the data is transmitted from a data delivery service. Thereby, it becomes possible to easily acquire various sound source.

It is advantageous that the data is provided to the portable terminal unit via a storage or a storage medium. By using this structure, it is possible to repeatedly reproduce sound and the like after acquiring sound data once.

It is also advantageous that the portable terminal unit reproduces the data taking the delay time caused by the transmission of the data from the portable terminal unit to the sound device into consideration. By this structure, it is possible to improve sound quality.

It is further advantageous that at least two of the portable terminal units are coupled with different output sides of a data separating connector via cables or wireless coupling. By this structure, it is possible to easily acquire sound source by using data separating connector. When wireless coupling is used, it is possible to avoid disadvantages caused by cables.

It is preferable that the data separating connector receives data from an information equipment or sound device, and separates and transfers the received data to the portable terminal units. Thereby, it is possible to obtain sound data from various sound source.

It is also preferable that the portable terminal unit and/or sound devices receive an operating electric power from an equipment from which the portable terminal unit and/or sound device acquire the data. By using this structure, it is possible to simplify the connection and save an electric power.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which:

FIGS. 3A-3F are schematic sequence diagrams illustrating various data used in the sound reproducing system according to the first embodiment of the present invention shown in FIG. 1;

FIGS. 10A-10J are schematic sequence diagrams illustrating various data used in the sound reproducing system according to the third embodiment of the present invention shown in FIG. 7;

FIGS. 11A-11I are schematic sequence diagrams illustrating various data used in the sound reproducing system according to the fourth variation of the third embodiment of the present invention shown in FIG. 8;

Figure 9:
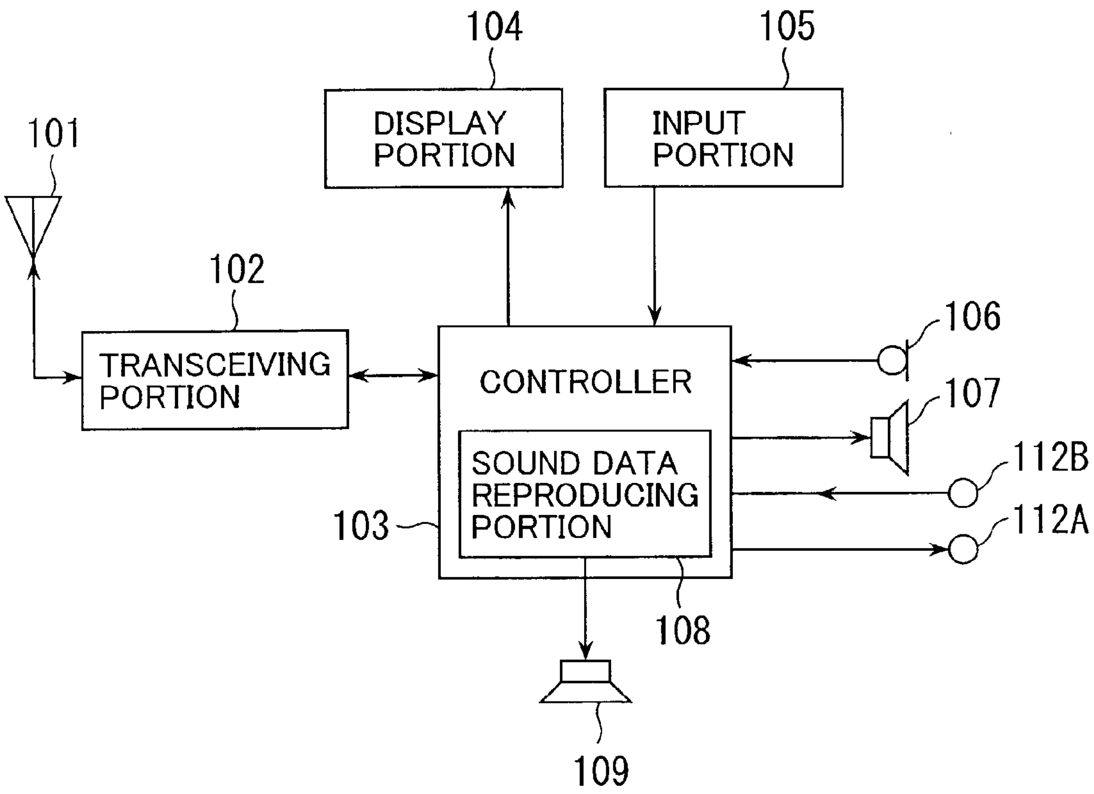
FIG. 9 is a block circuit diagram showing a schematic structure of each of the portable terminal units 1*a*, 1*b*, 1*c*, 1*d* and 1*e* which are shown in FIG. 7 and FIG. 8.
Figure 13:
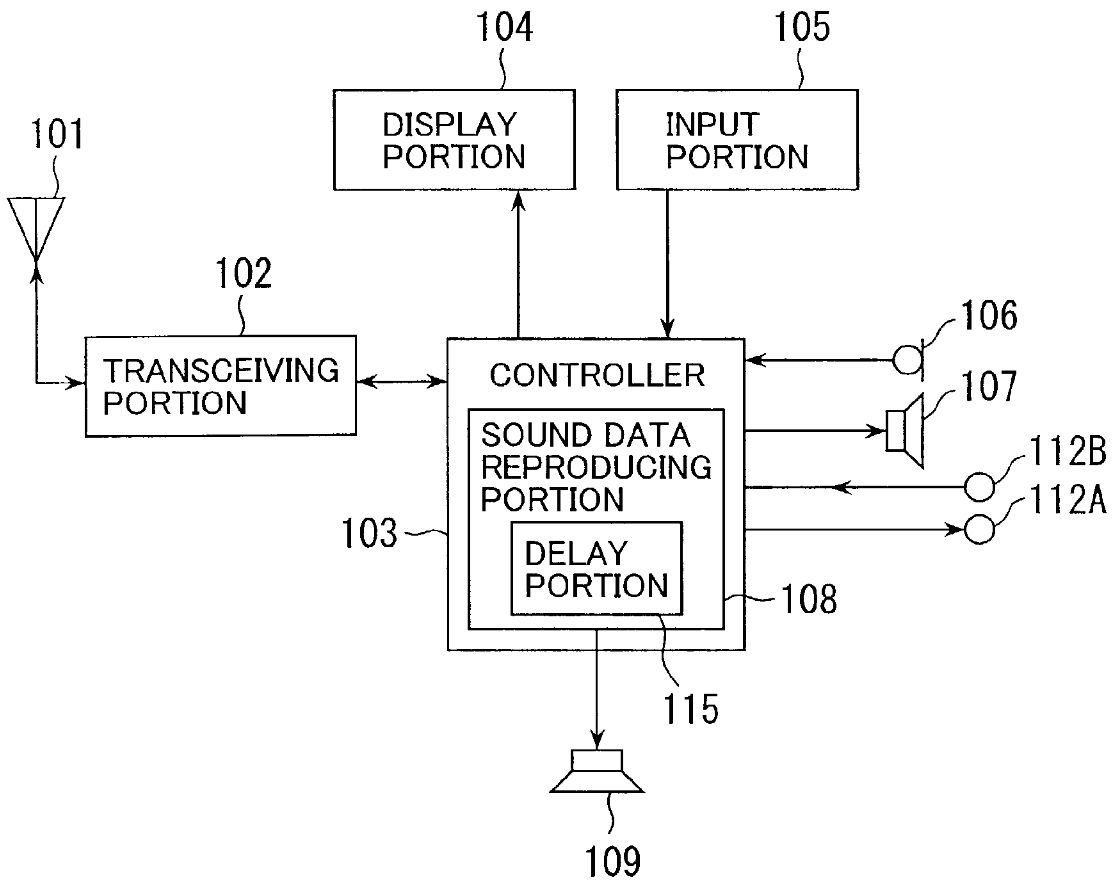
FIG. 13 is a block circuit diagram showing a schematic structure of each of the portable terminal units 1*a*, 1*b*, 1*c*, 1*d* and 1*e* in the sound reproducing system having a serial structure and shows a structure which is used when a delay time of data transfer between the portable terminal units is not negligible.
Figure 15:
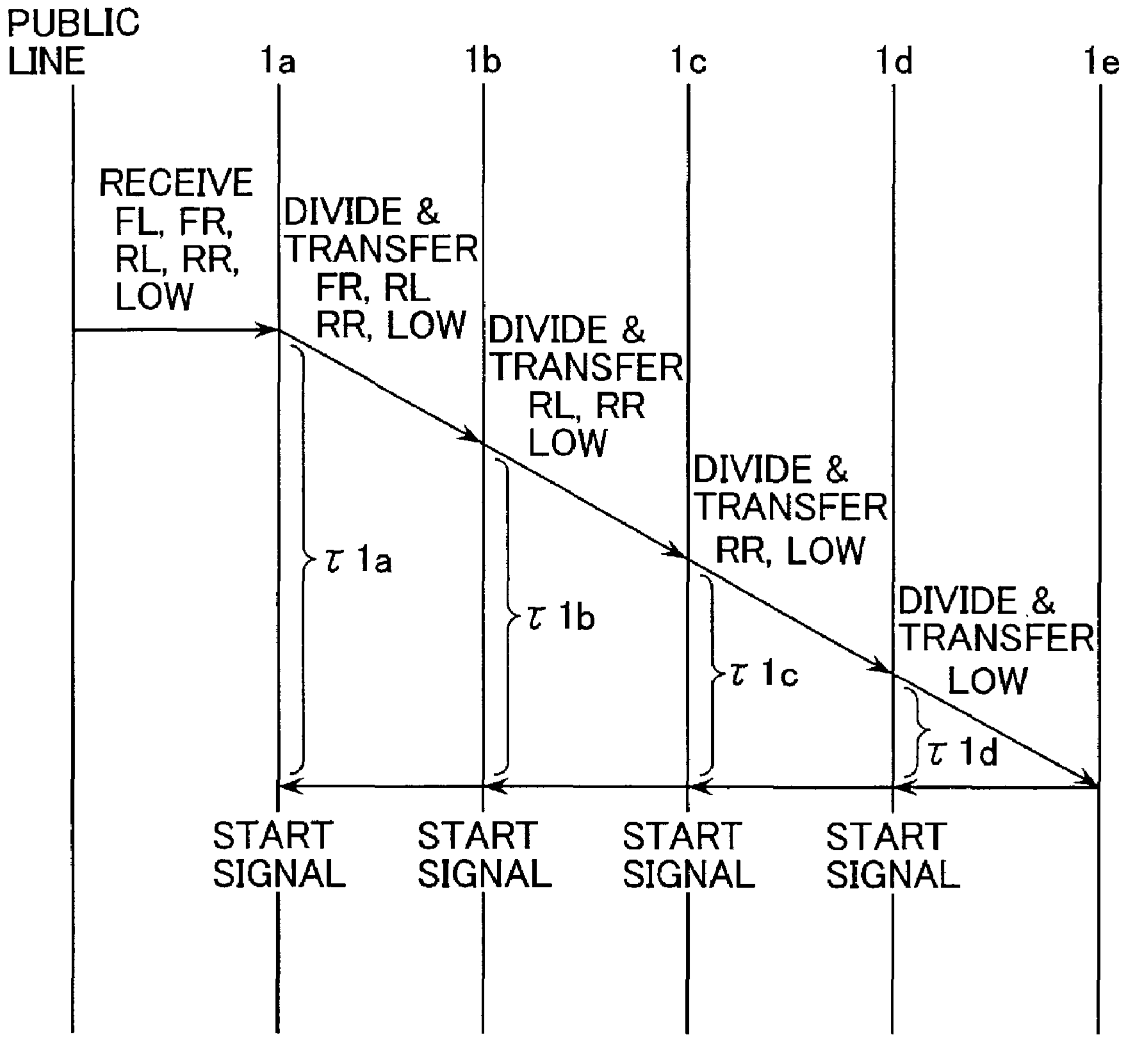
Figure 16:
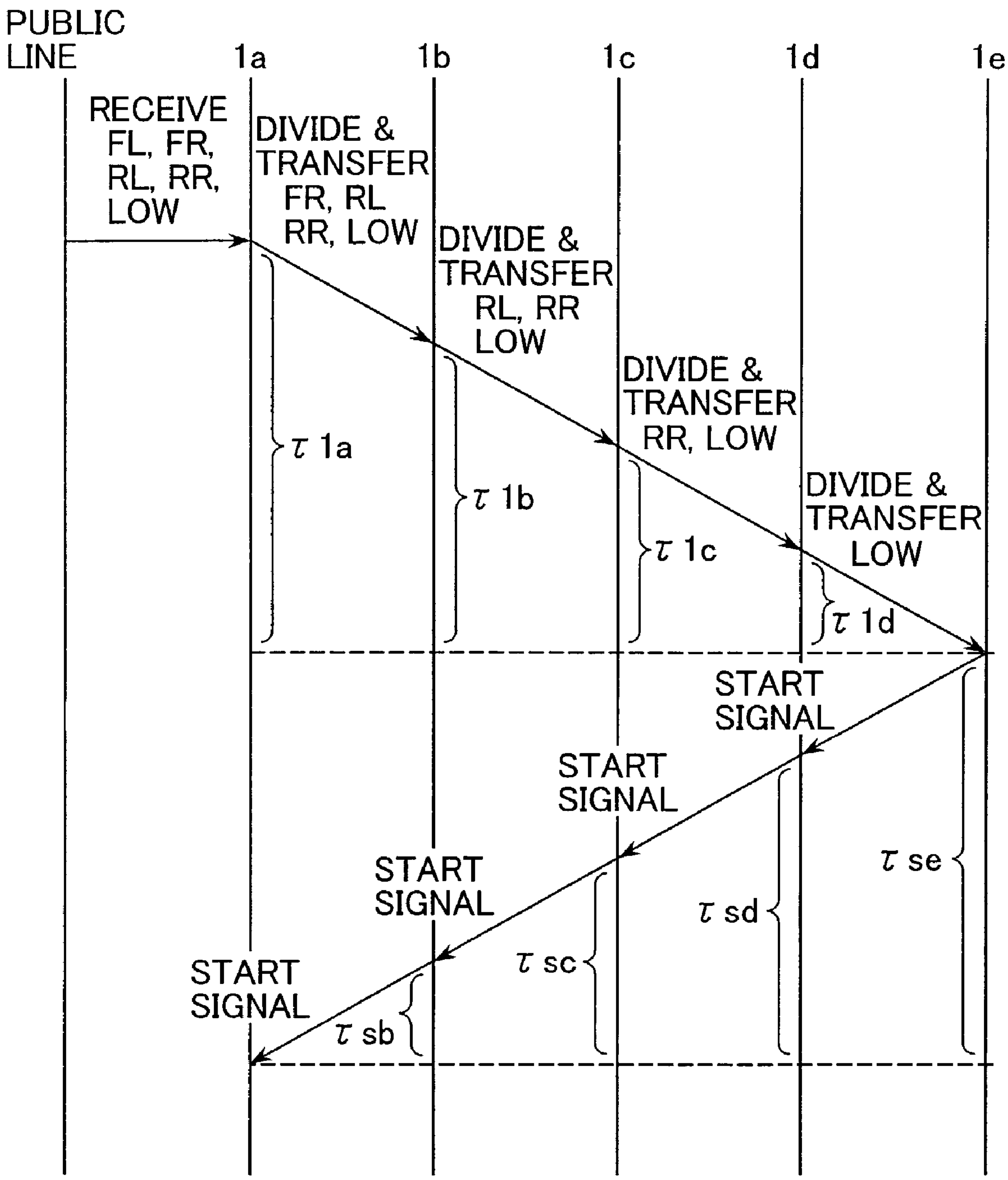
Figure 20:
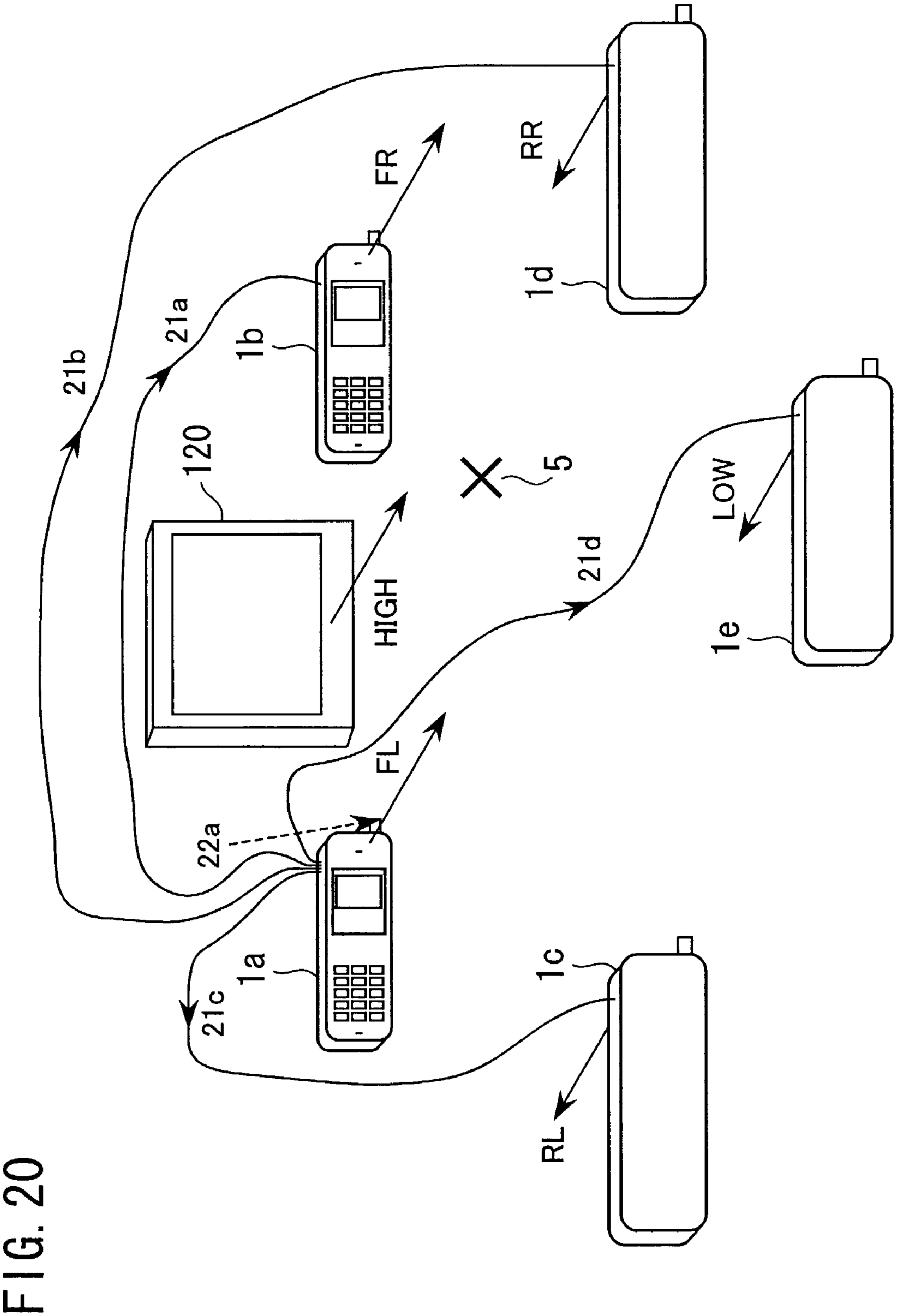
Figure 21:
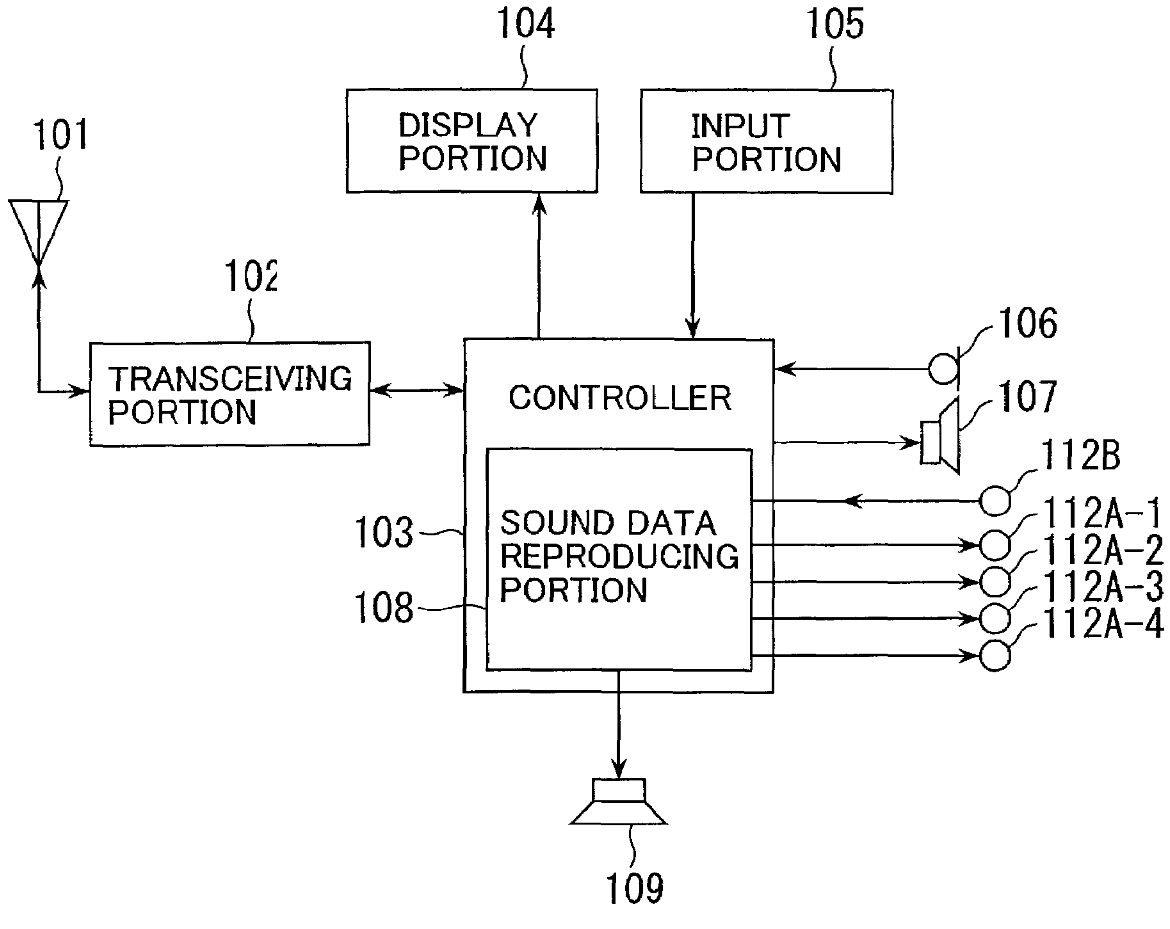
Figure 23A:
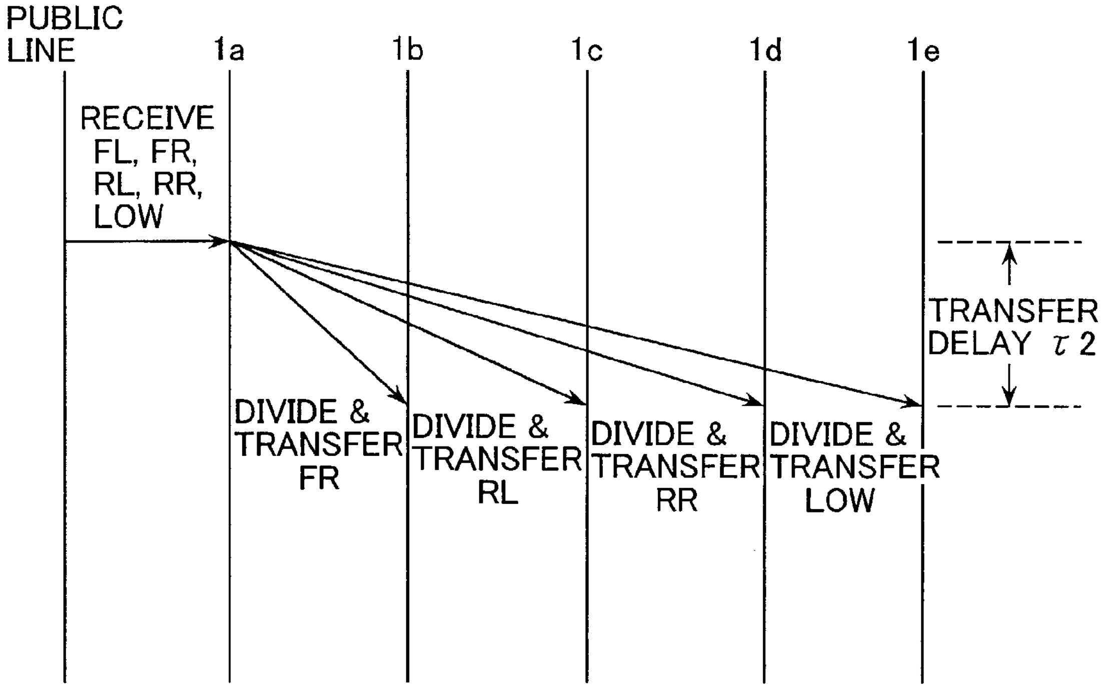
Figure 23B:
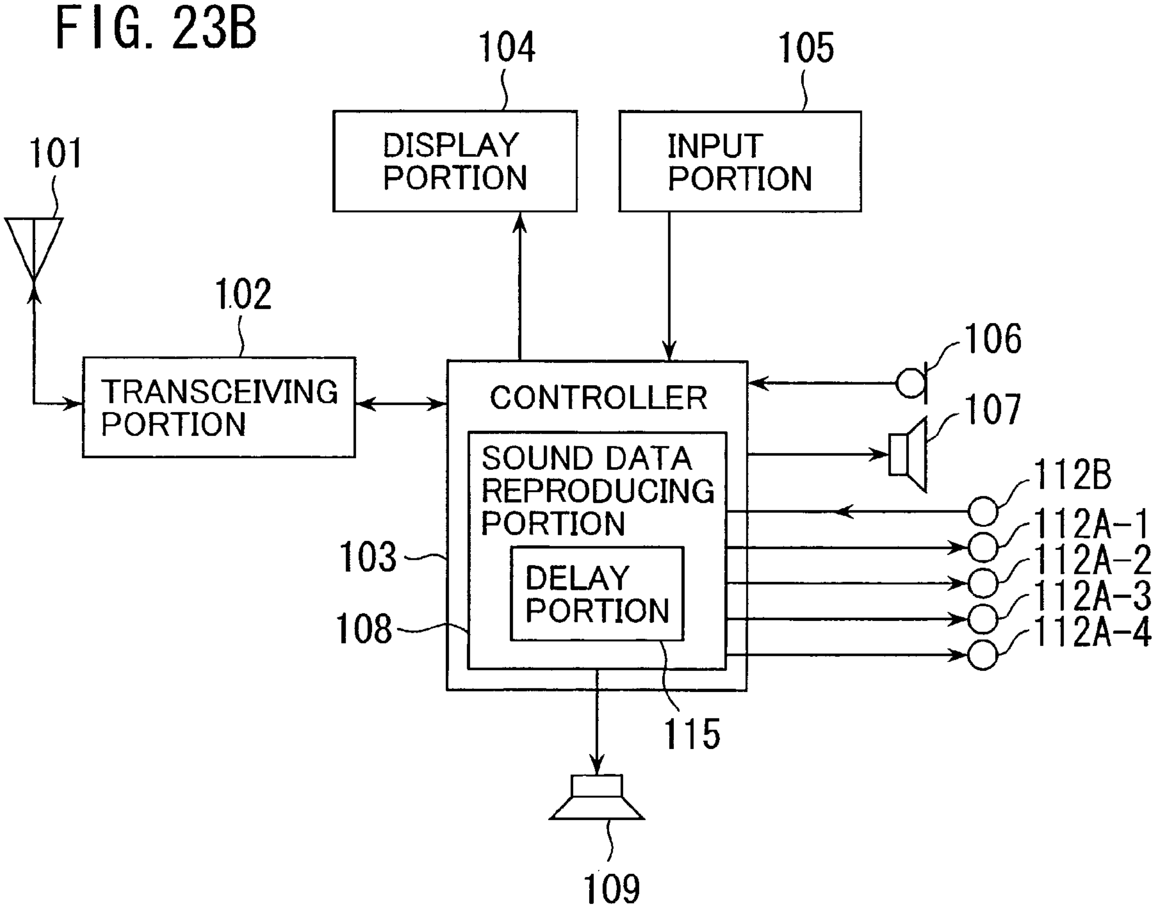
Figure 25:
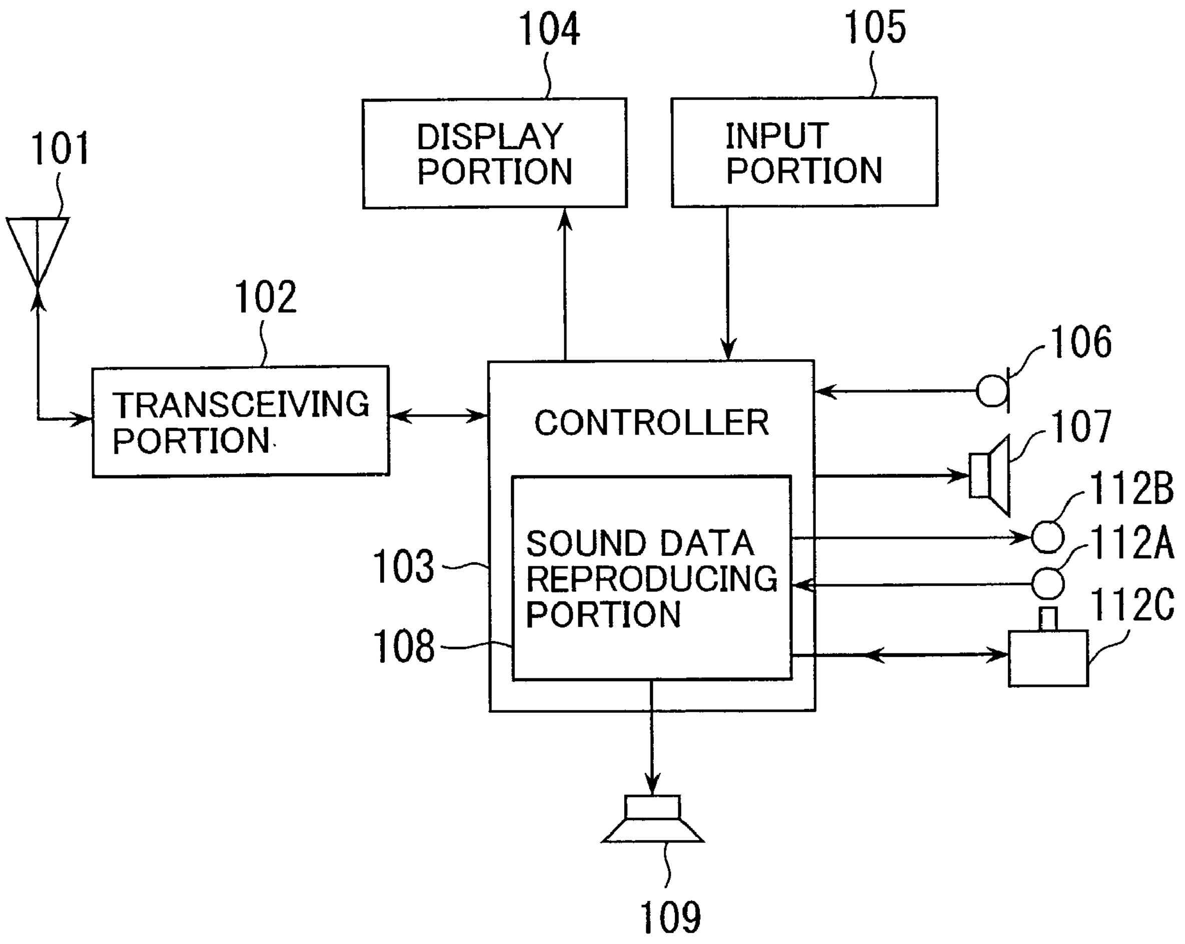

FIG. 15 is a sequence diagram illustrating a sound reproducing operation of the sound reproducing system which uses the portable terminal units of FIG. 13 serially coupled together;

FIG. 16 is a sequence diagram illustrating a signal transmission delay of the start signal in the sound reproducing operation of FIG. 15;

FIGS. 17A-17E are flow charts showing examples of reproducing operation concerning the sound data reproducing portions 108 in the portable terminal units 1*a*, 1*b*, 1*c*, 1*d* and 1*e* shown in FIG. 13 when the transmission delay of the start signal is not negligible;

FIG. 18 is a block circuit diagram showing a variation of the structure of FIG. 13 and shows a schematic structure of each of the portable terminal units 1*a*, 1*b*, 1*c*, 1*d* and 1*e* which is used when a delay time of data transfer between the portable terminal units is not negligible;

FIGS. 19A and 19B are waveform diagrams illustrating clock signals generated by the clock signal portion 116;

FIG. 20 is an illustration showing a schematic structure of a sound reproducing system of portable terminal units according to a fifth embodiment of the present invention and shows an example in which portable terminal units are parallel coupled together;

FIG. 21 is a block circuit diagram showing a variation of FIG. 9 and showing a schematic structure of each of the portable terminal units 1*a*, 1*b*, 1*c*, 1*d* and 1*e* which are shown in FIG. 20;

FIGS. 22A-22H are schematic sequence diagrams illustrating various data used for explaining an exemplary operation of the sound reproducing system according to the fifth embodiment of the present invention shown in FIG. 20;

FIG. 23A is a sequence diagram illustrating an example of transfer delay of data signals in the sound reproducing system shown in FIG. 20;

FIG. 23B is a block circuit diagram showing a variation of FIG. 21 and showing a schematic structure of each of the portable terminal units 1*a*, 1*b*, 1*c*, 1*d* and 1*e* which are shown in FIG. 20;

FIGS. 24A-24E are flow charts showing examples of reproducing operation concerning the sound data reproducing portions 108 in the portable terminal units 1*a*, 1*b*, 1*c*, 1*d* and 1*e* shown in FIG. 20 when there is a substantial transfer signal delay between the portable terminal units;

FIG. 25 is a block circuit diagram showing a variation of FIG. 9 or FIG. 21 and showing a schematic structure of each of the portable terminal units 1*a*, 1*b*, 1*e*, 1*d* and 1*e;*

Figure 26:
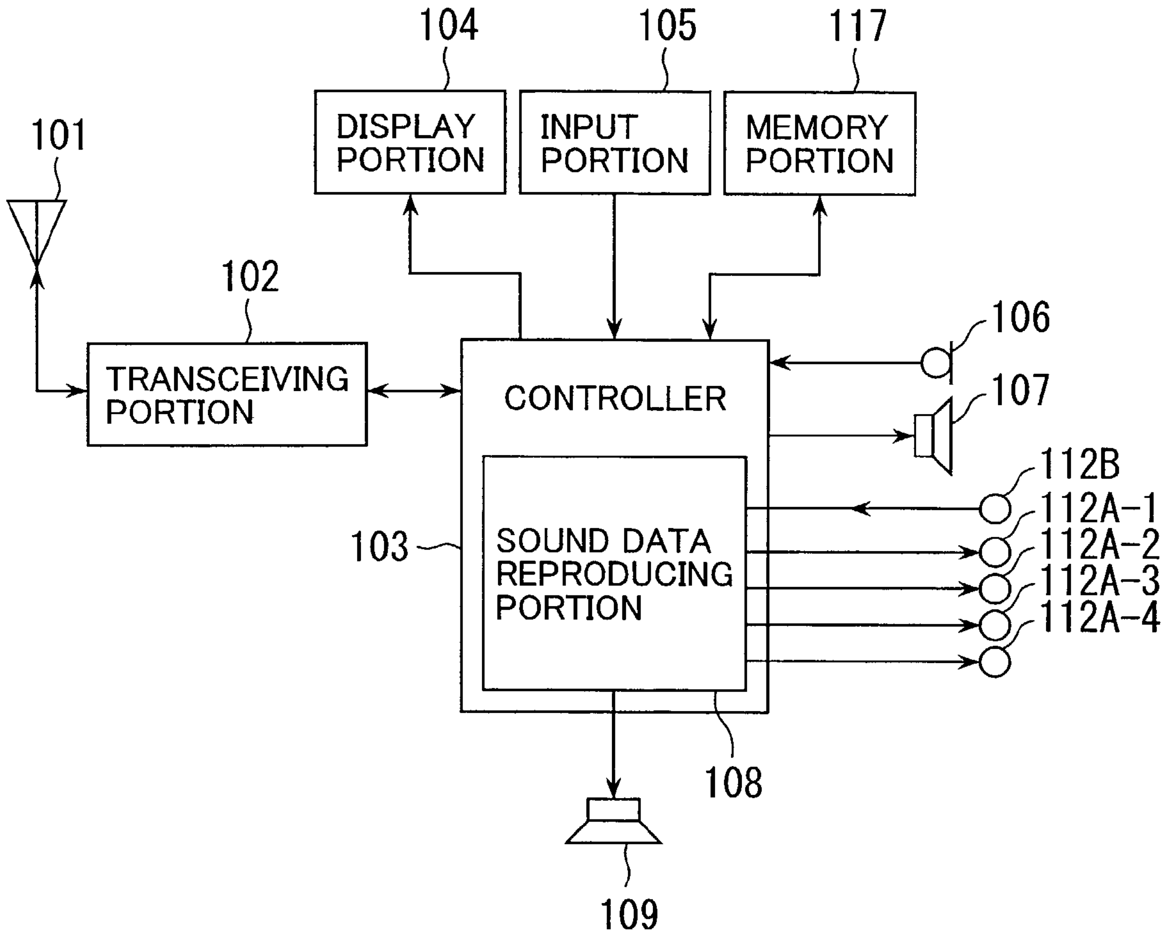

FIG. 26 is a block circuit diagram showing a variation of FIG. 21 and showing a schematic structure of each of the portable terminal units 1*a*, 1*b*, 1*c*, 1*d* and 1*e;*

Figure 27A:
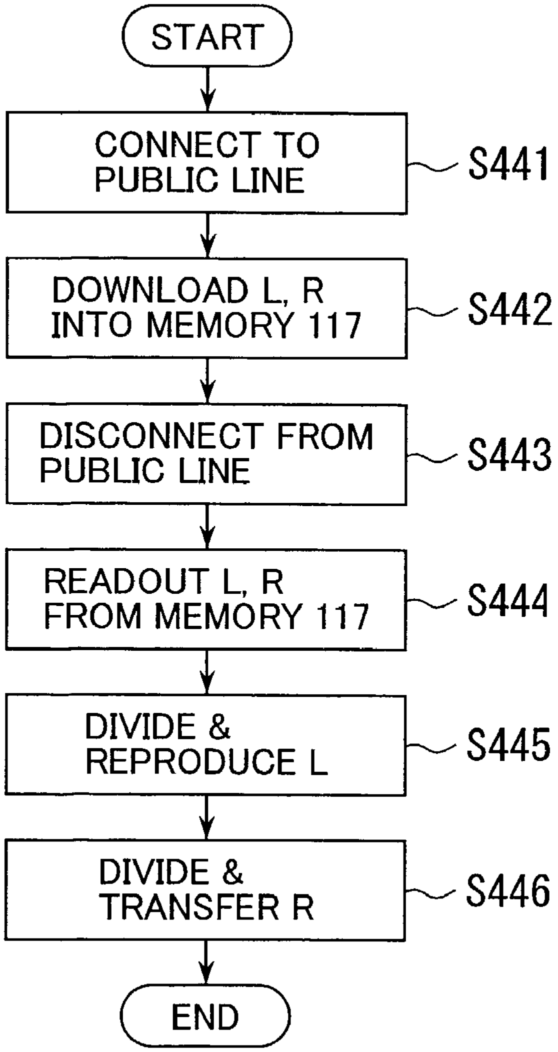
Figure 27B:
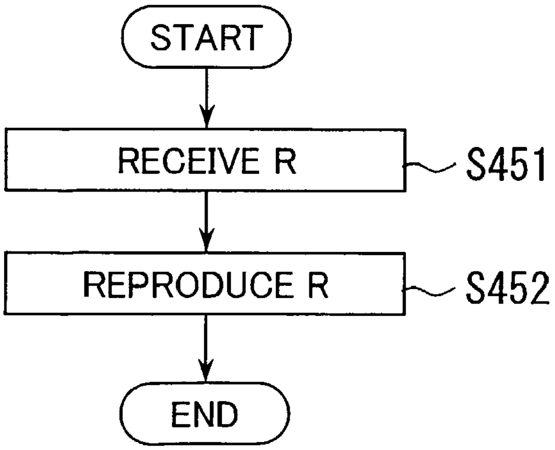
Figure 28:
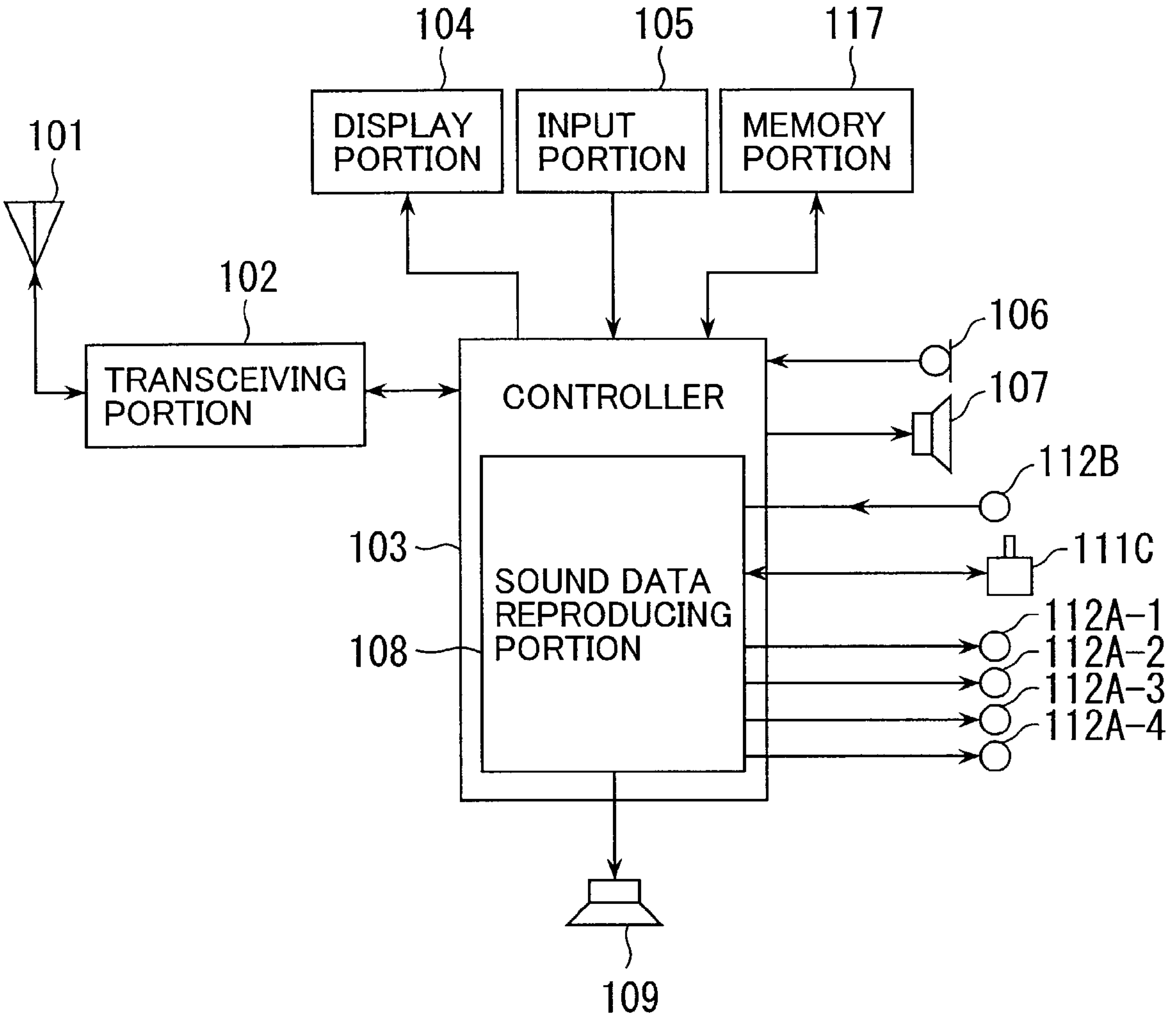

FIGS. 27A and 27B are flow charts showing examples of reproducing operation concerning the sound data reproducing portions 108 shown in FIG. 26 between the portable terminal units 1*a* and portable terminal unit 1*b* and showing an example in which a line connecting time can be saved;

FIG. 28 is a block circuit diagram showing a variation of FIG. 26 and showing a schematic structure of each of the portable terminal units 1*a*, 1*b*, 1*c*, 1*d* and 1*e;*

Figure 29:
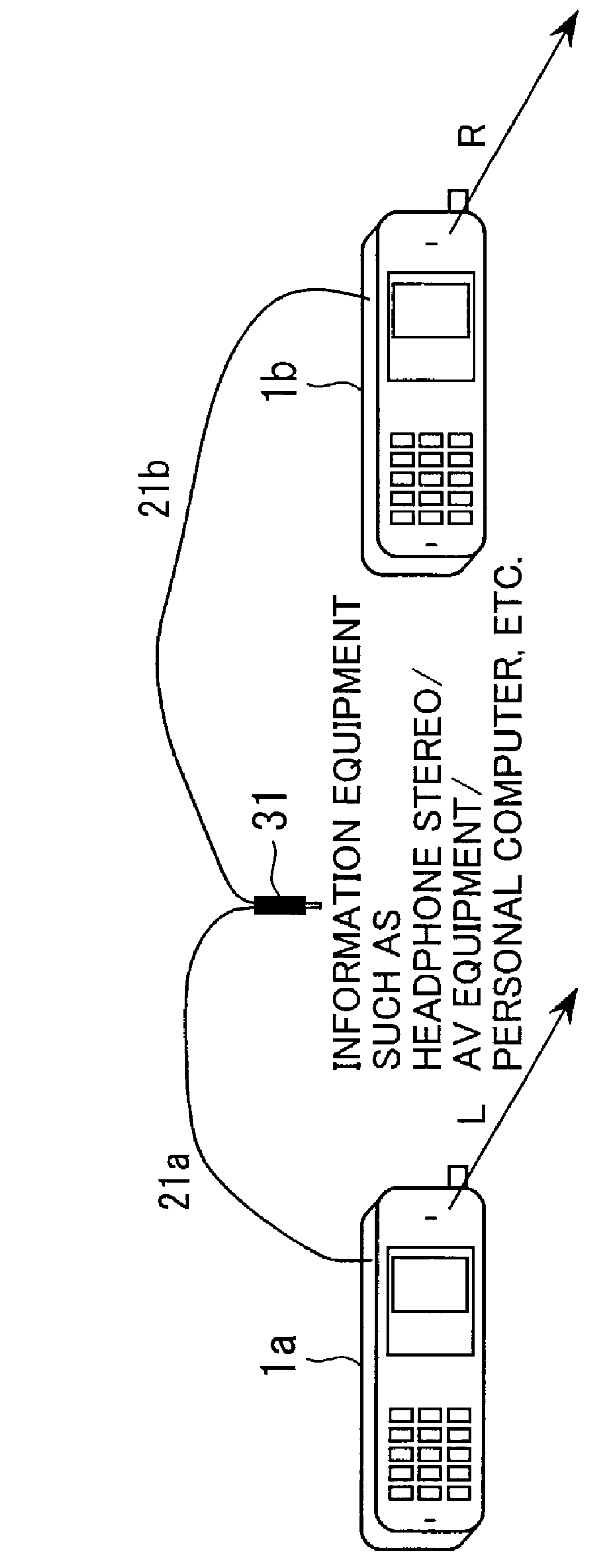
Figure 30:
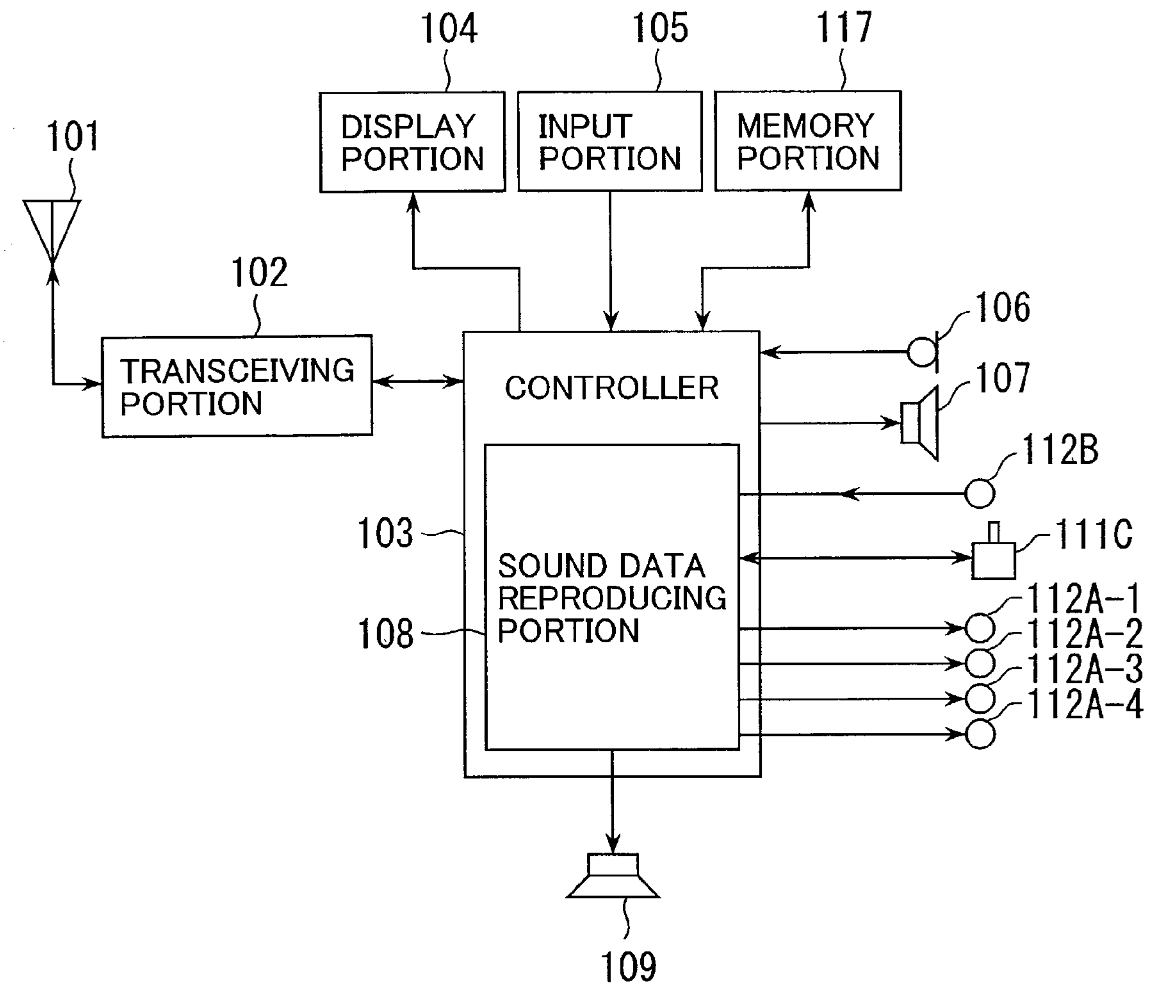
Figure 31:
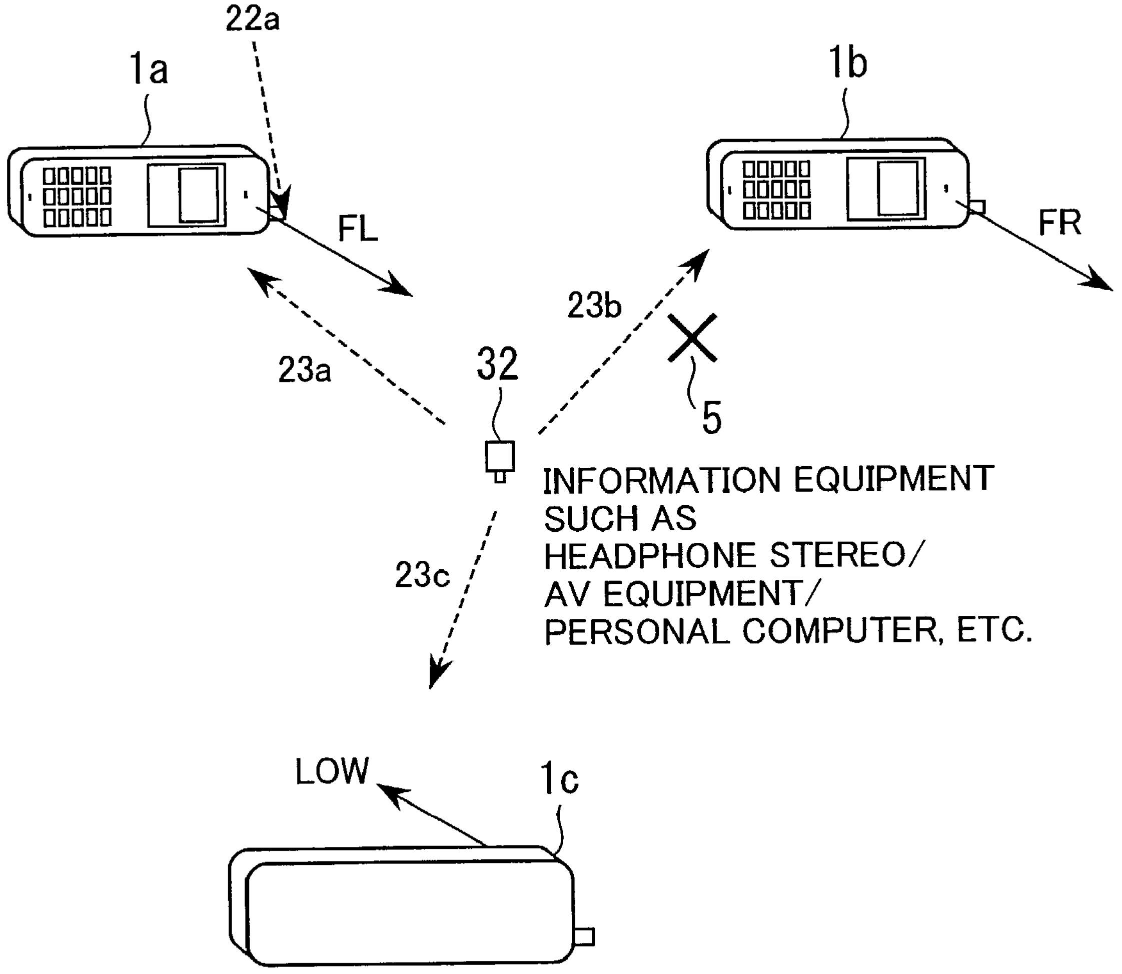
Figure 32:
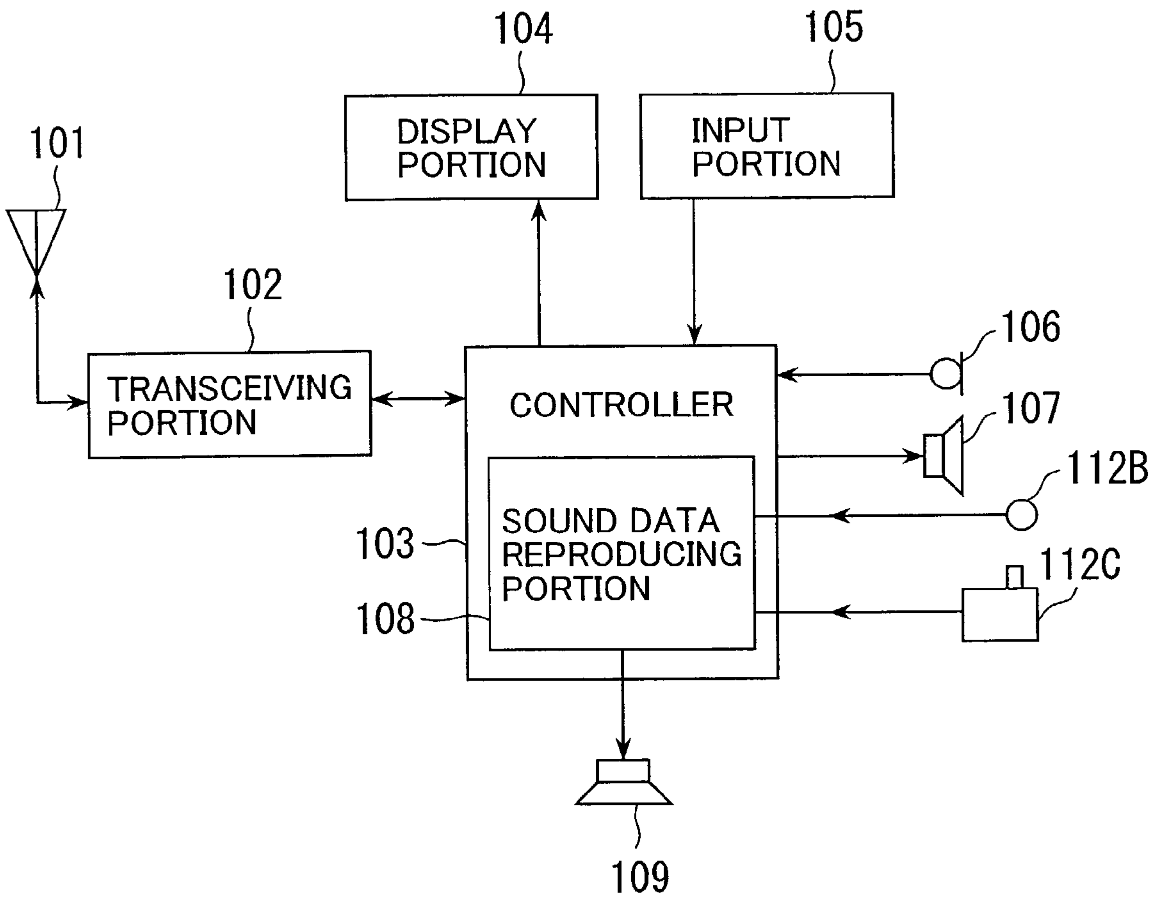

FIG. 29 is an illustrative view showing a schematic structure of a sound reproducing system of portable terminal units according to a sixth embodiment of the present invention and shows an example in which sound data is obtained from an information equipment;

FIG. 30 is a block circuit diagram showing a schematic structure of each of the portable terminal units 1*a* and 1*b* shown in FIG. 29;

FIG. 31 is an illustrative view showing a schematic structure of a sound reproducing system of portable terminal units according to a first variation of a sixth embodiment of the present invention;

FIG. 32 is a block circuit diagram showing a variation of FIG. 30 and showing a schematic structure of each of the portable terminal units 1*a*, 1*b* and 1*c;*

Figure 33:
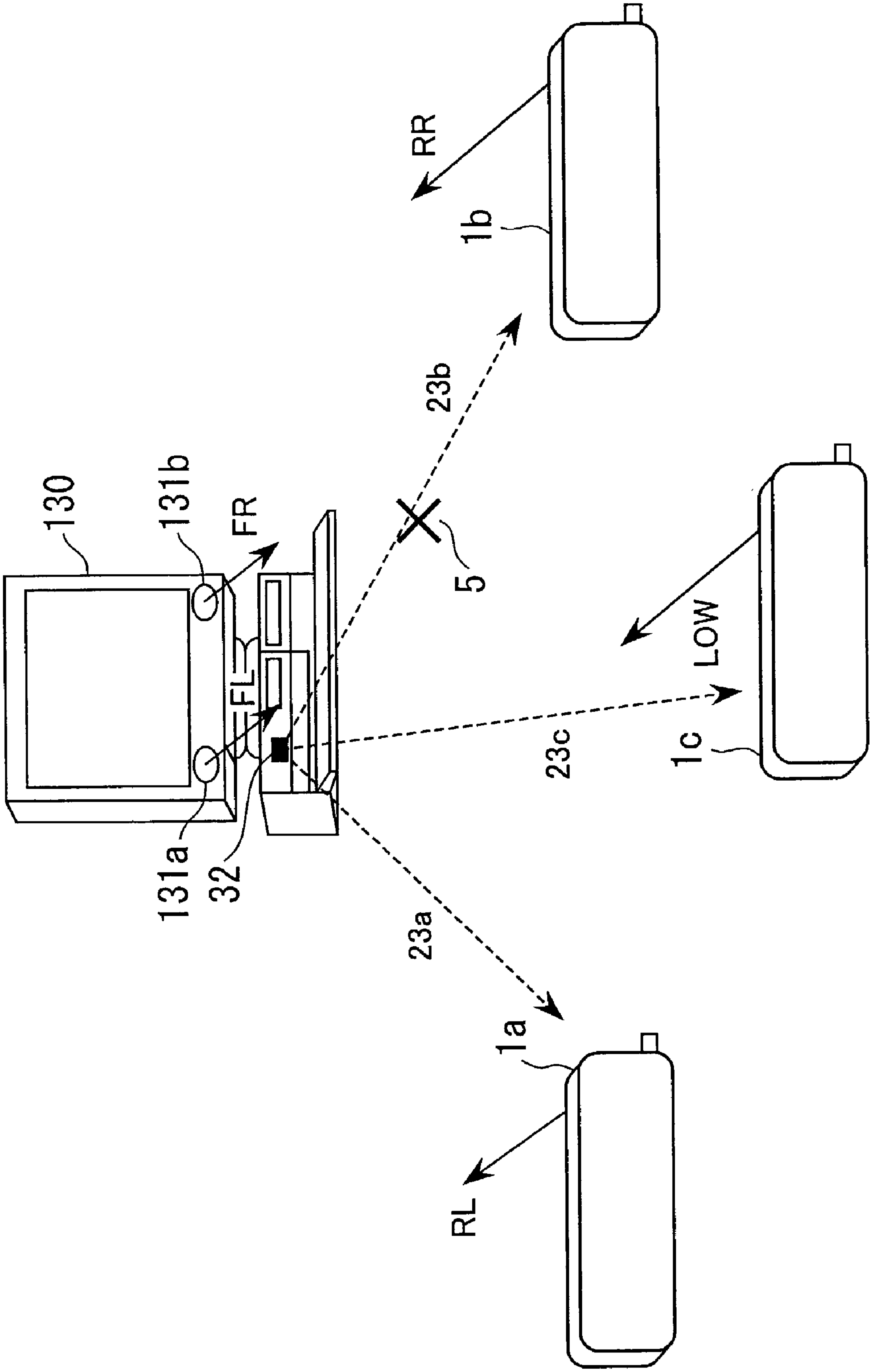
Figure 34A:
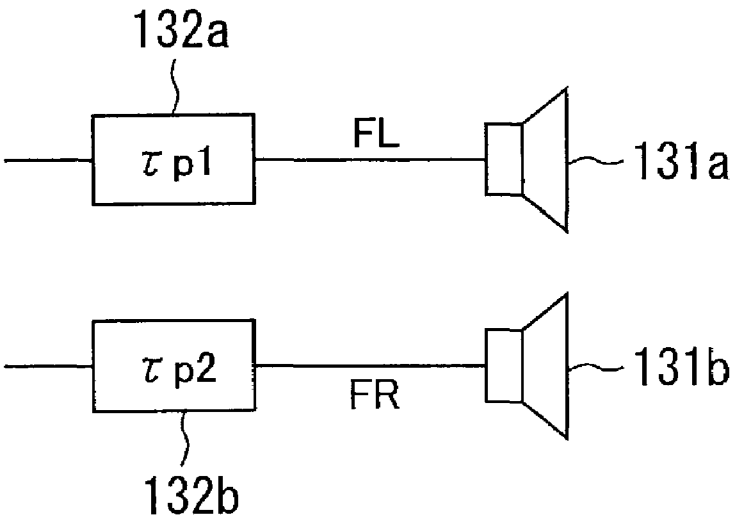
Figure 34B:
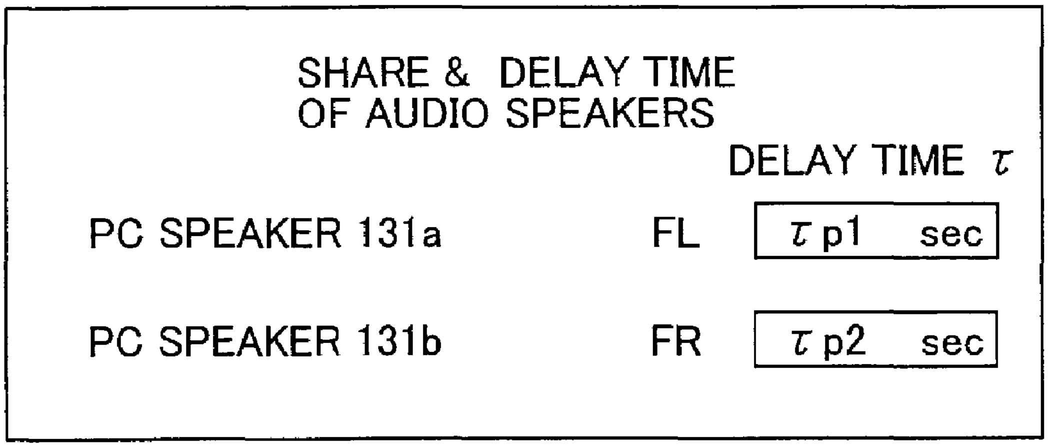
Figure 35:
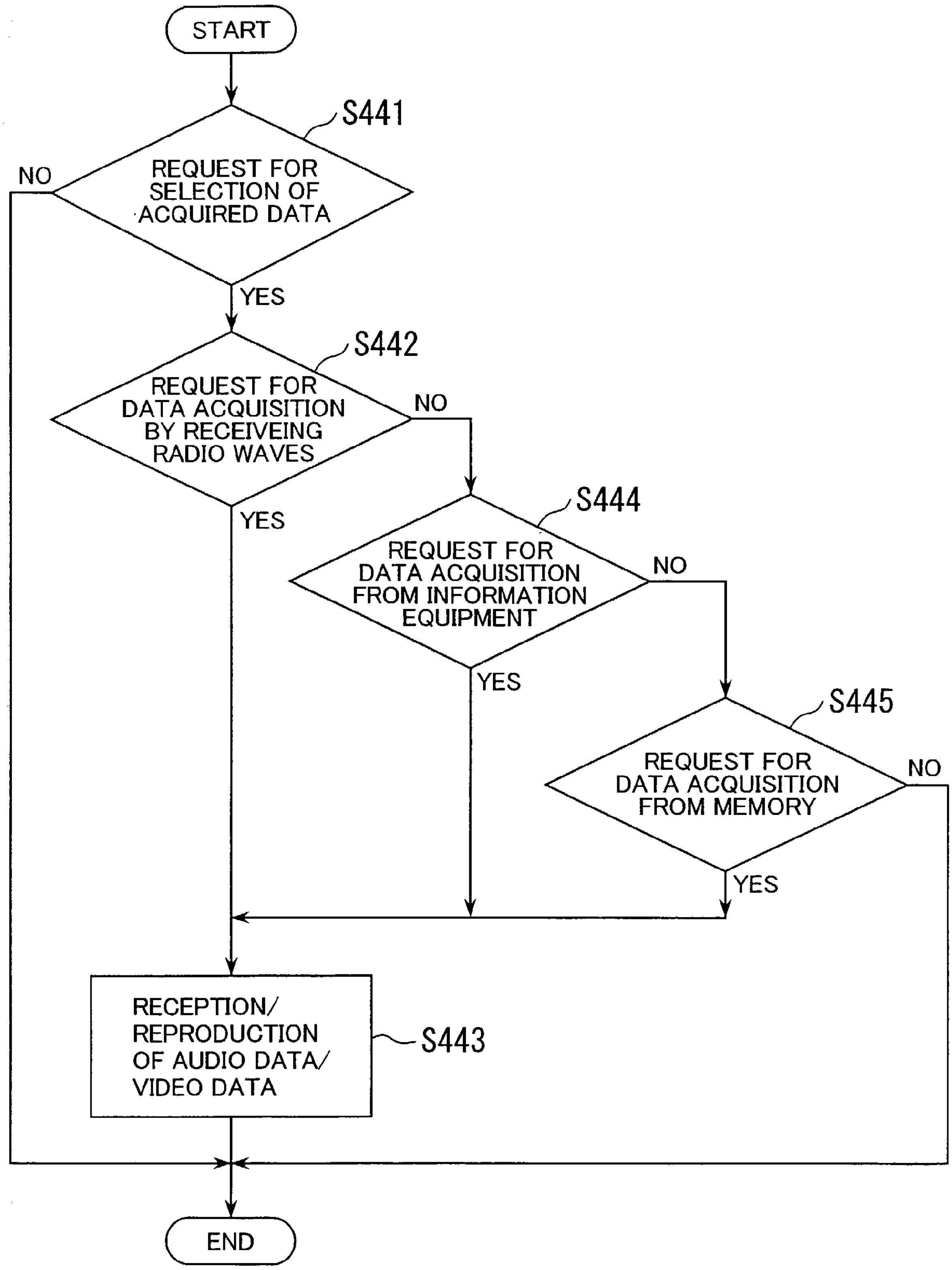

FIG. 33 is an illustrative view showing a schematic structure of a sound reproducing system of portable terminal units according to a third variation of a sixth embodiment of the present invention;

FIG. 34A is a block circuit diagram illustrating an example of a structure in which input data supplied to the loudspeakers 131a and 131b of the personal computer 130 shown in FIG. 33 are delayed;

FIG. 34B is an illustrative view showing delay times of delay elements 132*a* and 132*b* of FIG. 34A, respectively, to compensate for signal transfer delays; and FIG. 35 is a flow chart for explaining a process of selection control of obtained data in a portable terminal unit.

DESCRIPTION OF A PREFERRED EMBODIMENT

According to the present invention, it becomes possible to reproduce stereophonic sound, surround sound, home theater sound and further to display image, by using portable terminal units or by using a combination of at least one portable terminal unit and other sound device(s) such as other portable terminal unit(s) and audio/video equipment(s). In the present invention, as sound sources, various means can be used including sound sources from delivered signals from data delivery service, the internet, download from stations placed in stores, utilities and the like, direct purchase or rental of compact discs (CD), digital video discs (DVD) and storage media, audio and video (AV) equipment, information equipment such as personal computers and the like. The present invention facilitates acquisition of multimedia data from these various sound sources, and thereby makes it possible to reproduce stereophonic sound, surround sound, home theater sound and further to display image, in a manner mentioned below.

With reference to the drawings, an explanation will be made on various embodiments of the present invention.

Figure 1:
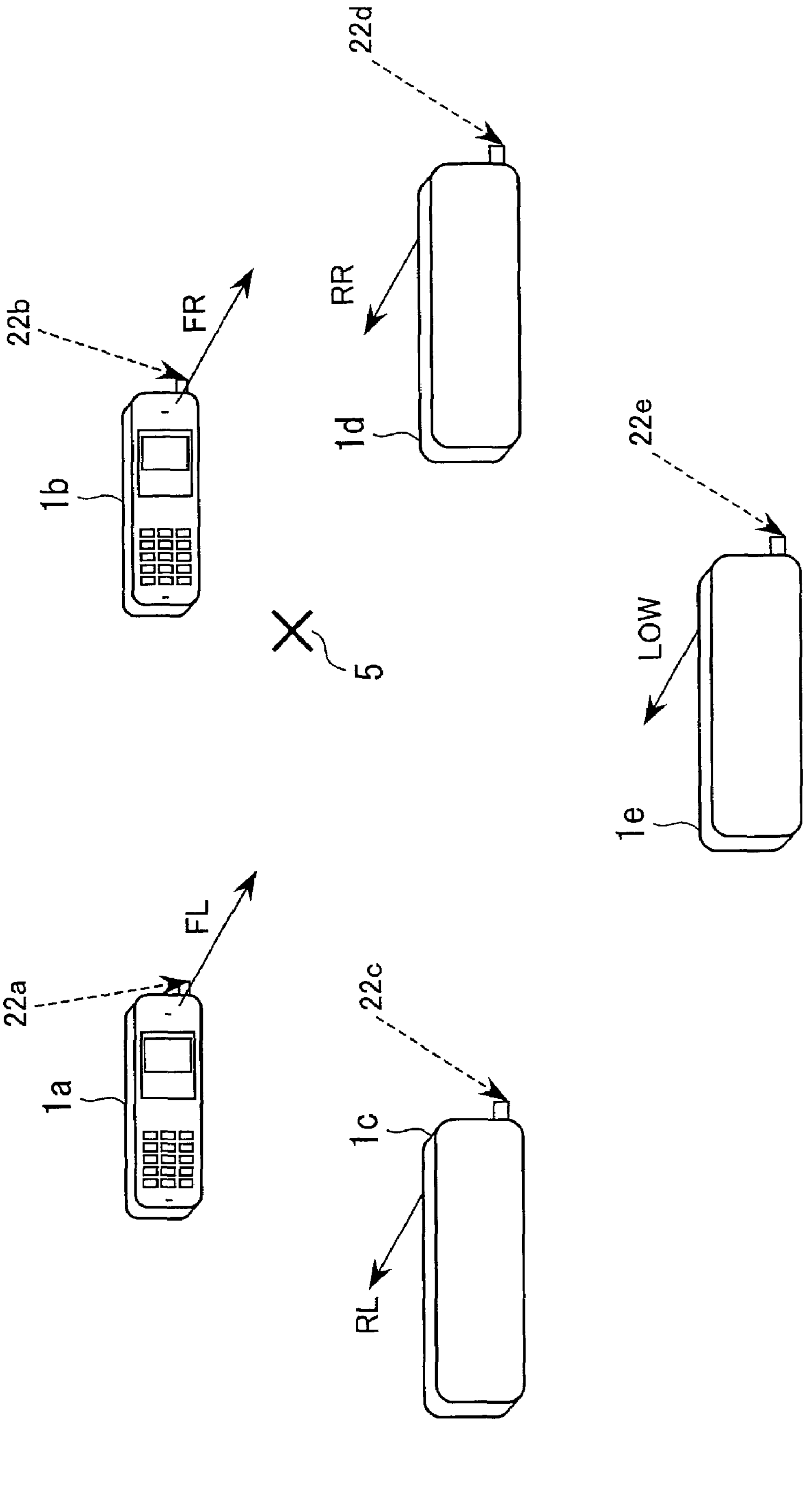
FIG. 1 is an illustrative view showing a schematic structure of a sound reproducing system of portable terminal units according to a first embodiment of the present invention.

FIG. 1 is an illustration showing a schematic structure of a sound reproducing system of portable terminal units according to a first embodiment of the present invention. FIG. 1 shows an example of a sound reproducing system in which each of a plurality of portable terminal units receives radio waves individually.

First, as shown in the drawing, the sound reproducing system of portable terminal units according to the first embodiment comprises five portable terminal units 1*a*, 1*b*, 1*c*, 1*d* and 1*e*.

The five portable terminal units 1*a*, 1*b*, 1*c*, 1*d* and 1*e* are disposed on the periphery of a listener or listeners 5, and reproduce surround sound including low frequency range sound.

That is, among the five portable terminal units 1*a*, 1*b*, 1*c*, 1*d* and 1*e* disposed respectively at mutually separate locations, the portable terminal unit 1*a* reproduces front-left sound FL, the portable terminal unit 1*b* reproduces front-right sound FR, the portable terminal unit 1*c* reproduces rear-left sound RL, the portable terminal unit 1*d* reproduces rear-right sound RR, and the portable terminal unit 1*e* reproduces low sound LOW of a low frequency range.

The portable terminal units 1*a*, 1*b*, 1*c*, 1*d* and 1*e* individually receive radio waves 22*a*, 22*b*, 22*c*, 22*d* and 22*e*, respectively, via public radio lines.

The radio waves 22*a*, 22*b*, 22*c*, 22*d* and 22*e* are transmitted from, for example, data delivery service and the like. The radio waves 22*a*, 22*b*, 22*c*, 22*d* and 22*e* respectively include sound data of the sound FL, FR, RL, RR of surround sound, and sound data of low frequency range.

While receiving the radio waves 22*a*, 22*b*, 22*c*, 22*d* and 22*e*, respectively, the portable terminal units 1*a*, 1*b*, 1*c*, 1*d* and 1*e* reproduce the sound in real time based on the received sound data.

In this case, it is preferable that the portable terminal unit 1*e* has audio loudspeaker or loudspeakers having good low frequency characteristics.

An explanation will now be made on a schematic structure of a sound reproducing system as a first variation of the first embodiment. The sound reproducing system according to the first variation of the first embodiment has a structure in which the portable terminal unit 1*e* is omitted from the structure of the first embodiment shown in FIG. 1, and therefore the number of the portable terminal units is decreased to four (4). That is, the sound reproducing system according to the first variation of the first embodiment comprises the portable terminal units 1*a*, 1*b*, 1*c* and 1*d* which receive radio waves, respectively, and reproduce surround sound. Therefore, the four portable terminal units 1*a*, 1*b*, 1*c* and 1*d* receive radio waves 22*a*, 22*b*, 22*c* and 22*d*, respectively, and reproduce received sound data in real time.

The radio waves 22*a*, 22*b*, 22*c* and 22*d* are transmitted from, for example, data delivery service and the like. The radio waves 22*a*, 22*b*, 22*c* and 22*d* respectively include sound data of the sound FL, FR, RL, RR of surround sound.

When the data delivery service has, for example, sound channel(s) dedicated to front channel sound, sound channel (s) dedicated to rear channel sound and the like for surround sound, the portable terminal units 1*a* and 1*b* can respectively receive sound data FL and FR from the sound channel(s) dedicated to the front channel sound.

An explanation will now be made on a schematic structure of a sound reproducing system as a second variation of the first embodiment. The sound reproducing system according to the second variation of the first embodiment has a structure in which the portable terminal units 1*c* and 1*d* are omitted from the structure of the first embodiment shown in FIG. 1, and therefore the number of the portable terminal units is further decreased to three (3). That is, the sound reproducing system according to the second variation of the first embodiment comprises the portable terminal units 1*a*, 1*b* and 1*e* which receive radio waves, respectively, and reproduce stereo sound including low frequency range sound. Therefore, the three portable terminal units 1*a*, 1*b* and 1*e* receive radio waves 22*a*, 22*b* and 22*e*, respectively, and reproduce received sound data in real time.

The radio waves 22*a*, 22*b* and 22*e* are transmitted from, for example, data delivery service and the like. The radio waves 22*a*, 22*b* and 22*e* respectively include sound data of the sound FL and FR of surround sound and sound data of low frequency range.

When the data delivery service has, for example, sound channel(s) dedicated to stereo sound and the like, the portable terminal units 1*a* and 1*b* can respectively receive sound data for L sound and R sound from the sound channel(s) dedicated to stereo sound.

An explanation will now be made on a schematic structure of a sound reproducing system as a third variation of the first embodiment. The sound reproducing system according to the third variation of the first embodiment has a structure in which the portable terminal units 1*c*, 1*d* and 1*e* are omitted from the structure of the first embodiment shown in FIG. 1, and therefore the number of the portable terminal units is further decreased to two (2). That is, the sound reproducing system according to the third variation of the first embodiment comprises the portable terminal units 1*a* and 1*b* which receive radio waves, respectively, and reproduce stereo sound. Therefore, the two portable terminal units 1*a* and 1*b* receive radio waves 22*a* and 22*b*, respectively, and reproduce received sound data in real time.

The radio waves 22*a* and 22*b* are transmitted from, for example, a data delivery service and the like. The radio waves 22*a* and 22*b* respectively include sound data of the sound FL and FR of surround sound.

When the data delivery service has, for example, sound channel(s) dedicated to stereo sound and the like, the portable terminal units 1*a* and 1*b* can respectively receive sound data for L sound and R sound from the sound channel(s) dedicated to the stereo sound.

In the above-mentioned examples, an explanation was made on combinations including five portable terminal units at maximum. However, the present invention is not limited to such examples, but it is possible to perform sound reproduction by using a combination of more than five portable terminal units such as portable telephones.

It is also possible to display an image in each or any of the combined portable terminal units, in addition to the reproduction of sound.

Figure 2:
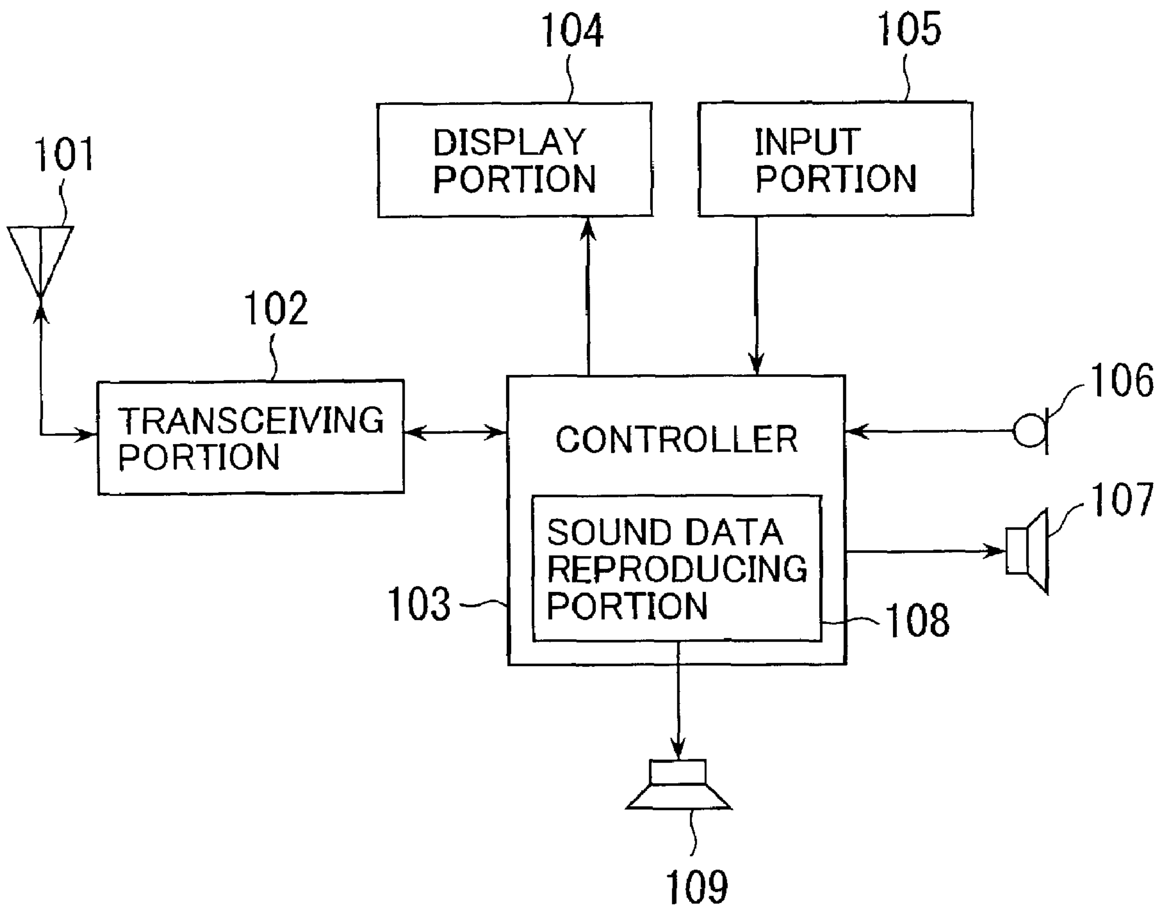
FIG. 2 is a block circuit diagram showing a schematic structure of each of the portable terminal units 1*a*, 1*b*, 1*c*, 1*d* and 1*e* which are shown in FIG. 1.

FIG. 2 is a block circuit diagram showing a schematic structure of each of the portable terminal units 1*a*, 1*b*, 1*c*, 1*d* and 1*e* which are shown in FIG. 1 and which may have the same structure.

As shown in FIG. 2, each of the portable terminal units 1*a*, 1*b*, 1*c*, 1*d* and 1*e* has an antenna 101 which transmits and receives radio waves to and from a base station not shown in the drawing.

The portable terminal unit shown in FIG. 2 has a transceiver or transceiving portion 102 coupled with the antenna 101. The transceiving portion 102 demodulates a received signal from the antenna 101 to produce demodulated data, and modulates modulation data to produce a transmission signal which is supplied to the antenna 101.

The portable terminal unit shown in FIG. 2 also has a controller or control portion 103. The control portion 103 decodes the demodulated data inputted from the transceiving portion 103. Also, the control portion 103 encodes an input signal supplied thereto and produces the modulation data.

A display portion 104 is coupled to the control portion 103. The display portion 104 displays predetermined data such as a telephone number, indication of function(s), and the like on a screen. The display portion 104 can also display an image from received image data, simultaneously with or in place of display of the predetermined data.

Also, an input portion 105 is coupled to the control portion 103. The input portion 105 has, for example, a keypad, and is used for requesting display operation by the display portion 104, for requesting an origination of a call, data and the like, and so on. Especially, the input portion 105 is used for requesting reception of multimedia data from data delivery service.

Further, a sound transmitter 106, a sound receiver 107 and the like are coupled to the control portion 103. The sound transmitter 106 converts voice or sound into an analog electric signal, and the analog electric signal is encoded into digital modulation data in the control portion 103. The sound receiver 107 converts an analog electric signal, which is decoded from digital demodulated data in the control portion 103, into voice or sound.

The control portion 103 further has a sound data reproducing portion 108. The sound data reproducing portion 108 decodes digital sound data into an analog electric signal. The digital sound data is obtained by receiving and demodulating multimedia data from a data delivery service, an information equipment and the like.

An audio loudspeaker 109 is coupled with the sound data reproducing portion 108 in the control portion 103. The audio loudspeaker 109 converts the analog electric signal, which is decoded from the digital sound data in the sound data reproducing portion 108, into sound to provide it for listener or listeners.

In the structure of FIG. 2, it is also possible to provide one loudspeaker in place of the sound receiver 107 and the audio loudspeaker 109, and to commonly use the loudspeaker both as the sound receiver 107 and the audio loudspeaker 109. It is further possible to use both the sound receiver 107 and the audio loudspeaker 109 for reproducing sound data.

FIG. 3A-FIG. 3F are schematic illustrations of various data used in the sound reproducing system according to the first embodiment of the present invention shown in FIG. 1.

It is assumed that multimedia data as shown in FIG. 3A are delivered from data delivery service and the like. The multimedia data includes, for example, sound data of sound FL (front-left), sound FR(front-right), sound RL(rear-left), sound RR(rear-right), sound L(left), sound R(right), low frequency range sound LOW, high frequency range sound HIGH, image data, and the like.

As shown in FIG. 3B, in the portable terminal unit 1*a*, sound data of sound FL in the multimedia data shown in FIG. 3A is received, via radio waves 22*a*. The sound data of the sound FL is decoded in the sound data reproducing portion 108, and sound FL is reproduced from the loudspeaker 109. Also, image data in the multimedia data shown in FIG. 3A is received, via radio waves 22*a*, and an image is displayed on a screen based on the image data.

Similarly, as shown in FIG. 3C, in the portable terminal unit 1*b*, sound data of sound FR in the multimedia data shown in FIG. 3A is received, via radio waves 22*b*. The sound data of the sound FR is decoded in the sound data reproducing portion 108, and sound FR is reproduced from the audio loudspeaker 109. Also, image data is received via radio waves 22*b*, and an image is displayed on a screen based on the image data.

Similarly, as shown in FIG. 3D, in the portable terminal unit 1*c*, sound data of sound RL in the multimedia data shown in FIG. 3A is received, via radio waves 22*c*. The sound data of the sound RL is decoded in the sound data reproducing portion 108, and sound RL is reproduced from the audio loudspeaker 109. Also, image data is received via radio waves 22*c*, and an image is displayed on a screen based on the image data.

Similarly, as shown in FIG. 3E in the portable terminal unit 1*d*, sound data of sound RR among the multimedia data shown in FIG. 3A is received, via radio waves 22*d*. The sound data of the sound RR is decoded in the sound data reproducing portion 108, and sound RR is reproduced from the audio loudspeaker 109. Also, image data is received via radio waves 22*d*, and an image is displayed on a screen based on the image data.

Similarly, as shown in FIG. 3F, in the -portable terminal unit 1*e*, sound data of sound LOW among the multimedia data shown in FIG. 3A is received, via radio waves 22*e*. The sound data of the sound LOW is decoded in the sound data reproducing portion 108, and sound LOW is reproduced from the audio speaker 109. Also, image data is received via radio waves 22*e*, and an image is displayed on a screen based on the image data.

It is also possible to display the same or respective image in a part of or all of the screens of the portable terminal units 1*a*, 1*b*, 1*c*, 1*d* and 1*e*.

Also, it is possible to display a part of an image displayed on the screen of a portable terminal unit, on the screen(s) of other portable terminal unit(s). In-this case, it is possible to display the part of the image in single on the screen(s) of other portable terminal unit(s), to display a plurality parts of the image on each of the screen(s) of other portable terminal unit(s), or to enlarge and display the part of the image on the screen(s) of other portable terminal unit(s).

It is possible to supply the image data for displaying image in a plurality of portable terminal units, for example, from the data delivery service. Also, the image displayed in the plurality of portable terminal units may be moving picture.

In this way, according to the present invention, it is possible to reproduce surround sound having good low frequency characteristics for listener or listeners 5, while displaying images including moving pictures at the same time. Therefore, it becomes possible to realize an easy home theater system having a simplified structure.

In case the images are not displayed on the screen of the portable terminal units, it is not necessary to receive image data from the data delivery service, and only sound data is received therefrom to reproduce surround sound for the listener(s) 5.

With reference to FIGS. 3A-3E, a schematic explanation will be made on a reproducing operation of the sound reproducing system according to the first variation of the first embodiment which comprises the portable terminal units 1*a*, 1*b,* 1*c* and 1*d*.

That is, in the portable terminal units 1*a*, 1*b*, 1*c* and 1*d*, data illustrated in FIG. 3B, FIG. 3C, FIG. 3D and FIG. 3E are respectively received in a manner similar to the way mentioned above, and sound corresponding to the data is reproduced.

Also, image is displayed in each of the portable terminal units 1*a*, 1*b*, 1*c* and 1*d*, in a manner similar to the way of image reproduction in the first embodiment mentioned above with respect to FIG. 1.

In this way, it becomes possible to reproduce surround sound for listener(s) 5, while displaying images including moving pictures at the same time.

It is also possible to reproduce surround sound for listener (s) 5 only by receiving sound data.

With reference to FIGS. 3A-3C and 3F, a schematic explanation will be made on a reproducing operation of the sound reproducing system according to the second variation of the first embodiment which comprises the portable terminal units 1*a*, 1*b* and 1*e*.

That is, in the portable terminal units 1*a*, 1*b* and 1*e*, data illustrated in FIG. 3B, FIG. 3C and FIG. 3F are respectively received in a manner similar to the way mentioned above, and sound corresponding to the data is reproduced.

Also, image is displayed in each of the portable terminal units 1*a*, 1*b* and 1*e*, in a manner similar to the way of image reproduction in the first embodiment mentioned above with respect to FIG. 1.

In this way, it becomes possible to reproduce stereo sound having good low frequency characteristics for listener(s) 5, while displaying images including moving pictures at the same time.

It is also possible to reproduce stereo sound having good low frequency characteristics for listener(s) 5 only by receiving sound data.

With reference to FIGS. 3A-3C, a schematic explanation will be made on a reproducing operation of the sound reproducing system according to the third variation of the first embodiment which comprises the portable terminal units 1*a* and 1*b*.

That is, in the portable terminal units 1*a* and 1*b*, data illustrated in FIG. 3B and FIG. 3C are respectively received in a manner similar to the way mentioned above, and sound corresponding to the data is reproduced.

Also, image is displayed in each of the portable terminal units 1*a* and 1*b*, in a manner similar to the way of image reproduction in the first embodiment mentioned above with respect to FIG. 1.

In this way, it becomes possible to reproduce stereo sound for listener(s) 5, while displaying images including moving pictures at the same time.

It is also possible to reproduce stereo sound for listener(s) 5 only by receiving sound data.

A portable terminal unit is a kind of device which is always carried with a person when he or she goes out. Therefore, according to the present invention, even in outside the home or office, it becomes possible to easily reproduce stereo sound and surround sound while simultaneously displaying an image including a moving picture. Further, it is possible to realize an easy home theater having a simple structure.

Figure 4:
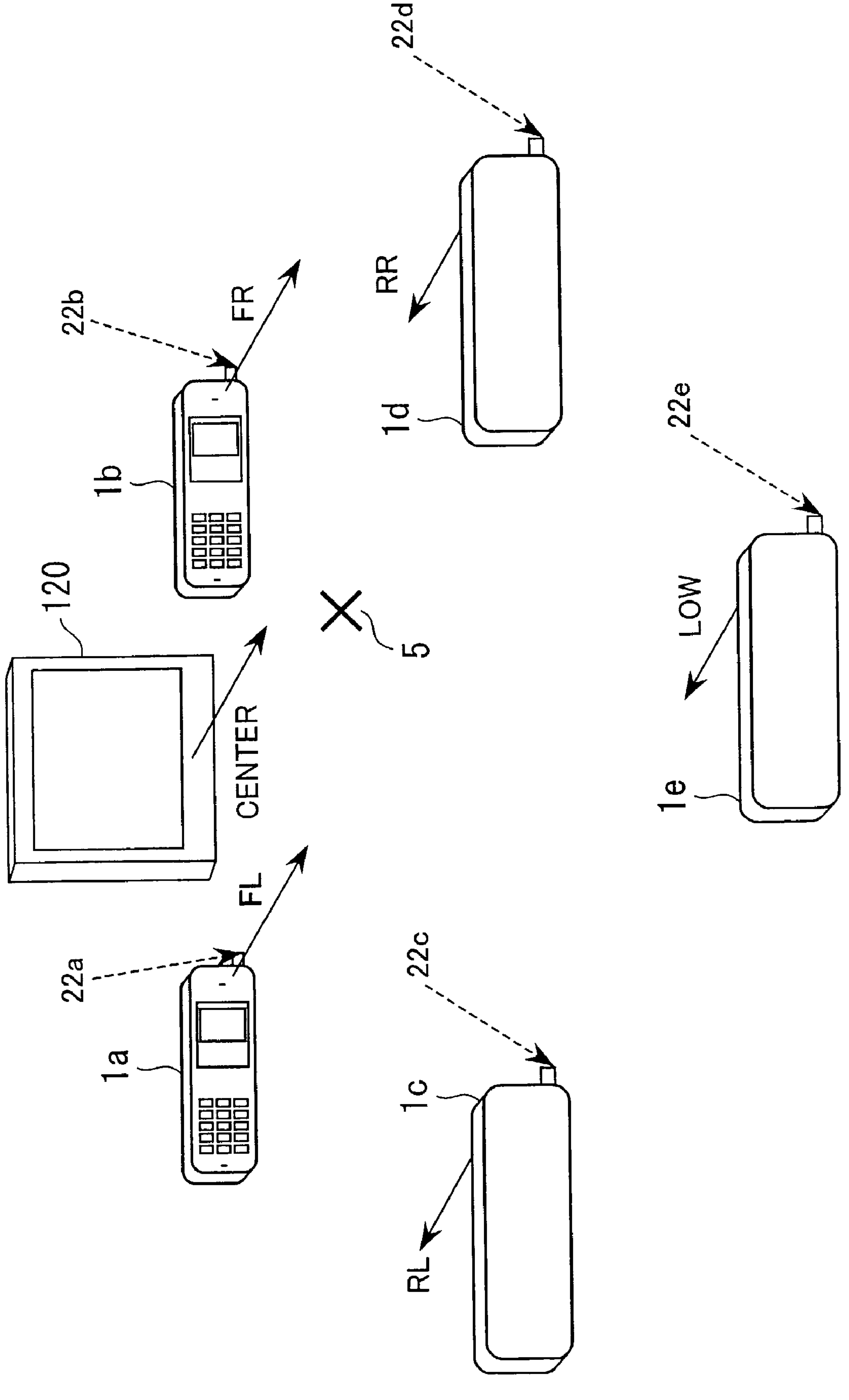
FIG. 4 is an illustrative view showing a schematic structure of a sound reproducing system of portable terminal units according to a second embodiment of the present invention.

FIG. 4 is an illustration showing a schematic structure of a sound reproducing system of portable terminal units according to the second embodiment of the present invention.

As shown in FIG. 4, the sound reproducing system of portable terminal units according to the second embodiment has a structure in which a television set (TV) 120 is added to the sound reproducing system of the first embodiment. In the television set 120 disposed approximately between a portable terminal unit 1*a* and a portable terminal unit 1*b*, center sound data and image data are received and reproduced.

The television set 120 may have a function of a high frequency center unit, or may have a function of a sound center for vocals and speeches.

It is also possible to display the same or different images in a part of or all of the screens of the portable terminal units 1*a*, 1*b*, 1*c*, 1*d* and 1*e*, and also in the television set 120.

An explanation will now be made on schematic structures of the sound reproducing systems according to the first through third variations of the second embodiment. Each of the sound reproducing systems according to the first through third variations of the second embodiment has a television set 120 in addition to the structure of respective one of the first through third variations of the first embodiment shown in FIG. 1.

In the sound reproducing systems according to the first through third variations of the second embodiment, the television set 120 may reproduce low frequency range sound LOW, in place of the center sound.

An explanation will now be made on a schematic structure of the sound reproducing system according to the fourth variation of the second embodiment. In the sound reproducing system according to the fourth variation of the second embodiment, when the television set 120 can reproduce stereophonic sound, the portable terminal units 1*a* and 1*b* are omitted from the structure according to the second embodiment of the present invention shown in FIG. 4. Therefore, the sound reproducing system according to the fourth variation of the second embodiment comprises a reduced number of portable terminal units 1*c*, 1*d* and 1*e*, and the television set 120. These portable terminal units 1*c*, 1*d* and 1*e* and the television set 120 can receive sound data and image data, and can reproduce surround sound having good low frequency characteristics together with display of image.

An explanation will now be made on a schematic structure of the sound reproducing system according to the fifth variation of the second embodiment. In the sound reproducing system according to the fifth variation of the second embodiment, when the television set 120 can reproduce stereophonic sound, the portable terminal units 1*a*, 1*b* and 1*e* are omitted from the structure according to the second embodiment of the present invention shown in FIG. 4. Therefore, the sound reproducing system according to the fifth variation of the second embodiment comprises a reduced number of portable terminal units 1*c* and 1*d*, and the television set 120. These portable terminal units 1*c* and 1*d* and the television set 120 can receive sound data and image data, and can reproduce surround sound together with display of image.

Figures 5, 6:
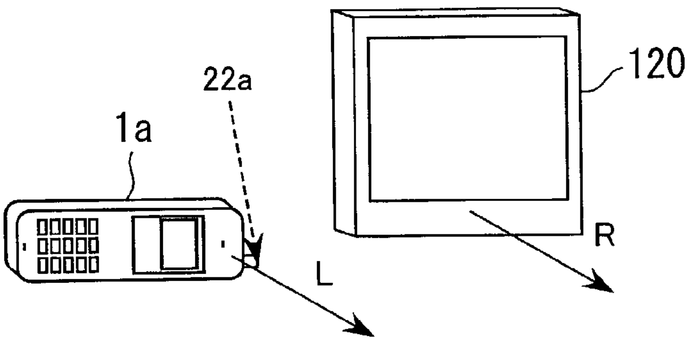
FIG. 5 is an illustrative view showing a schematic structure of a sound reproducing system of portable terminal units according to a sixth variation of the second embodiment of the present invention.
FIG. 6 is a schematic sequence diagram illustrating various data concerning an operation of a television set in the sound reproducing system according to the second embodiment of the present invention shown in FIG. 4.

FIG. 5 is an illustration showing a schematic structure of a sound reproducing system of portable terminal units according to the sixth variation of the second embodiment of the present invention.

As shown in FIG. 5, the sound reproducing system according to the sixth variation of the second embodiment comprises a portable terminal unit 1*a*, and the television set 120. These portable terminal units 1*a* and the television set 120 are disposed adjacently, and can reproduce stereophonic sound and image.

That is, among the portable terminal units 1*a* and the television set 120 disposed apart from each other, the portable terminal unit 1*a* receives and reproduces left sound L of the stereophonic sound, and the television set 120 receives and reproduces right sound R of the stereophonic sound and image.

It is possible to display the same or different image on the screens of both the portable terminal unit 1*a* and the television set 120. It is also possible that image is displayed only by the television set 120, and the portable terminal unit 1*a* is used only for reproducing sound.

FIG. 6 is a schematic illustration of various data concerning an operation of the television set 120 in the sound reproducing system according to the second embodiment of the present invention shown in FIG. 4.

A structure of the multimedia data delivered by a data delivery service and the like and processing of data in the portable terminal units 1*a*, 1*b*, 1*c*, 1*d* and 1*e* are the same as those of the first embodiment of FIG. 1 described above with reference to FIG. 3.

The reproducing operation of the sound reproducing systems according to the second embodiment and the first through third variation of the second embodiment corresponds to the reproducing operation of the sound reproducing systems according to the first embodiment and the first through third variation of the first embodiment, respectively, in addition to the reproducing operation of the television set 120.

As shown in FIG. 6, in the television set 120, sound data of high frequency range HIGH as sound center and image data shown in FIG. 3A are received, and the high frequency sound HIGH is reproduced as TV-OUT and image is displayed on a screen.

In this way, by using five the portable terminal units 1*a*, 1*b*, 1*c*, 1*d* and 1*e* and the television set 120, it is possible to easily constitute a stereophonic sound reproducing system including image display. Thereby, it is possible to obtain easy home theater system providing the feeling of being at a live performance.

It is also possible to display the same or respective image in a part of or all of the screens of the portable terminal units 1*a*, 1*b*, 1*c*, 1*d* and 1*e* and of the television set 120. It is possible to supply the image data for displaying image in the plurality of portable terminal units and in the television set, for example, from the data delivery service. Also, the image displayed in the plurality of portable terminal units and in the television set may be moving picture.

By using the above-mentioned structures, it is possible to supplement or assist performance of the portable terminal units and also to utilize a picture screen having a large size. Further, while watching and listening to a usual TV program, it is possible by the portable terminal units to receive and reproduce sound data of surround sound which is synchronized with the TV program and which is supplied from a dedicated service provider.

With reference to FIGS. 3A, 3D, 3E and 3F and FIG. 6, an explanation will now be made on a reproducing operation of the sound reproducing system according to the fourth variation of the second embodiment, which comprises portable terminal units 1*c*, 1*d* and 1*e* and the television set 120.

In the sound reproducing system according to the fourth variation of the second embodiment, portable terminal units 1*c*, 1*d* and 1*e* receive and reproduce sound data shown in FIG. 3D, 3E and 3E, respectively.

Also, the television set 120 receives surround sound data FL and FR and image data shown in FIG. 3A. The television set 120 reproduces sound FL and FR as TV-OUT, and displays an image on the screen.

In this way, according to this structure, it is possible to reduce the number of portable terminal units, and to reproduce surround sound having good low frequency characteristics while displaying an image including a moving picture. Therefore, it becomes possible to realize an easy home theater system.

With reference to FIGS. 3A, 3D and 3E and FIG. 6, an explanation will now be made on a reproducing operation of the sound reproducing system according to the fifth variation of the second embodiment, which comprises portable terminal units 1*c* and 1*d* and the television set 120.

In the sound reproducing system according to the fifth variation of the second embodiment, portable terminal units 1*c* and 1*d* receive and reproduce sound data shown in FIG. 3D and 3E, respectively.

Also, as shown in FIG. 6, the television set 120 receives surround sound data FL and FR and image data shown in FIG. 3A. The television set 120 reproduces sound FL and FR as TV-OUT, and displays an image on the screen.

In this way, according to this structure, it is possible to reduce the number of portable terminal units, and to reproduce surround sound while displaying an image including a moving picture. Therefore, it becomes possible to realize an easy home theater system.

With reference to FIGS. 3A and 3B and FIG. 6, an explanation will now be made on a reproducing operation of the sound reproducing system according to the sixth variation of the second embodiment, which comprises the portable terminal unit 1*a* and the television set 120.

In the sound reproducing system according to the sixth variation of the second embodiment, the portable terminal unit 1*a* receives and reproduces sound data shown in FIG. 3B.

Also, as shown in FIG. 6, the television set 120 receives sound data R and image data shown in FIG. 3A. The television set 120 reproduces sound R as TV-OUT, and displays an image on the screen.

In this way, by only using one portable terminal unit 1*a* and the television set 120, it is possible to constitute a reproducing system for stereophonic sound and image. Therefore, it becomes possible to supplement or assist performance of the portable terminal unit and also to utilize a picture screen having a large size. Further, while watching and listening to a usual TV program, it is possible by the portable terminal unit to receive and reproduce sound data of surround sound which is synchronized with the TV program and which is supplied from a dedicated service provider.

Figure 7:
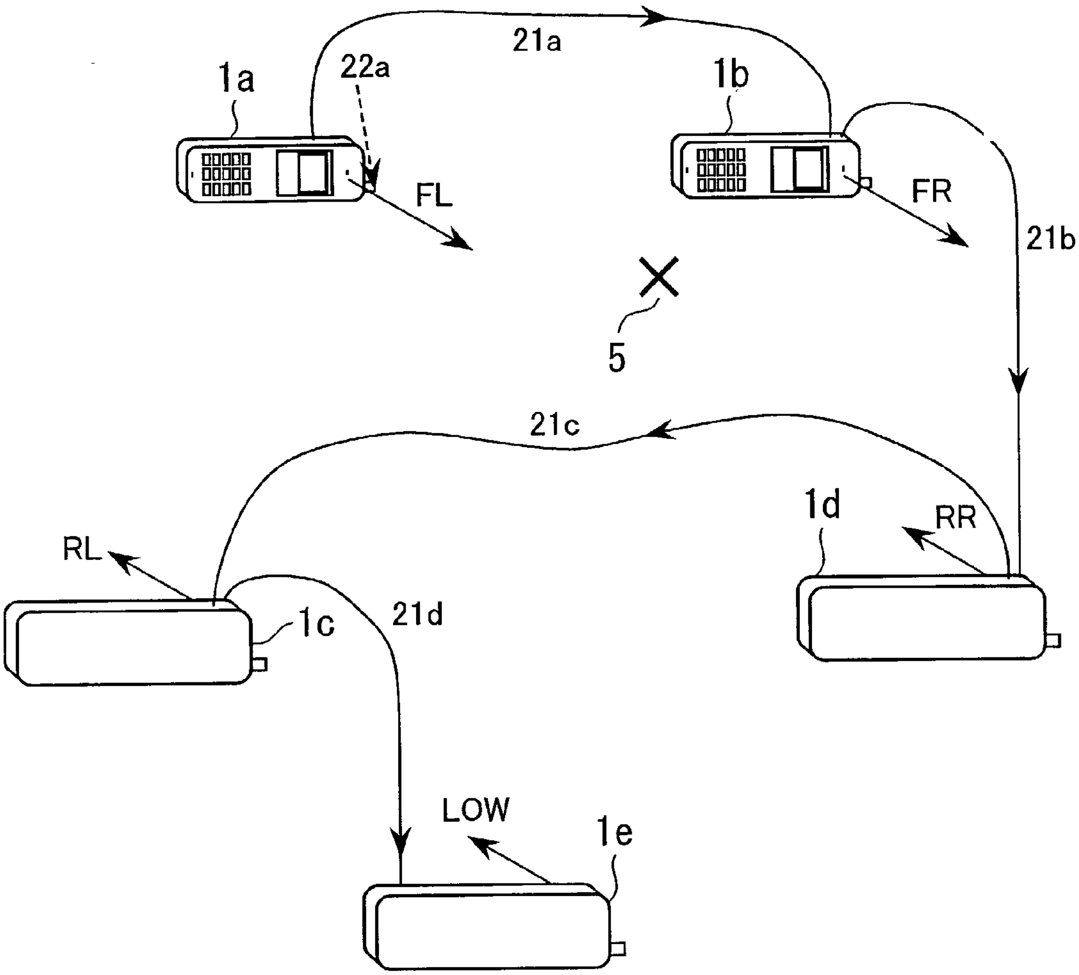
FIG. 7 is an illustrative view showing a schematic structure of a sound reproducing system of portable terminal units according to a third embodiment of the present invention and shows an example of a sound reproducing system in which portable terminal units are serially coupled together.

FIG. 7 is an illustration showing a schematic structure of a sound reproducing system of portable terminal units according to the third embodiment of the present invention. FIG. 7 shows an example of a sound reproducing system in which portable terminal units are serially coupled together.

As shown in FIG. 7, the sound reproducing system of portable terminal units according to the third embodiment has a structure comprising five portable terminal units 1*a*, 1*b*, 1*c*, 1*d* and 1*e* which are disposed around a listener or listeners 5 and which reproduce surround sound. Only by using the portable terminal unit 1*a*, surround sound data FL, FR, RL and RR, sound data of low frequency sound LOW and high frequency sound HIGH, and image data is received via radio waves 22*a*. From the portable terminal unit 1*a*, surround sound data FR, RL and RR, sound data of low frequency sound LOW and high frequency sound HIGH, and image data are sequentially transmitted, via cables 21*a*, 21*b*, 21*c* and 21*d*, to the portable terminal units 1*b*, 1*d*, 1*c* and 1*e*.

When the portable terminal unit 1*e* which reproduces LOW sound has superior low frequency characteristics, it is possible to realize sound reproduction having good low frequency sound.

Also, in place of the portable terminal unit 1*e*, it is possible to couple an external loudspeaker to the portable terminal unit 1*c* and to reproduce, by the external loudspeaker, LOW sound received from the portable terminal unit 1*c*. Thereby, it becomes possible to supplement or assist performance of the portable terminal units, and to advantageously realize listening of stereophonic sound and surround sound having good low frequency characteristics.

In this case, it is also possible to insert an amplifier between the portable terminal unit 1*c* and the external loudspeaker. Thereby, it becomes possible to realize surround sound having superior characteristics in a low frequency range.

An explanation will now be made on a schematic structure of a sound reproducing system as a first variation of the third embodiment. The sound reproducing system according to the first variation of the third embodiment has a structure in which the portable terminal unit 1*e* is omitted from the structure of the third embodiment shown in FIG. 7, and therefore the number of the portable terminal units is decreased to four (4). That is, the sound reproducing system according to the first variation of the third embodiment comprises the portable terminal units 1*a*, 1*b*, 1*d* and 1*c* serially coupled together. Radio waves are received by the one of the four portable terminal units 1*a*, 1*b*, 1*c* and 1*d*, for example, radio waves 22*a* are received by the portable terminal unit 1*a*. Data obtained in the portable terminal unit 1*a* from the radio waves 22*a* are sequentially transmitted to other portable terminal units. Thereby, surround sound is reproduced by the portable terminal units 1*a*, 1*b*, 1*c* and 1*d*.

In this case, when compared with the third embodiment, the portable terminal unit 1*a*, for example, receives, via the radio waves 22*a*, sound data of the sound FL, FR, RL, RR and high frequency sound HIGH and image data, except low frequency sound LOW.

An explanation will now be made on a schematic structure of a sound reproducing system as a second variation of the third embodiment. The sound reproducing system according to the second variation of the third embodiment has a structure in which the portable terminal units 1*c* and 1*d* are omitted from the structure of the third embodiment shown in FIG. 7, and therefore the number of the portable terminal units is further decreased to three (3). That is, the sound reproducing system according to the second variation of the third embodiment comprises the portable terminal units 1*a*, 1*b* and 1*e* serially coupled together. Radio waves are received by the one of the four portable terminal units 1*a*, 1*b* and 1*e*, for example, radio waves 22*a* are received by the portable terminal unit 1*a*. Data obtained in the portable terminal unit 1*a* from the radio waves 22*a* are sequentially transmitted to other portable terminal units. Thereby, stereophonic sound including low frequency sound is reproduced by the portable terminal units 1*a*, 1*b* and 1*e*.

When the portable terminal unit 1*e* which reproduces LOW sound has superior low frequency characteristics, it is possible to realize sound reproduction having good low frequency sound.

Also, in place of the portable terminal unit 1*e*, it is possible to couple an external loudspeaker to the portable terminal unit 1*b* and to reproduce, by the external loudspeaker, LOW sound received from the portable terminal unit 1*b*. Thereby, it becomes possible to supplement or assist performance of the portable terminal units, and to advantageously realize listening of stereophonic sound having good low frequency characteristics.

In this case, it is also possible to insert an amplifier between the portable terminal unit 1*b* and the external loudspeaker. Thereby, it becomes possible to realize stereophonic sound having superior characteristics in low frequency range.

In this case, when compared with the third embodiment, the portable terminal unit 1*a*, for example, receives, via the radio waves 22*a*, sound data of sound FL, sound FR and low frequency sound LOW, except surround sound data of the sound RL and sound RR. It is also possible to receive sound L and sound R, in place of sound FL and sound FR.

An explanation will now be made on a schematic structure of a sound reproducing system as a third variation of the third embodiment. The sound reproducing system according to the third variation of the third embodiment has a structure in which the portable terminal units 1*c*, 1*d* and 1*e* are omitted from the structure of the third embodiment shown in FIG. 7, and therefore the number of the portable terminal units is further decreased to two (2). That is, the sound reproducing system according to the third variation of the third embodiment comprises the portable terminal units 1*a* and 1*b* which are serially coupled together. Radio waves are received by the one of the portable terminal units 1*a* and 1*b*, for example, radio waves 22*a* are received by the portable terminal unit 1*a*. Data obtained in the portable terminal unit 1*a* from the radio waves 22*a* are sequentially transmitted to another portable terminal unit 1*b*. Thereby, stereophonic sound is reproduced by the portable terminal units 1*a* and 1*b*.

In this case, when compared with the third embodiment, the portable terminal unit 1*a*, for example, receives, via the radio waves 22*a*, sound data of sound FL and sound FR, except sound data of the low frequency sound LOW and surround sound data of the sound RL and sound RR. It is also possible to receive sound L and sound R, in place of sound FL and sound FR.

Figure 8:
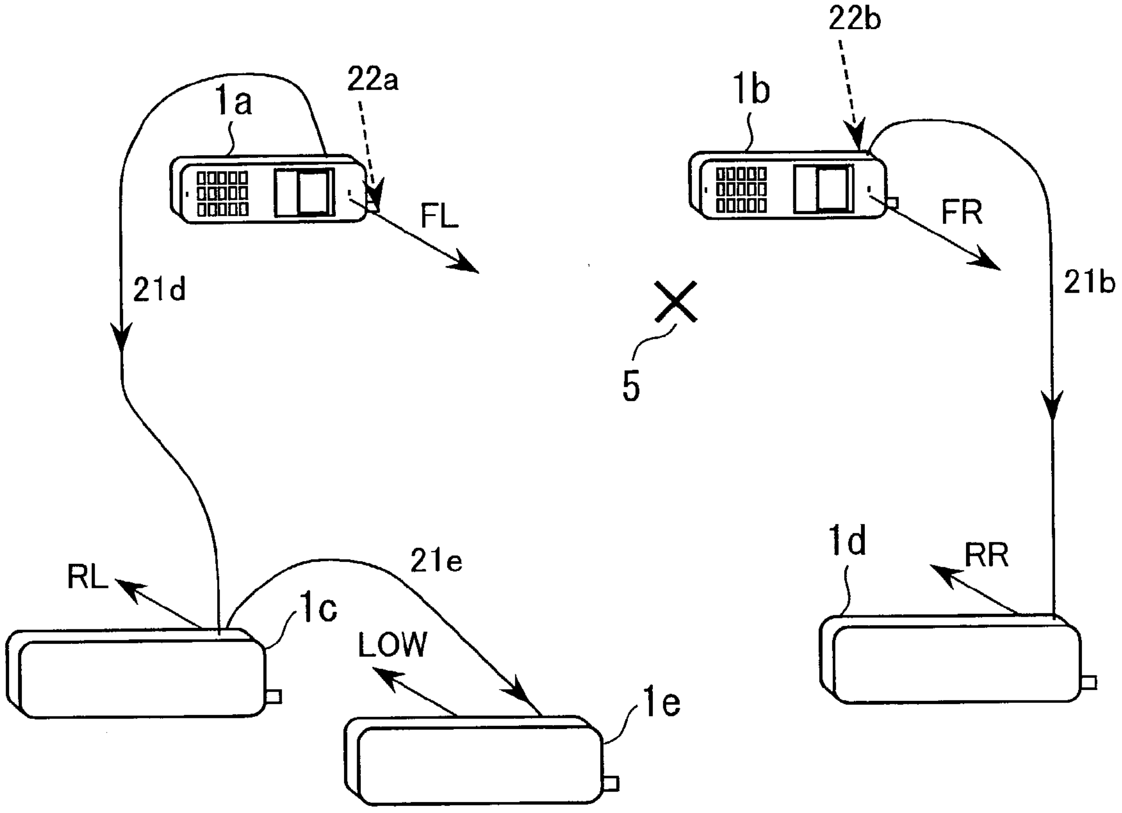
FIG. 8 is an illustrative view showing a schematic structure of a sound reproducing system of portable terminal units according to a fourth variation of the third embodiment shown in FIG. 7.

FIG. 8 is an illustration showing a schematic structure of a sound reproducing system of portable terminal units according to a fourth variation of the third embodiment shown in FIG. 7.

As shown in FIG. 8, the sound reproducing system of portable terminal units according to the fourth variation of the third embodiment has a structure comprising five portable terminal units 1*a*, 1*b*, 1*c*, 1*d* and 1*e* which are disposed around a listener or listeners 5 and which reproduce surround sound. The portable terminal unit 1*a* receives, via radio waves 22*a*, sound data FL and RL and sound data of low frequency sound LOW. The portable terminal unit 1*b* receives sound data FR and RR. From the portable terminal unit 1*a*, sound data RL and sound data of low frequency sound LOW are sequentially transmitted or transferred, via cables 21*d* and 21*e*, to the portable terminal units 1*c* and 1*e*. Also, from the portable terminal unit 1*b*, sound data RR is transmitted, via a cable 21*b*, to the portable terminal unit 1*d*. By this structure, transmission routes from portable terminal unit(s) to other portable terminal unit(s) are increased, and it becomes possible to increase variation of combination of the portable terminal units. Also, it is possible to decrease data processing load per one portable terminal unit.

It is also possible to connect the portable terminal unit 1*a* to a channel of a data delivery service which channel transmits only sound data of the sound FL and the sound RL and the low frequency sound LOW, and to connect the portable terminal unit 1*b* to a channel of a data delivery service which channel transmits only sound data of the sound FR and the sound RR.

In addition to the above-mentioned structures, it is possible to serially couple more than two other portable terminal units to a portable terminal unit which receives data from a data delivery service. Also, it is possible to use a structure in which no other portable terminal unit is coupled to the portable terminal unit which receives data from a data delivery service. Further, the number of the portable terminal units which receive data from the data delivery service can be three or more.

FIG. 9 is a block circuit diagram showing a schematic structure of each of the portable terminal units 1*a*, 1*b*, 1*c*, 1*d* and 1*e* which are shown in FIG. 7 and FIG. 8 and which may have the same structure.

As shown in FIG. 9, each of the portable terminal units 1*a*, 1*b*, 1*c*, 1*d* and 1*e* has the same structure as that shown in FIG. 2, except that the structure of FIG. 9 has a signal supply terminal 112A and a signal receiving terminal 112B which are coupled with the sound data reproducing portion 108. These signal supply terminals 112A and signal receiving terminals 112B are appropriately and operatively coupled with the cables 21*a*, 21*b*, 21*c* and 21*d*.

For example, in FIG. 7, the cable 21*a* is coupled between the signal supply terminal 112A of the portable terminal unit, 1*a* and the signal receiving terminal 112B of the portable terminal unit 1*b*. The cable 21*b* is coupled between the signal supply terminal 112A of the portable terminal unit 1*b* and the signal receiving terminal 112B of the portable terminal unit 1*d*. The cable 21*c* is coupled between the signal supply terminal 112A of the portable terminal unit 1d and the signal receiving terminal 112B of the portable terminal unit 1*c*. The cable 21*d* is coupled between the signal supply terminal 112A of the portable terminal unit 1*c* and the signal receiving terminal 112B of the portable terminal unit 1*e*.

FIG. 10A-FIG. 10J are schematic illustrations of various data used in the sound reproducing system according to the third embodiment of the present invention shown in FIG. 7.

It is assumed that multimedia data as shown in FIG. 10A are delivered from data delivery service and the like. The multimedia data includes, for example, sound data of sound FL (front-left), sound FR(front-right), sound RL(rear-left), sound RR(rear-right), sound L(left), sound R(right), low frequency range sound LOW, high, frequency range sound HIGH, image data, and the like.

As shown in FIG. 10B, in the portable terminal unit 1*a*, sound data of sound FL, FR, RL, RR and LOW and also image data in the multimedia data shown in FIG. 10A is received, via radio waves 22*a*.

As shown in FIG. 10C, by using, for example, the sound data reproducing portion 108, the sound data of the sound FL and image data are extracted from the received data and decoded. Thereby, the sound FL is reproduced from the audio loudspeaker 109. Also, an image is displayed on a screen of the portable terminal unit 1*a* based on the image data.

As shown in FIG. 10D, in the sound data reproducing portion 108 of the portable terminal unit 1*a*, the sound data of the sound FR, RL, RR and LOW and the image data are extracted from the received data, and are transferred from the portable terminal unit 1*a* to the portable terminal unit 1*b* via a cable 21*a*.

Similarly, as shown in FIG. 10E and FIG. 10F, in the portable terminal unit 1*b*, sound data of sound FR and the image data from the received data are reproduced. Also, the sound data of the sound RL, RR and LOW and the image data are transferred from the portable terminal unit 1*b* to the portable terminal unit 1*d* via a cable 21*b*.

Similarly, as shown in FIG. 10G and FIG. 10H, in the portable terminal unit 1*d*, sound data of sound RR and the image data from the received data are reproduced. Also, the sound data of the sound RL and LOW and the image data are transferred from the portable terminal unit 1*d* to the portable terminal unit 1*c* via a cable 21*c*.

Similarly, as shown in FIG. 10I and FIG. 10J, in the portable terminal unit 1*c*, sound data of sound RL and the image data from the received data are reproduced. Also, the sound data of the sound LOW and the image data are transferred from the portable terminal unit 1*c* to the portable terminal unit 1*e* via a cable 21*d*.

In the portable terminal unit 1*e*, the sound data LOW and the image data from the received data are reproduced.

In this way, according to this embodiment, it is possible to connect the sound reproducing system with the data delivery service via only one line, and to couple other portable terminal units serially with the portable terminal unit which receives data from the data delivery service. Therefore, it becomes possible to avoid congestion of communication lines, and to listen to the surround sound having good low frequency characteristics while saving costs of communication.

In case the images are not displayed on the screen of the portable terminal units 1*a*, 1*b*, 1*c*, 1*d* and 1*e*, it is not necessary to receive image data from the data delivery service, and only sound data is received therefrom. With respect to the display of image, similar way can be used to that of the first embodiment.

With reference to FIGS. 10A, 10C, 10E, 10I and 10G, a schematic explanation will be made on a reproducing operation of the sound reproducing system according to the first variation of the third embodiment which comprises the portable terminal units 1*a*, 1*b*, 1*c* and 1*d* serially coupled together.

That is, in the portable terminal units 1*a*, 1*b*, 1*c* and 1*d*, data illustrated in FIG. 10C, FIG. 10E, FIG. 10I and FIG. 10G are respectively reproduced in a manner similar to the way mentioned above. Also, image is displayed, for example, in each of the portable terminal units 1*a*, 1*b*, 1*c* and 1*d*, in a manner similar to the way of image reproduction in the first embodiment mentioned above with respect to FIG. 1.

In this way, it becomes possible to reproduce surround sound for listener(s) 5, while displaying images including moving pictures at the same time.

When an image is not displayed in each of the portable terminal units 1*a*, 1*b*, 1*c* and 1*d*, it is possible to reproduce surround sound for listener(s) 5 only by receiving sound data and without receiving image data.

With reference to FIGS. 10A, 10C, 10E and 10J, a schematic explanation will be made on a reproducing operation of the sound reproducing system according to the second variation of the third embodiment which comprises the portable terminal units 1*a*, 1*b* and 1*e* serially coupled together.

That is, in the portable terminal units 1*a*, 1*b* and 1*e*, data illustrated in FIG. 10C, FIG. 10E and FIG. 10J are respectively received in a manner similar to the way mentioned above, and sound corresponding to the data is reproduced. Also, image is displayed in each of the portable terminal units 1*a*, 1*b* and 1*e*, in a manner similar to the way of image reproduction in the first embodiment mentioned above with respect to FIG. 1.

In this way, it becomes possible to reproduce stereo sound having good low frequency characteristics for listener(s) 5, while displaying images including moving pictures at the same time.

When an image is not displayed in each of the screen of the portable terminal units 1*a*, 1*b* and 1*e*, it is possible to receive only sound data without receiving image data.

With reference to FIGS. 10A, 10C and 10E, a schematic explanation will be made on a reproducing operation of the sound reproducing system according to the third variation of the third embodiment which comprises the portable terminal units 1*a* and 1*b* serially coupled together.

That is, in the portable terminal units 1*a* and 1*b*, data illustrated in FIG. 10C and FIG. 10E are respectively received in a manner similar to the way mentioned above, and sound corresponding to the data is reproduced. Also, image is displayed in each of the portable terminal units 1*a* and 1*b*, in a manner similar to the way of image reproduction in the first embodiment mentioned above with respect to FIG. 1.

In this way, it becomes possible to reproduce stereo sound for listener(s) 5, while displaying images including moving pictures at the same time.

When an image is not displayed in the screen of each of the portable terminal units 1*a* and 1*b*, it is possible to receive only sound data without receiving image data.

FIG. 11A-FIG. 11I are schematic illustrations of various data used in the sound reproducing system according to the fourth variation of the third embodiment of the present invention shown in FIG. 8.

It is assumed that multimedia data as shown in FIG. 11A are delivered from data delivery service and the like. The multimedia data includes, for example, sound data of sound FL (front-left), sound FR(front-right), sound RL(rear-left), sound RR(rear-right), sound L(1eft), sound R(right), low frequency range sound LOW, high frequency range sound HIGH, image data, and the like.

As shown in FIG. 11B, in the portable terminal unit 1*a*, sound data of sound FL, RL and LOW and also image data in the multimedia data shown in FIG. 11A is received, via radio waves 22*a*.

As shown in FIG. 11C, by using, for example, the sound data reproducing portion 108, the sound data of the sound FL and image data are extracted from the received data and decoded. Thereby, the sound FL is reproduced from the audio loudspeaker 109. Also, an image is displayed on the screen of the portable terminal unit 1*a* based on the image data.

As shown in FIG. 11D, in the sound data reproducing portion 108 of the portable terminal unit 1*a*, the sound data of the sound RL and LOW and the image data are extracted from the received data, and are transferred from the portable terminal unit 1*a* to the portable terminal unit 1*c* via a cable 21*d*.

Similarly, as shown in FIG. 11E and FIG. 11I, in the portable terminal unit 1*c*, sound data of sound RL and the image data from the received data are reproduced. Also, the sound data of the sound LOW and the image data are transferred from the portable terminal unit 1*c* to the portable terminal unit 1*e* via a cable 21*e*.

In the portable terminal unit 1*e*, the transferred sound data of the sound LOW and image data are reproduced.

As shown in FIG. 11G, in the portable terminal unit 1*b*, sound data of sound FR and RR and also image data in the multimedia data shown in FIG. 11A are received, via radio waves 22*b*.

Similarly, in the portable terminal unit 1*b*, the sound data of sound FR and the image data from the received data are reproduced. Also, the sound data of the sound RR and the image data are transferred from the portable terminal unit 1*b* to the portable terminal unit 1*d* via a cable 21*b*.

In the portable terminal unit 1*d*, the sound data RR and the image data from the transferred data are reproduced.

In this way, according to this variation, it is possible to connect the sound reproducing system with the data delivery service via a small number of lines, and to couple other portable terminal units serially with the portable terminal units which receive data from the data delivery service. Therefore, it becomes possible to avoid congestion of communication lines, and to listen to the surround sound having good low frequency characteristics while displaying an image including a moving picture.

In case the images are not displayed on the screen of the portable terminal units 1*a*, 1*b*, 1*c*, 1*d* and 1*e*, it is not necessary to receive image data from the data delivery service, and only sound data is received therefrom.

Figure 12:
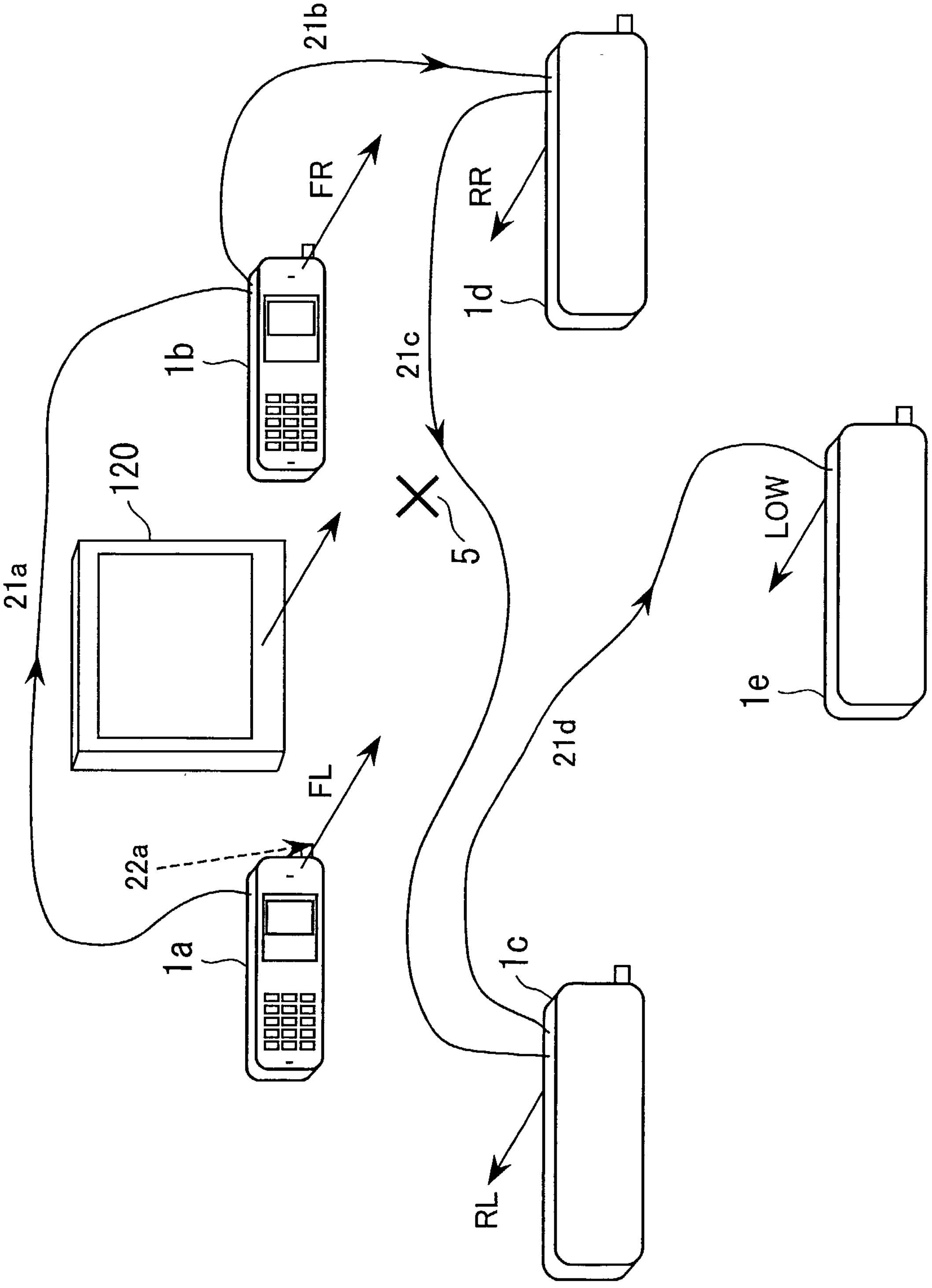
FIG. 12 is an illustrative view showing a schematic structure of a sound reproducing system of portable terminal units according to a fourth embodiment of the present invention and shows another example of a sound reproducing system in which portable terminal units are serially coupled.

FIG. 12 is an illustration showing a schematic structure of a sound reproducing system of portable terminal units according to the fourth embodiment of the present invention. FIG. 12 shows another example of a sound reproducing system in which portable terminal units are serially coupled.

As shown in FIG. 12, the sound reproducing system of portable terminal units according to the fourth embodiment has a structure in which a television set (TV) 120 is added to the sound reproducing system having serially coupled portable terminal units 1*a*, 1*b*, 1*c*, 1*d* and 1*e*. A structure of the sound reproducing system having serially coupled portable terminal units 1*a*, 1*b*, 1*c*, 1*d* and 1*e* may be the same as that of the sound reproducing system shown in FIG. 7. Also, a structure concerning the television set 120 may be the same as that of the television set 120 shown in FIG. 4. The television set 120 in the system of FIG. 12 reproduces high frequency sound HIGH and image data. The image data can also be received from radio waves for TV broadcasting. In such case, the data delivery service distributes data which is synchronized with the TV broadcasting.

In this case, it is possible for the television set 120 to reproduce a television (TV) program which is being broadcast at real time, and for the portable terminal units to reproduce data which supplements the TV program and which is delivered in synchronism with the TV program.

An explanation will now be made on schematic structures of the sound reproducing systems according to the first through fourth variations of the fourth embodiment shown in FIG. 12. Each of the sound reproducing systems according to the first through fourth variations of the fourth embodiment has a television set 120 in addition to the structure of respective one of the first through fourth variations of the third embodiment shown in FIG. 7 and FIG. 8. In this case, in the sound reproducing systems according to the first variation, the third and fourth variations of the fourth embodiment, the television set 120 may reproduce low frequency range sound LOW, in place of the center sound.

Also, with reference to FIG. 12, an explanation will now be made on a schematic structure of the sound reproducing system according to the fifth variation of the fourth embodiment. In the sound reproducing system according to the fifth variation of the fourth embodiment, when the television set 120 can reproduce stereophonic sound, the portable terminal units 1*a* and 1*b* are omitted from the structure according to the fourth embodiment of the present invention shown in FIG. 12. Therefore, the sound reproducing system according to the fifth variation of the fourth embodiment comprises a reduced number of portable terminal units 1*c*, 1*d* and 1*e*, and the television set 120. These portable terminal units 1*c*, 1*d* and 1*e* and the television set 120 can reproduce surround sound having good low frequency characteristics with image. In this case, the portable terminal unit 1*c* receives the radio waves 22*a*, and sequentially transfers received data to other portable terminal units 1*d* and 1*e*.

Further, with reference to FIG. 12, an explanation will now be made on a schematic structure of the sound reproducing system according to the sixth variation of the fourth embodiment. In the sound reproducing system according to the sixth variation of the fourth embodiment, when the television set 120 can reproduce stereophonic sound, the portable terminal units 1*a*, 1*b* and 1*e* are omitted from the structure according to the fourth embodiment of the present invention shown in FIG. 12. Therefore, the sound reproducing system according to the sixth variation of the fourth embodiment comprises a reduced number of portable terminal units 1*c* and 1*d*, and the television set 120. These portable terminal units 1*c* and 1*d* and the television set 120 can reproduce surround sound with image. In this case, the portable terminal unit 1*c* receives the radio waves 22*a*, and transfers received data to the portable terminal units 1*d*.

The reproducing operation of the sound reproducing system according to the fourth embodiment corresponds to the reproducing operation of the sound reproducing systems according to the third embodiment shown in FIG. 10, in addition to the reproducing operation of the television set 120. Therefore, detailed explanation thereof is omitted here.

Similarly, the reproducing operation of the sound reproducing system according to each of the first through fourth variations of the fourth embodiment corresponds to the reproducing operation of the sound reproducing systems according to respective one of the first through fourth variations of the third embodiment, in addition to the reproducing operation of the television set 120. Therefore, detailed explanation thereof is omitted here.

Also, similarly, the reproducing operation of the sound reproducing system according to each of the fifth and sixth variations of the fourth embodiment corresponds approximately to the reproducing operation of the sound reproducing systems according to respective one of the second and third variations of the fourth embodiment. Therefore, detailed explanation thereof is omitted here.

It is possible to display an image not only on the screen of the television set 120, but also on the screen of each of the portable terminal units. The image data may be supplied, for example, from data delivery service dedicatedly. Also, the image displayed in the plurality of portable terminal units may be the same as that displayed in the television set 120. It is further possible to display an image on each of the screen of the portable terminal units which is different from the image displayed on the screen of the television set 120 and which supplements the image displayed on the screen of the television set 120.

In this way, according to this embodiment, it is possible to connect the sound reproducing system with the data delivery service via only one line, and to couple other portable terminal units serially with the portable terminal unit which receives data from the data delivery service. Therefore, it becomes possible to avoid congestion of communication lines, and to lower costs for communication. Also, it is possible to realize a home theater system which provides a surround sound field having good low frequency sound and good high frequency sound.

Also, as another structure, the television set 120 may output sounds FL and FR, and the portable terminal units 1*c* and 1*d* may output sounds RL and RR, respectively. Thereby, it is possible to realize a home theater system having a simple structure.

FIG. 13 is a block circuit diagram showing a schematic structure of each of the portable terminal units 1*a*, 1*b*, 1*c*, 1*d* and 1*e* in the sound reproducing system having a serial structure. FIG. 13 shows a structure which is a variation of the structure shown in FIG. 9 and which is used when a delay time of data transfer between the portable terminal units is not negligible.

As shown in FIG. 13, each of the portable terminal units 1*a*, 1*b*, 1*c*, 1*d* and 1*e* has the same structure as that shown in FIG. 9, except that the structure of FIG. 13 has a signal delay portion 115 which is provided in the sound data reproducing portion 108. The signal delay portion 115 delays sound data received in the portable terminal unit for a predetermined time.

As an example, when data is transferred from the portable terminal unit 1*a* to the portable terminal unit 1*b*, the signal delay portion 115 of the sound data reproducing portion 108 in the portable terminal unit 1*a* has a transfer delay time $\tau 1$ set therein.

It is assumed that a transfer delay time from the portable terminal unit 1*a* to the portable terminal unit 1*e* is estimated to be $\tau 1a$, a transfer delay time from the portable terminal unit 1*b* to the portable terminal unit 1*e* is estimated to be $\tau 1b$, a transfer delay time from the portable terminal unit 1*c* to the portable terminal unit 1*e* is estimated to be $\tau 1c$, and a transfer delay time from the portable terminal unit 1*d* to the portable terminal unit 1*e* is estimated to be $\tau 1d$.

In such case, the transfer delay time of the signal delay portion 115 of the portable terminal unit 1*a* is set to be $\tau 1a$, the transfer delay time of the signal delay portion 115 of the portable terminal unit 1*b* is set to be $\tau 1b$, the transfer delay time of the signal delay portion 115 of the portable terminal unit 1*c* is set to be $\tau 1c$ and the transfer delay time of the signal delay portion 115 of the portable terminal unit 1*d* is set to be $\tau 1d$.

An explanation is given below concerning a reproducing operation in the sound data reproducing portion 108 in each of the portable terminal units 1*a*, 1*b*, 1*c*, 1*d* and 1*e* when the transfer delay time is not negligible.

FIGS. 14A through FIGS. 14E are flow charts showing examples of reproducing operation concerning the sound data reproducing portions 108 in the portable terminal units 1*a*, 1*b*, 1*c*, 1*d* and 1*e* shown in FIG. 13 when there is a substantial transfer signal delay between the portable terminal units.

Figure 14A:
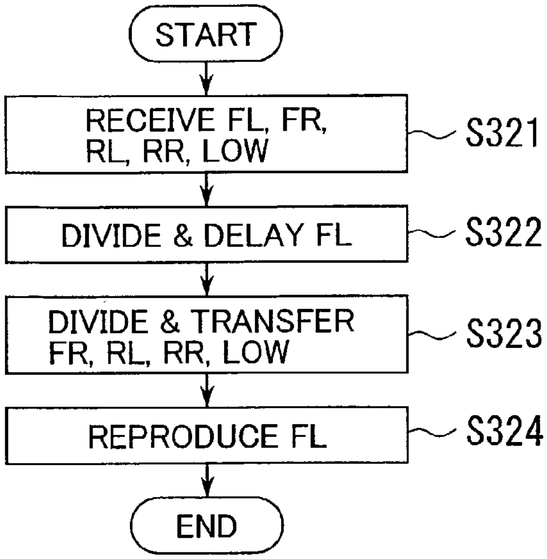
FIGS. 14A-14E are flow charts showing examples of reproducing operation concerning the sound data reproducing portions 108 in the portable terminal units 1*a*, 1*b*, 1*c*, 1*d* and 1*e* shown in FIG. 13 when there is a substantial transfer signal delay between the portable terminal units.

As shown in FIG. 14A, in step S321, the portable terminal unit 1*a* receives and demodulates radio waves from a public line to obtain sound data of sound FL, FR, RL, RR and LOW. The sound data of the sound FL, FR, RL, RR and LOW are supplied to the sound data reproducing portion 108.

In step S322, in the sound data reproducing portion 108, the sound data of the sound FL is divided from the received sound data of the sound FL, FR, RL, RR and LOW, and is delayed by the signal delay portion 115.

In step S323, the sound data of the sound FR, RL, RR and LOW other than the divided sound data of the sound FL are transferred from the sound data reproducing portion 108 of the portable terminal unit 1*a* to the sound data reproducing portion 108 of the portable terminal unit 1*b*, via the signal supply terminal 112A of the portable terminal unit 1*a*, the cable 21*a* and the signal receiving terminal 112B of the portable terminal unit 1*b*.

In step S324, the sound data of the sound FL which is delayed by the time $\tau 1a$ from the reception thereof is decoded into an analog electric signal in the sound data reproducing portion 108, and is reproduced by the audio loudspeaker 109.

Figure 14B:
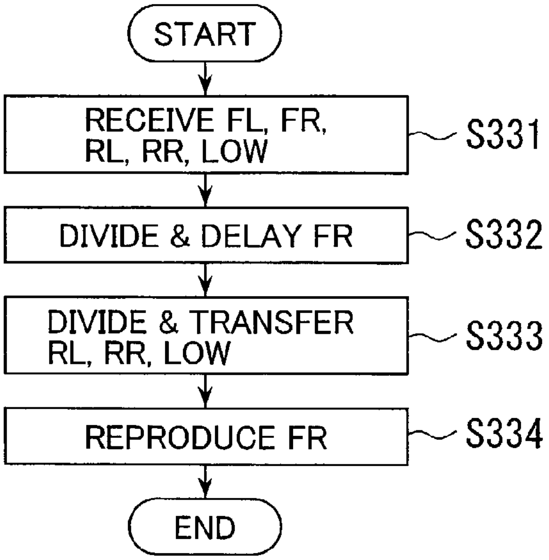

Similarly, in the portable terminal unit 1*b*, step S331 through step S334 are performed as shown in FIG. 14B. In this case, data transfer from the portable terminal unit 1*b* to the portable terminal unit 1*c* is performed via the cable 21*b*. Also, the delay time of the sound data of the sound FR is $\tau 1b$ from the reception thereof.

Figure 14C:
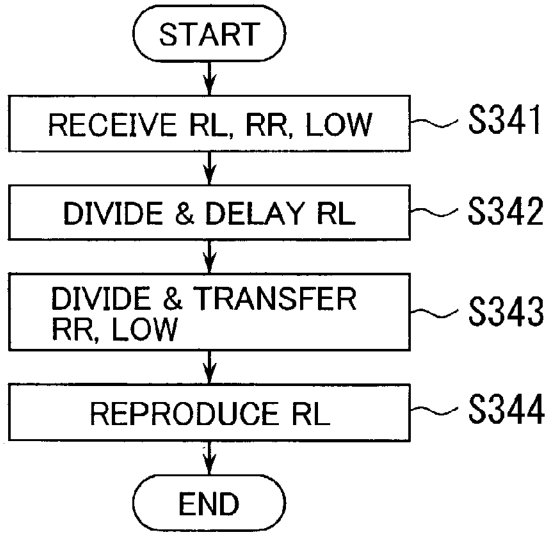

Similarly, in the portable terminal unit 1*c*, step S341 through step S344 are performed as shown in FIG. 14C. In this case, data transfer from the portable terminal unit 1*c* to the portable terminal unit 1*d* is performed via the cable 21*c*. Also, the delay time of the sound data of the sound RL is $\tau 1c$ from the reception thereof.

Figure 14D:
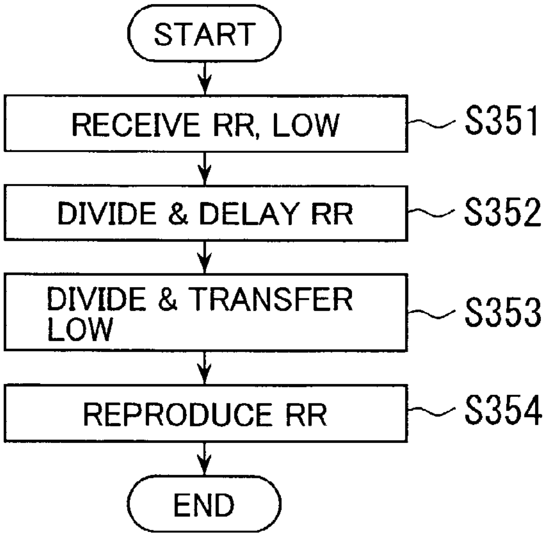

Similarly, in the portable terminal unit 1*d*, step S351 through step S354 are performed as shown in FIG. 14D. In this case, data transfer from the portable terminal unit 1*d* to the portable terminal unit 1*e* is performed via the cable 21*d*. Also, the delay time of the sound data of the sound RR is $\tau 1d$ from the reception thereof.

Figure 14E:
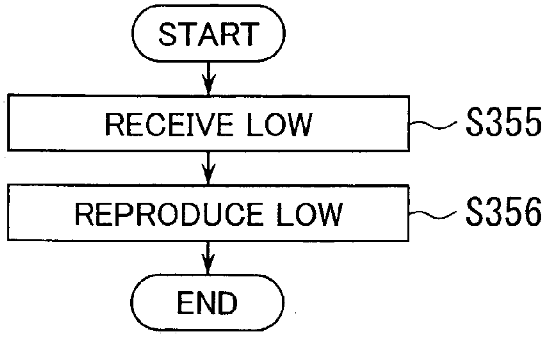

Similarly, in the portable terminal unit 1*e*, step S355 and step S356 are performed as shown in FIG. 14E. In this case, as the portable terminal unit 1*e*, it is possible to use a portable terminal unit which does not have a signal delay portion.

In this way, by delaying the start times of reproduction, it is possible to reproduce synchronized surround sound and to improve sound quality.

FIG. 15 is a sequence diagram illustrating a sound reproducing operation of the sound reproducing system which uses the portable terminal units of FIG. 13 serially coupled together.

As shown in FIG. 15, in the portable terminal unit 1*a*, the sound data of the sound FL, FR, RL, RR and LOW are received from the public line. The sound data reproducing portion 108 of the portable terminal unit 1*a* holds the sound data of the sound FL. Also, the sound data of the sound FR, RL, RR and LOW are transferred from the portable terminal unit 1*a* to the portable terminal unit 1*b*. In the sound data reproducing portion 108 of the portable terminal unit 1*b*, the sound data of the sound FR is retained, and the sound data of the sound RL, RR and LOW are transferred from the portable terminal unit 1*b* to the portable terminal unit 1*c*. In the sound data reproducing portion 108 of the portable terminal unit 1*c*, the sound data of the sound RL is retained, and the sound data of the sound RR and LOW are transferred from the portable terminal unit 1*c* to the portable terminal unit 1*d*. In the sound data reproducing portion 108 of the portable terminal unit 1*d*, the sound data of the sound RR is retained, and the sound data of the sound LOW are transferred from the portable terminal unit 1*d* to the portable terminal unit 1*e*.

In this example, the sound data reproducing portion 108 in each of the portable terminal units 1*a*, 1*b*, 1*c* and 1*d* does not reproduce the sound data immediately after the reception thereof, but reproduces the sound data after it receives a start signal as mentioned below.

In this case, in the portable terminal unit 1*e*, when receiving the sound data of the sound LOW, it is also possible to reproduce the sound LOW soon, and at the same time a start signal is transmitted from the portable terminal unit 1*e* to the portable terminal unit 1*d*.

In the portable terminal unit 1*d*, when the start signal is received, the sound RR is, reproduced from the sound data retained in the sound data reproducing portion 108, and at the same time the start signal is transmitted to the portable terminal unit 1*c*.

In the portable terminal unit 1*c*, when the start signal is received, the sound RL is reproduced from the sound data retained in the sound data reproducing portion 108, and at the same time the start signal is transmitted to the portable terminal unit 1*b*.

In the portable terminal unit 1*b*, when the start signal is received, the sound FR is reproduced from the sound data retained in the sound data reproducing portion 108, and at the same time the start signal is transmitted to the portable terminal unit 1*a*.

In the portable terminal unit 1*a*, when the start signal is received, the sound FL is reproduced from the sound data retained in the sound data reproducing portion 108.

In this way, after making preparations for reproduction, the portable terminal unit 1*e* returns the start signal to the portable terminal units 1*d*, 1*c*, 1*b* and 1*a* via the cables 21*d*, 21*c*, 21*b* and 21*a*, respectively. In response to the reception of the start signal, all the portable terminal units 1*a*, 1*b*, 1*c* and 1*d* as well as the portable terminal unit 1*e* start sound reproduction.

In the above-mentioned sound reproducing system, the start signal is transmitted from the portable terminal unit 1*e* to the portable terminal unit 1*a*, via the cables 21*d*, 21*c*, 21*b* and 212*a* serially. Therefore, there may be a case where a signal delay caused by the signal transmission time via each of the cable 21*d*, the cable 21*c*, the cable 21*b* and the cable 212*a* becomes substantially large and is not negligible. Next, with reference to FIG. 16, an explanation will be made on a variation of reproducing operations of the sound data reproducing portions 108 of the portable terminal units 1*a*, 1*b*, 1*c*, 1*d* and 1*e* in which an influence of the transmission delay of the start signal can be removed.

FIG. 16 is a sequence diagram illustrating a signal transmission delay of the start signal in the sound reproducing operation of FIG. 15. As shown in FIG. 16, it is assumed that a transmission delay time of the start signal from the portable terminal unit 1*e* to the portable terminal unit 1*a* is estimated to be τse, a transmission delay time of the start signal from the portable terminal unit 1*d* to the portable terminal unit 1*a* is estimated to be τsd, a transmission delay time of the start signal from the portable terminal unit 1*c* to the portable terminal unit 1*a* is estimated to be τsc, and a transmission delay time of the start signal from the portable terminal unit 1*b* to the portable terminal unit 1*a* is estimated to be τsb.

In such case, the transmission delay time of the signal delay portion 115 of the portable terminal unit 1*e* is set to be τ se, the transmission delay time of the signal delay portion 115 of the portable terminal unit 1*d* is set to be τsd, the transmission delay time of the signal delay portion 115 of the portable terminal unit 1*c* is set to be τsc and the transmission delay time of the signal delay portion 115 of the portable terminal unit 1*b* is set to be τsb.

An explanation is given below concerning a reproducing operation in the sound data reproducing portion 108 in each of the portable terminal units 1*a*, 1*b*, 1*c*, 1*d* and 1*e* when the transmission delay time of the start signal is not negligible.

FIGS. 17A through FIGS. 17E are flow charts showing examples of reproducing operation concerning the sound data reproducing portions 108 in the portable terminal units 1*a*, 1*b*, 1*c*, 1*d* and 1*e* shown in FIG. 13 when the transmission delay of the start signal is not negligible.

Figure 17A:
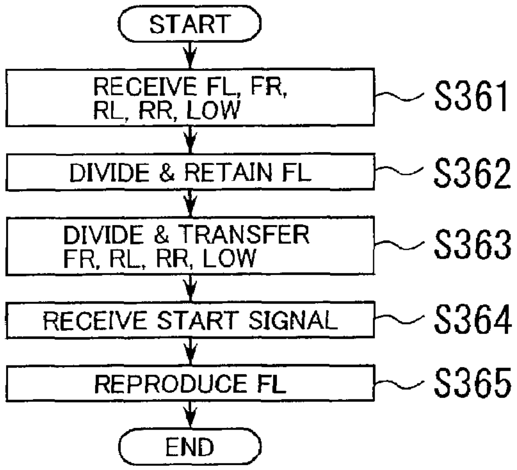

As shown in FIG. 17A, in step S361, the portable terminal unit 1*a* receives and demodulates radio waves from a public line to obtain sound data of sound FL, FR, RL, RR and LOW. The sound data of the sound FL, FR, RL, RR and LOW are supplied to the sound data reproducing portion 108.

In step S362, in the sound data reproducing portion 108, the sound data of the sound FL is divided from the received sound data of the sound FL, FR, RL, RR and LOW, and is stored.

In step S363, the sound data of the sound FR, RL, RR and LOW other than the divided sound data of the sound FL are transferred from the sound data reproducing portion 108 of the portable terminal unit 1*a* to the sound data reproducing portion 108 of the portable terminal unit 1*b*, via the signal supply terminal 112A of the portable terminal unit 1*a*, the cable 21*a* and the signal receiving terminal 112B of the portable terminal unit 1*b*.

In step S364, the portable terminal unit 1*a* receives the start signal from the portable terminal unit 1*b*.

In step S365, when the start signal is received, the sound data of the sound FL which is stored previously is decoded into an analog electric signal in the sound data reproducing portion 108, and is reproduced by the audio loudspeaker 109.

Figure 17B:
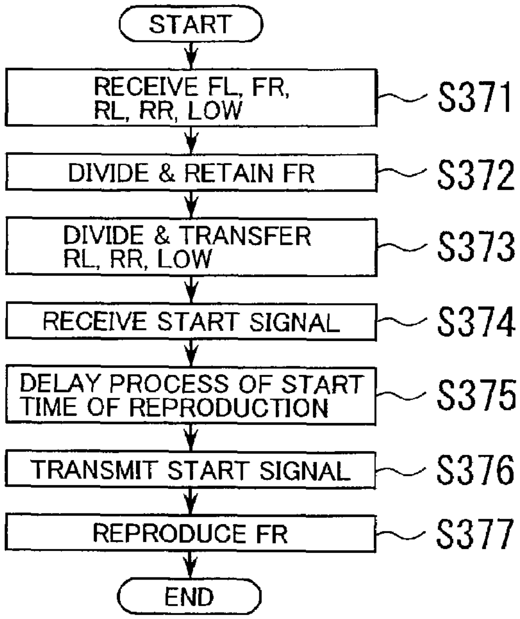

Similarly, as shown in FIG. 17B, in the portable terminal unit 1*b*, step S371 through step S374 are performed. In this case, data transfer from the portable terminal unit 1*b* to the portable terminal unit 1*c* and reception of the start signal are performed via the cable 21*b*. Also, in step S375, a delay processing of the reproduction start time of the sound FR is performed.

In step S376, the start signal is transmitted from the portable terminal unit 1*b* to the sound data reproducing portion 108 of the portable terminal unit 1*a*, via the signal supply terminal 112A of the portable terminal unit 1*b*, the cable 21*a* and the signal receiving terminal 112B of the portable terminal unit 1*a*.

In step S377, after τsb from the reception of the start signal, the sound data of the sound FR is decoded into an analog electric signal in the sound data reproducing portion 108, and is reproduced by the audio loudspeaker 109.

Figure 17C:
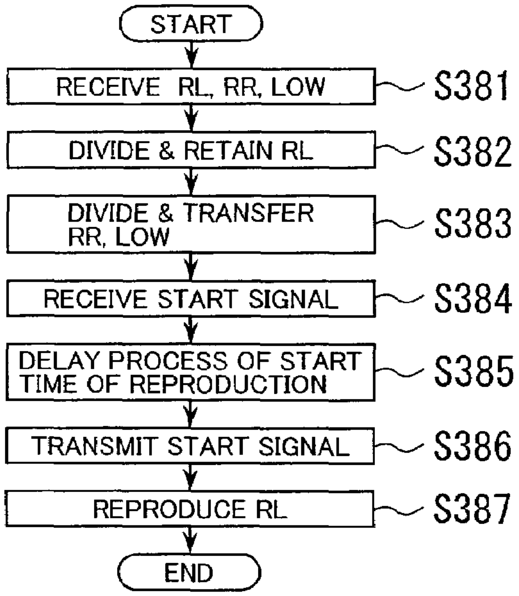

Similarly to the portable terminal unit 1*b*, in the portable terminal unit 1*c*, step S381 through step S387 are performed as shown in FIG. 17C. In this case, data transfer from the portable terminal unit 1*c* to the portable terminal unit 1*d* and reception of the start signal are performed via the cable 21*c*. Also, the delay time of the sound data of the sound RL is τsc from the reception of the start signal.

Figure 17D:
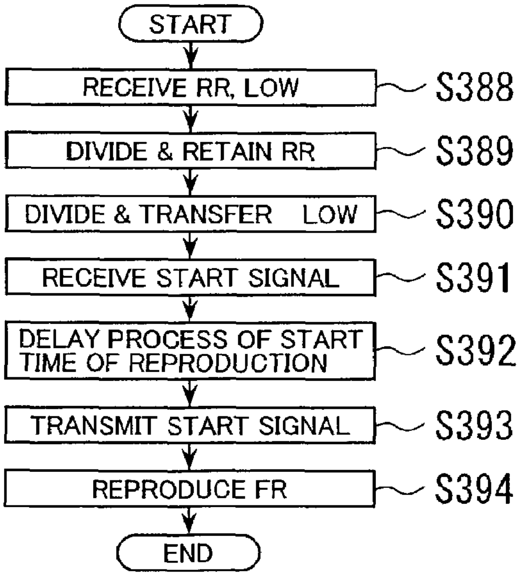

Similarly, in the portable terminal unit 1*d*, step S388 through step S394 are performed as shown in FIG. 17D. In this case, data transfer from the portable terminal unit 1*d* to the portable terminal unit 1*e* and reception of the start signal are performed via the cable 21*d*. Also, the delay time of the sound data of the sound RR is τsd from the reception of the start signal.

Figure 17E:
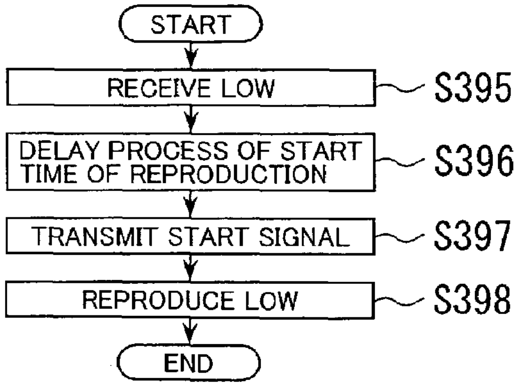

Similarly, in the portable terminal unit 1*e*, step S395 and step S398 are performed as shown in FIG. 17E. In this case, the transmission of the start signal to the portable terminal unit 1*d* is performed via the cable 21*d*. Also, the delay time of the sound data of the sound LOW is τse from the transmission of the start signal.

In this way, even if there is a substantial transmission delay of the start signal between the portable terminal units, it is possible to reproduce synchronized surround sound and to improve sound quality.

Also, in the above-mentioned operation, it is possible to interchange the steps S375 and S376 in FIG. 17B, to interchange the steps S385 and S386 in FIG. 17C, to interchange the steps S392 and S393 in FIG. 17D, and to interchange the steps S396 and S397 in FIG. 17E. That is, for example, in the portable terminal unit 1*b*, it is possible to transmit a start signal to the portable terminal unit 1*a* soon after receiving a start signal from the portable terminal unit 1*c* in step S374. Then, after waiting a predetermined delay time, sound FR is reproduced.

An explanation will now be made on a variation of reproducing operations of the sound data reproducing portions 108 of the portable terminal units 1*a*, 1*b*, 1*c*, 1*d* and 1*e* in which an influence of the transmission delay of the sound data can be removed by performing reproducing operations in synchronism with a clock signal.

FIG. 18 is a block circuit diagram showing a variation of the structure of FIG. 13. FIG. 18 illustrates a schematic structure of each of the portable terminal units 1*a*, 1*b*, 1*c*, 1*d* and 1*e* which is used when a delay time of data transfer between the portable terminal units is not negligible.

As shown in FIG. 18, each of the portable terminal units 1*a*, 1*b*, 1*c*, 1*d* and 1*e* has a clock signal portion 116 which is provided in the sound data reproducing portion 108. The clock signal portion 116 in each of the portable terminal units 1*a*, 1*b*, 1*c*, 1*d* and 1*e* provides a clock signal which is synchronized with clock signals of other portable terminal units.

Among the sound data reproduced by the portable terminal units 1*a*, 1*b*, 1*c*, 1*d* and 1*e*, the sound data to be delayed most is the sound data of the portable terminal unit 1*a*.

The transfer delay time $\tau 1a$ of the portable terminal unit 1*a* is the maximum storing time which includes the time required by the dividing process, the transfer delay time required by the transfer process and the like for every transfer of sound data.

The clock signal portion 116 generates a clock signal for synchronization which has a clock period larger than the above-mentioned maximum storing time ($\tau 1a$) as follows.

FIGS. 19A and 19B are waveform diagrams illustrating clock signals generated by the clock signal portion 116. FIG. 19A shows a clock signal which is generated in each of the portable terminal units 1*a*, 1*b*, 1*c*, 1*d* and 1*e* and which is synchronized with clock signals generated in other portable terminal units. That is, the clock signals generated in the portable terminal units 1*a*, 1*b*, 1*c*, 1*d* and 1*e* are synchronized with each other.

FIG. 19B shows a clock signal for synchronization, i.e., a synchronization clock signal, which has a period t larger than $\tau 1a$, i.e., $t > \tau 1a$, and which is generated in each of the sound data reproducing portions 108 of the portable terminal units 1*a*, 1*b*, 1*c*, 1*d* and 1*e*. The clock signals for synchronization generated in the portable terminal units 1*a*, 1*b*, 1*c*, 1*d* and 1*e* are synchronized with each other.

In the portable terminal unit 1*a*, radio waves are received and demodulated from a public line to obtain sound data of sound FL, FR, RL, RR and LOW Thereafter, when a first clock signal for synchronization is generated in the clock signal portion 116 of the sound data reproducing portion 108, the sound data to be reproduced in the portable terminal unit 1*a* is divided and other sound data are transferred to the portable terminal unit 1*b*.

Then, a transfer of sound data from the portable terminal unit 1*b* to the portable terminal unit 1*c*, a transfer of sound data from the portable terminal unit 1*c* to the portable terminal unit 1*d*, and a transfer of sound data from the portable terminal unit 1*d* to the portable terminal unit 1*e* are performed one after another.

In the portable terminal unit 1*a*, when the next clock signal for synchronization is supplied by the clock signal portion 116, the sound data is reproduced. Also, in each of the portable terminal units 1*a*, 1*b*, 1*c*, 1*d* and 1*e*, when a first clock signal for synchronization is generated after receiving the sound data, the sound data is reproduced. Thereby, respective sound data are reproduced simultaneously in the portable terminal units 1*a*, 1*b*, 1*c*, 1*d* and 1*e*.

In this way, by determining the timing of reproduction by using the clock signal for synchronization of the clock signal portion 116, it is possible to reproduce the synchronized surround sound and to improve, sound quality.

In case the sound reproducing system includes the television set 120 as shown in FIG. 12, it is possible to take the sound data of the television set 120 into consideration, and reproduction of respective components are delayed in accordance with the timing mentioned above.

FIG. 20 is an illustration showing a schematic structure of a sound reproducing system of portable terminal units according to a fifth embodiment of the present invention. FIG. 20 shows an example of a sound reproducing system in which portable terminal units are parallel coupled together.

As shown in FIG. 20, the sound reproducing system of portable terminal units according to the fifth embodiment has a structure comprising five portable terminal units 1*a*, 1*b*, 1*c*, 1*d* and 1*e* which are disposed around a listener or listeners 5 and which reproduce surround sound and low frequency sound. The sound reproducing system according to the fifth embodiment also has a television set (TV) 120 which is also disposed around the listener or listeners 5. The television set 120 reproduces high frequency sound HIGH and an image.

Only by using the portable terminal unit 1*a*, sound data of surround sound FL, FR, RL and RR, sound data of low frequency sound LOW and image data are received via the received radio wave 22*a*. From the portable terminal unit 1*a*, sound data of the surround sound FR, RL and RR, sound data of low frequency sound LOW and image data are transmitted parallel, via cables 21*a*, 21*b*, 21*c* and 21*d*, to the portable terminal units 1*b*, 1*c*, 1*d* and 1*e*.

FIG. 21 is a block circuit diagram showing a schematic structure of each of the portable terminal units 1*a*, 1*b*, 1*c*, 1*d* and 1*e* which are shown in FIG. 20, as a variation of the structure of FIG. 9.

As shown in FIG. 21, each of the portable terminal units 1*a*, 1*b*, 1*c*, 1*d* and 1*e* has the same structure as that shown in FIG. 9, except that, in the structure of FIG. 21, a signal supply terminal 112A in the structure of FIG. 9 is replaced with signal A supply terminals 112A-1, 112A-2, 112A-3 and 112A-4 which are coupled from the sound data reproducing portion 108. The structure of FIG. 21 has a signal receiving terminal 112B similarly to the structure of FIG. 9.

FIG. 22A-FIG. 22H are schematic illustrations of various data used for explaining an exemplary operation of the sound reproducing system according to the fifth embodiment of the present invention shown in FIG. 20.

It is assumed that multimedia data as shown in FIG. 22A are delivered by a data delivery service and the like. The multimedia data include, for example, sound data of sound FL (front-left), sound FR(front-right), sound RL(rear-left), sound RR(rear-right), sound L(left), sound R(right), low frequency range sound LOW, high frequency range sound HIGH, image data, and the like.

As shown in FIG. 22B, in the portable terminal unit 1*a*, sound data of sound FL, FR, RL, RR, low frequency range sound LOW and high frequency range sound HIGH, and also image data in the multimedia data shown in FIG. 22A are received, via received radio waves 22*a*.

As shown in FIG. 22C, in, for example, the sound data reproducing portion 108, the sound data of the sound FL and image data are extracted from the received data and decoded. Thereby, the sound FL is reproduced from the audio loudspeaker 109. Also, an image is displayed on a screen of the portable terminal unit 1*a* based on the image data.

As shown in FIG. 22D, in the sound data reproducing portion 108 of the portable terminal unit 1*a*, the sound data of the sound FR and the image data are extracted from the received data, and are transferred from a signal supply terminal 112A-1 of the portable terminal unit 1*a* to a signal receiving terminal 112B of the portable terminal unit 1*b* via a cable 21*a*.

Similarly, as shown in FIG. 22E, in the portable terminal unit 1*a*, sound data of sound RL and the image data from the received data are divided or extracted, and are transferred from the signal supply terminal 112A-2 of the portable terminal unit la to the signal receiving terminal 112B of the portable terminal unit 1*c*, via a cable 21*b*.

Similarly, as shown in FIG. 22F, in the portable terminal unit 1*a*, sound data of sound RR and the image data from the received data are divided or extracted, and are transferred from the signal supply terminal 112A-3 of the portable terminal unit 1*a* to the signal receiving terminal 112B of the portable terminal unit 1*d*, via a cable 21*c*.

Similarly, as shown in FIG. 22G, in the portable terminal unit 1*a*, sound data of low frequency range sound LOW and image data from the received data are divided or extracted, and are transferred from the signal supply terminal 112A-3 of the portable terminal unit 1*a* to the signal receiving terminal 112B of the portable terminal unit 1*e*, via a cable 21*d*.

As shown in FIG. 22H, in the television set 120, sound data of high frequency range sound HIGH and image data are received, and reproduced.

The sound data reproducing portion 108 of the portable terminal unit 1*b* receives, via the cable 21*a*, the sound data of the sound FR and the image data, from the portable terminal unit 1*a*. Thereby, in the portable terminal unit 1*b*, sound data of the sound FR and image data are decoded, and the sound FR is reproduced from the audio speaker 109. Also, an image is displayed on the screen of the portable terminal unit 1*b* based on the received image data.

Similarly, in the portable terminal unit 1*c*, sound RL is reproduced, and an image is displayed on the screen based on the received image data.

Similarly, in the portable terminal unit 1*d*, sound RR is reproduced, and an image is displayed on the screen based on the received image data.

Similarly, in the portable terminal unit 1*e*, low frequency range sound LQW is reproduced, and an image is displayed on the screen based on the received image data.

In this way, according to this embodiment, it is possible to connect the sound reproducing system with the data delivery service via only one line, and to couple other portable terminal units parallel to the portable terminal unit which receives data from, the data delivery service. Therefore, it becomes possible to avoid congestion of communication lines, and to reproduce the surround sound having good low and high frequency characteristics and the image while saving costs of communication. That is, it becomes possible to realize a home theater system having such various advantages.

An explanation will now be made on a schematic structure of a sound reproducing system as a first variation of the fifth embodiment shown in FIG. 20. The sound reproducing system according to the first variation of the fifth embodiment has a structure in which the portable terminal unit 1*e* is omitted from the structure of the fifth embodiment shown in FIG. 20, and therefore the number of the portable terminal units is decreased to four (4). That is, the sound reproducing system according to the first variation of the fifth embodiment comprises the portable terminal units 1*a*, 1*b*, 1*c* and 1*d* and the television set 120. The four portable terminal units 1*a*, 1*b*, 1*c* and 1*d* are disposed around a listener or listeners 5, and reproduce surround sound. The television set 120 which is also disposed around the listener or listeners 5 reproduces the low frequency range sound LOW and an image. Radio waves 22*a* are received by one of the four portable terminal units, for example, by the portable terminal unit 1*a*. The portable terminal unit 1*a* obtains sound data of the surround sound FL, FR, RL and RR and image data, from the received radio waves 22*a*, and the portable terminal unit 1*a* transmits the sound data of the sound FR, RR and RL and the image data to other portable terminal units 1*b*, 1*c* and 1*d*, via cables 21*a*, 21*b* and 21*c*, respectively.

With reference to FIGS. 22A-22H, a schematic explanation will be made on a reproducing operation of the sound reproducing system according to the first variation of the fifth embodiment.

That is, in the portable terminal units 1*a*, sound data and image data are received as shown in FIG. 22B, and predetermined sound data and image data are divided and reproduced as shown in FIG. 22C.

Also, predetermined sound data and image data as shown in FIGS. 22D-22F are divided and transferred to the portable terminal unit 1*b*, 1*c* and 1*d*, respectively.

In the television set 120, sound data of the high frequency range sound HIGH and image data are received and reproduced as shown in FIG. 22H.

In each of the portable terminal units 1*b*, 1*c* and 1*d*, the above-mentioned data are received and reproduced in a manner similar to the way mentioned above with respect to the fifth embodiment.

An explanation will now be made on a schematic structure of a sound reproducing system as a second variation of the fifth embodiment shown in FIG. 20. The sound reproducing system according to the second variation of the fifth embodiment comprises the portable terminal units 1*a*, 1*b* and 1*e* and the television set 120. The portable terminal units 1*a*, 1*b* and 1*e* are disposed around a listener or listeners 5, and reproduce surround sound. The television set 120 which is also disposed around the listener or listeners 5 reproduces the high frequency range sound HIGH and an image. Radio waves 22*a* are received by one of the portable terminal units, for example, by the portable terminal unit 1*a*. The portable terminal unit 1*a* obtains sound data of the surround sound FL, FR and low frequency range sound LOW, from the received radio waves 22*a*, and the portable terminal unit 1*a* transmits the sound data of the sound FR and low frequency range sound LOW to other portable terminal units 1*b* and 1*e*, via cables 21*a* and 21*d*, respectively. If desired, it is also possible for the portable terminal unit 1*a* to receive image data.

With reference to FIGS. 22A-22H, a schematic explanation will be made on a reproducing operation of the sound reproducing system according to the second variation of the fifth embodiment.

That is, in the portable terminal units 1*a*, sound data are received as shown in FIG. 22B, and predetermined sound data are divided and reproduced as shown in FIG. 22C.

Also, predetermined sound data as shown in FIGS. 22D and 22G are divided and transferred to the portable terminal unit 1*b* and 1*e*, respectively.

In the television set 120, sound data of the high frequency range sound HIGH and image data are received and reproduced as shown in FIG. 22H.

In each of the portable terminal units 1*b* and 1*e*, the above-mentioned data are received and reproduced in a manner similar to the way mentioned above with respect to the fifth embodiment.

An explanation will now be made on a schematic structure of a sound reproducing system as a third variation of the fifth embodiment shown in FIG. 20. The sound reproducing system according to the third variation of the fifth embodiment comprises four portable terminal units 1*a*, 1*b*, 1*c* and 1*d*. The portable terminal units 1*a*, 1*b*, 1*c* and 1*d* are disposed around a listener or listeners 5, and reproduce surround sound. Radio waves 22*a* are received by one of the portable terminal units, for example, by the portable terminal unit 1*a*. The portable terminal unit 1*a* obtains sound data of the surround sound FL, FR, RL and RR and image data, from the received radio waves 22*a*, and the portable terminal unit 1*a* transmits the sound data of the sound FR, RR and RL and image data to other portable terminal units 1*b*, 1*c* and 1*d*, via cables 21*a*, 21*b* and 21*c*, respectively.

It is also possible to omit the television set 120 in the structure of the first or second variation of the fifth embodiment.

Further, it is possible to output stereophonic sound from the television set 120 in the third variation of the fifth embodiment.

FIG. 23A is an illustration showing an example of transfer delay of data signals in the sound reproducing system shown in FIG. 20. As shown in FIG. 23A, when sound data are transferred parallel from the portable terminal unit 1*a* to the portable terminal unit 1*b*, the portable terminal unit 1*c*, the portable terminal unit 1*d* and the portable terminal unit 1*e*, there is a possibility that a substantial transfer delay time $\tau 2$ arises because of data division processing and data transfer processing.

Therefore, as shown in FIG. 23B, each of the portable terminal units 1*a*, 1*b*, 1*c*, 1*d* and 1*e* has a signal delay portion 115 which is provided in a sound data reproducing portion 108 of a control portion 103. The other structure of FIG. 23B may be the same as that of FIG. 21.

In this example, the transfer delay time $\tau 2$ is set only in the signal delay portion 115 of the portable terminal unit 1*a*, except other portable terminal units 1*b*, 1*c*, 1*d* and 1*e*.

FIGS. 24A through FIGS. 24E are flow charts showing examples of reproducing operation concerning the sound data reproducing portions 108 in the portable terminal units 1*a*, 1*b*, 1*c*, 1*d* and 1*e* shown in FIG. 20 when there is a substantial transfer signal delay between the portable terminal units.

Figure 24A:
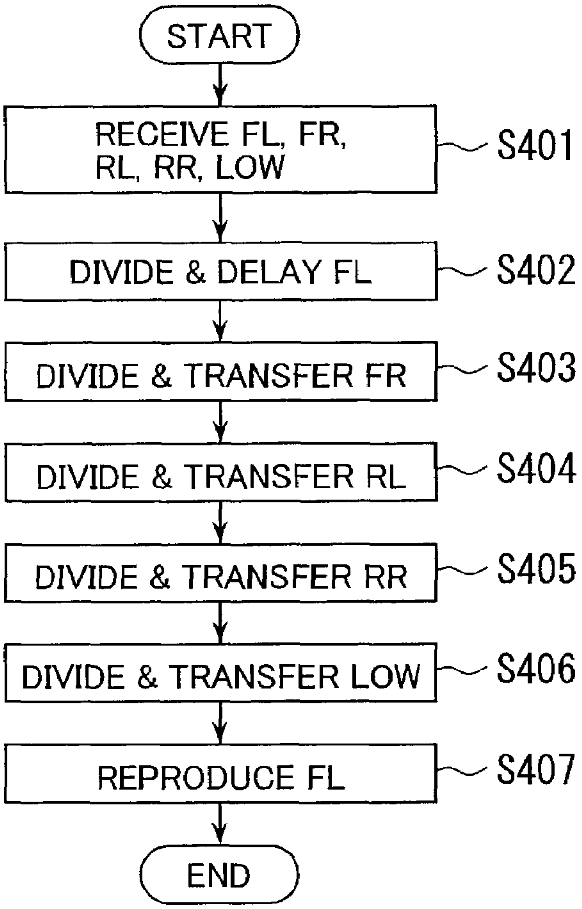

As shown in FIG. 24A, in step S401, the portable terminal unit 1*a* receives and demodulates radio waves from a public line to, obtain sound data of sound FL, FR, RL, RR and low frequency range sound LOW. The sound data of the sound FL, FR, RL, RR and low frequency range sound LOW are supplied to the sound data reproducing portion 108.

In step S402, in the sound data reproducing portion 108, the sound data of the sound FL is divided from the received sound data of the sound FL, FR, RL, RR and low frequency range sound LOW, and is delayed by the signal delay portion 115.

In step S403, the sound data of the sound FR is divided from the sound data of the remaining sound FR, RL, RR and low frequency range sound LOW, and the sound data of the sound FR is transferred from the portable terminal unit 1*a* to the portable terminal unit 1*b*.

In step S404, the sound data of the sound RL is divided from the sound data of the remaining sound RL, RR and low frequency range sound LOW, and the sound data of the sound RL is transferred from the portable terminal unit 1*a* to the portable terminal unit 1*c*.

In step S405, the sound data of the remaining sound RR and low frequency range sound LOW are transferred from the portable terminal unit 1*a* to the portable terminal unit 1*d*.

In step S406, the sound data of the remaining low frequency range sound LOW is transferred from the portable terminal unit 1*a* to the portable terminal unit 1*e*.

In step S407, the sound data of the sound FL which is delayed by the time $\tau 2$ from the reception thereof is decoded into an analog electric signal in the sound data reproducing portion 108, and is reproduced by the audio loudspeaker 109.

Figure 24B:
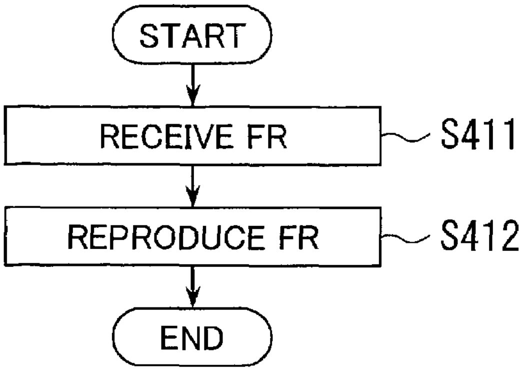

As shown by step S411 of FIG. 24B, in the portable terminal unit 1*b*, the sound data of the sound FR transferred from the portable terminal unit 1*a* to the portable terminal unit 1*b* is received in the sound data reproducing portion 108 of the portable terminal unit 1*b*.

In step S412, the received sound data of the sound FR is decoded into an analog electric signal in the sound data reproducing portion 108 of the portable terminal unit 1*b*, and is reproduced by the audio loudspeaker 109.

Figure 24C:
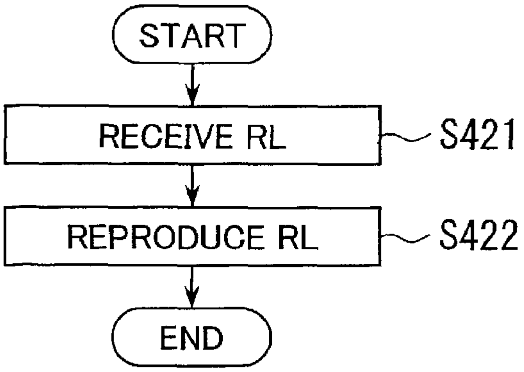

Similarly, in the portable terminal unit 1*c*, step S421 and step S422 are performed as shown in FIG. 24C. Thereby, the sound data of the sound RL is reproduced in the portable terminal unit 1*c*.

Figure 24D:
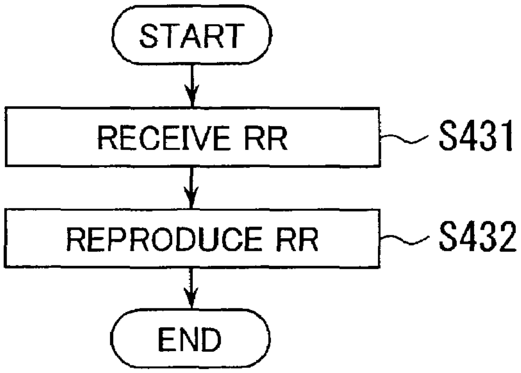

Similarly, in the portable terminal unit 1*d*, step S431 and step S432 are performed as shown in FIG. 24D. Thereby, the sound data of the sound RR is reproduced in the portable terminal unit 1*d*.

Figure 24E:
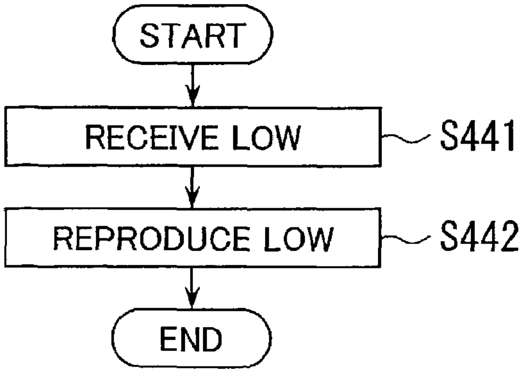

Similarly, in the portable terminal unit 1*e*, step S441 and step S442 are performed as shown in FIG. 24E. Thereby, the sound data of the low frequency range sound LOW is reproduced in the portable terminal unit 1*e*.

In this way, by using the portable terminal units which are parallel coupled together, it is possible to reproduce synchronized surround sound and to improve sound quality.

FIG. 25 is a block circuit diagram showing a schematic structure of each of the portable terminal units 1*a*, 1*b*, 1*c*, 1*d* and 1*e*, as a variation of the portable terminal unit of FIG. 9 or FIG. 21.

As shown in FIG. 25, each of the portable terminal units 1*a*, 1*b*, 1*c*, 1*d* and 1*e* has the same structure as that shown in FIG. 9 or FIG. 21, except that, in the structure of FIG. 25, a wireless module 112C is provided as a signal supply and receiving terminal which is coupled with the sound data reproducing portion 108. The wireless module 112C functions as a wireless terminal or terminals and is constituted by using a wireless system such as a transceiver mode of the PHS, the Bluetooth system or the like.

By using the wireless module 112C, it becomes possible to transfer sound data and image data between the portable terminal units by using wireless communication, in place of serial wire connections in the sound reproducing system shown in FIGS. 7, 8 and 12. The sound reproducing system may include a television set 120 or may not include such television set 120.

Also, by using the wireless module 112C, it becomes possible to transfer sound data and image data between the portable terminal units by using wireless communication, in place of parallel wire connections in the sound reproducing system shown in FIG. 20. The sound reproducing system may include a television set 120 or may not include such television set 120.

In this way, by using the wireless module 112C, it is possible to avoid disadvantages caused by cables. For example, when the cables are used to couple between the portable terminal units, there is a possibility that a person moving around the sound reproducing system is caught by the cables. However, in this variation, it is possible to avoid such disadvantage. Also, when, for example, stereophonic sound is to be reproduced outside the office or home, it is not necessary to bring the cables to the place where the stereophonic sound is reproduced.

FIG. 26 is a block circuit diagram showing a schematic structure of each of the portable terminal units 1_a_, 1_b_, 1_c_, 1_d_ and 1_e_, as a variation of the portable terminal unit of FIG. 21.

As shown in FIG. 26, each of the portable terminal units 1_a_, 1_b_, 1_c_, 1_d_ and 1_e_ has the same structure as that shown in FIG. 21, except that, in the structure of FIG. 26, there is provided a memory portion 117 which is coupled with the control portion 103, as a storage. As the memory portion 117, it is possible to use an inner storage of each of the portable terminal units 1_a_, 1_b_, 1_c_, 1_d_ and 1_e_, when the capacity of the inner storage is sufficiently large. When the capacity of the inner storage is not sufficiently large, it is possible to use an outside storage, an outside storage medium and the like. The storage medium may be a CompactFlash (registered trademark) memory card, Smartmedia (registered trademark), Memory stick, SD memory card, and the like.

In the memory portion 117, sound data obtained by downloading via a public line from a data delivery service and the like can be stored.

As the data to be stored in the memory portion 117, it is also possible to use sound data which is downloaded from a downloading station. Further, it is possible to directly buy and use music software medium in which sound data is stored.

In a manner mentioned below, the sound data reproducing portion 108 of the portable terminal unit 1_a_ reproduces the downloaded sound data. At the same time, the portable terminal unit 1_a_ transfers the downloaded sound data to the sound data reproducing portion 108 of the portable terminal unit 1_b_.

FIGS. 27A and 27B are flow charts showing examples of reproducing operation concerning the sound data reproducing portions 108 shown in FIG. 26 between the portable terminal units 1_a_ and portable terminal unit 1_b_. FIGS. 27A and 27B are flow charts showing an example in which a line connection time can be saved.

As shown in FIG. 27A, in step S441, the portable terminal unit 1_a_ is connected with a public line. The portable terminal unit 1_a_ receives and demodulates sound data of sound L and sound R from the public line. The sound data of the sound L and R are supplied to the sound data reproducing portion 108.

In step S442, the sound data reproducing portion 108 downloads the sound data of the sound L and the sound R into the memory portion 117. In the memory portion 117, the downloaded sound data is stored as it is, or the downloaded sound data is stored after being compressed. The data format for storing the downloaded sound data is, for example, data format according to MP3 system.

In step S443, the connection with the public line is once disconnected after storing the sound data into the memory portion 117.

In step S444, the sound data reproducing portion 108 retrieves the sound data of the sound L and the sound R from the memory portion 117.

In step S445, the sound data of the sound L is divided and reproduced.

In step S446, the sound data of the remaining sound R is transferred from the sound data reproducing portion 108 of the portable terminal unit 1_a_, via the signal supply terminal 112A, the cable 21_a_ and the signal receiving terminal 112B, to the sound data reproducing portion 108 of the portable terminal unit 1_b_.

As shown by step S451 of FIG. 27B, in the portable terminal unit 1_b_, the sound data of the sound R transferred from the portable terminal unit 1_a_ to the portable terminal unit 1_b_ is received in the sound data reproducing portion 108 of the portable terminal unit 1_b_.

In step S452, the received sound data of the sound R is decoded into an analog electric signal in the sound data reproducing portion 108 of the portable terminal unit 1_b_, and is reproduced by the audio loudspeaker 109.

In this case, it is possible to repeatedly reproduce the sound data which is downloaded once.

In this way, it is possible to listen to the sound any time when desired, without worrying about the line connection time. It is also possible to repeatedly listen to the sound again and again.

It is also possible to reproduce the sound while downloading the sound data.

Further, by using a desired number of storage media each having a required capacity, it is possible to realize one's own data library, and to avoid repetitive down load of the same data.

In this way, it is possible to save the line connection time for the same sound data.

FIG. 28 is a block circuit diagram showing a schematic structure of each of the portable terminal units 1_a_, 1_b_, 1_c_, 1_d_ and 1_e_, as a variation of the portable terminal unit of FIG. 26.

As shown in FIG. 28, each of the portable terminal units 1_a_, 1_b_, 1_c_, 1_d_ and 1_e_ has the same structure as that shown in FIG. 26, except that, in the structure of FIG. 28, a wireless module 111C is provided as a signal supply and receiving terminal which is coupled with the sound data reproducing portion 108. By using the wireless module 111C, it becomes possible to transfer sound data stored in the memory portion 117 to other portable terminal units by using wireless communication.

In this way, by using the wireless module 111C, it is possible to save the line connection time for the same sound data, and to avoid disadvantages caused by cables.

FIG. 29 is an illustration showing a schematic structure of a sound reproducing system of portable terminal units according to a sixth embodiment of the present invention. FIG. 29 shows an example of a sound reproducing system in which sound data is obtained from an information equipment.

As shown in FIG. 29, the sound reproducing system of portable terminal units according to the sixth embodiment has a structure comprising two portable terminal units 1_a_ and 1_b_.

The two portable terminal unit 1_a_ and 1_b_ are disposed approximately adjacent to each other, and reproduce stereophonic sound.

That is, among the two portable terminal unit 1_a_ and 1_b_ disposed at locations mutually apart from each other by a predetermined distance, sound L and a video image are reproduced from the portable terminal unit 1_a_, and sound R and a video image are reproduced from the portable terminal unit 1_b_.

As shown in FIG. 29, a stereophonic separation device such as a stereophonic separation connector or a stereophonic connector 31 is connected to a stereophonic output terminal of, for example, a headphone stereophonic equipment, an audio-video (AV) equipment, an information equipment such as a personal computer and the like. A cable 21*a* and a cable 21*b* are connected to the stereophonic connector 31, and other ends of the cable 21*a* and the cable 21*b* are connected to the portable terminal unit 1*a* and 1*b*, respectively. The stereophonic connector 31 separates data from the stereophonic output terminal of the AV equipment and the like into sound data of sound L and sound R which are transferred to the portable terminal unit 1*a* and 1*b*, respectively. The stereophonic connector 31 can also separate video data into the portable terminal units 1*a* and 1*b*.

By using this structure, it becomes possible to reproduce sound data at any location at home, and it is possible to realize a variety of sound sources. Also, it is not necessary to worry about congestion of communication lines, costs of use of communication lines and the like.

FIG. 30 is a block circuit diagram showing a schematic structure of each of the portable terminal units 1*a* and 1*b* shown in FIG. 29. Each of the portable terminal units 1*a* and 1*b* shown in FIG. 30 has the same structure as that shown in FIG. 28, except that, in the structure of FIG. 30, a signal receiving terminal 112B of each of the portable terminal units 1*a* and 1*b* is coupled with the cable 21*a* and 21*b*, respectively. Thereby, the portable terminal units 1*a* and 1*b* can receive sound data, image data and the like from the information equipment.

The information equipment comprises, for example, a headphone stereophonic equipment, an AV equipment, a personal computer and the like, and has multimedia data previously stored or incorporated therein. Therefore, it is possible to obtain sound data and image data at the signal receiving terminals 112B, via the cables 21*a* and 21*b* and the stereophonic connector 31, from, the output terminal of the information equipment.

Also, for example, it is possible to obtain, via the information equipment mentioned above, multimedia data including sound data from the internet via a telephone line, and multimedia data including sound data such as movie and music playing via a line such as a cable television (CATV) line and the like.

With reference again to FIG. 3A-FIG. 3C, an explanation will be made on a schematic reproducing operation of the sound reproducing system according to the sixth embodiment of the present invention shown in FIG. 29.

It is assumed that multimedia data as shown in FIG. 3A are delivered from a data delivery service and the like. The multimedia data includes, for example, sound data of sound FL (front-left), sound FR(front-right), sound RL(rear-left), sound RR(rear-right), sound L(left), sound R(right), low frequency range sound LOW, high frequency range sound HIGH, image data, and the like.

As shown in FIG. 3B, in the portable terminal unit 1*a*, the sound data reproducing portion 108 receives sound data of sound FL among the multimedia data shown in FIG. 3A is received, via the cable 21*a*. The sound data of the sound FL is decoded in the sound data reproducing portion 108, and thereby sound L, is reproduced from the audio loudspeaker 109. Also, image data of the multimedia data shown in FIG. 3A is received, and is displayed on a screen.

Similarly, as shown in FIG. 3C, in the portable terminal unit 1*b*, sound data of sound FR among the multimedia data shown in FIG. 3A is received, via the cable 21*b*. The sound data of the sound FR is decoded in the sound data reproducing portion 108, and sound R is reproduced from the audio speaker 109. Also, image data of the multimedia data shown in FIG. 3A is received, and is displayed on a screen.

FIG. 31 is an illustration showing a schematic structure of a sound reproducing system of portable terminal units according to a first variation of a sixth embodiment of the present invention. As shown in FIG. 31, the sound reproducing system of portable terminal units according to the first variation of the sixth embodiment has a structure comprising three portable terminal units 1*a*, 1*b* and 1*c*. The three portable terminal units 1*a*, 1*b* and 1*c* are disposed approximately around a listener or listeners 5, and reproduce stereophonic sound having good low frequency characteristics and an image.

That is, among the three portable terminal units 1*a*, 1*b* and 1*c* disposed at locations mutually apart from each other by predetermined distances, sound L and an image are reproduced from the portable terminal unit 1*a*, sound R and an image are reproduced from the portable terminal unit 1*b*, and sound LOW is reproduced from the portable terminal unit 1*c*.

When compared with the sound reproducing system of FIG. 29, the sound reproducing system shown in FIG. 31 comprises a stereophonic radio separation coupler or a stereophonic radio coupler 32 in place of the stereophonic connector 31. The stereophonic radio coupler 32 transmits sound data of sound FL and image data to the portable terminal unit 1*a* via a radio signal 23*a*, transmits sound data of sound FR and image data to the portable terminal unit 1*b* via a radio signal 23*b*, and transmits sound data of sound LOW to the portable terminal unit 1*c* via a radio signal 23*c*. When the stereophonic radio coupler 32 does not have function of separating the low frequency range sound LOW, it is also possible for the portable terminal unit 1*c* to receive the sound data of both the sound L and R and to extract and reproduce the low frequency range sound LOW, for example, by using a low pass filter and the like.

The stereophonic radio coupler 32 comprises a radio module, such as a transceiver mode of the PHS, Bluetooth system and the like, which uses a radio system that can perform communication with a specified target. The stereophonic radio coupler 32 is connected to a stereophonic output terminal of an information equipment, such as a headphone stereophonic equipment, an audio-video (AV) equipment, a personal computer and the like.

FIG. 32 is a block circuit diagram showing a variation of FIG. 30 and showing a schematic structure of each of the portable terminal units 1*a*, 1*b* and 1*c* shown in FIG. 31. Each of the portable terminal units 1*a*, 1*b* and 1*c* shown in FIG. 32 has a wireless module 112C coupled with the sound data reproducing portion 108. The wireless module 112C comprises a radio module, such as a transceiver mode of the PHS, Bluetooth system and the like, which uses a radio system that can perform communication with a specified target. The wireless module 112C performs radio communication with the stereophonic radio coupler 32 and receives sound data.

In this structure, by using the wireless module 112C, it is possible to avoid disadvantages caused by cables. For example, when the cables are used to couple between the portable terminal units, there is a possibility that a person moving around the sound reproducing system is caught by the cables. However, in this structure, it is possible to avoid such disadvantage. Also, when, for example, stereophonic sound is to be reproduced outside the office or home, it is not necessary to bring the cables to the place where the stereophonic sound is reproduced.

With reference to FIG. 31 again, an explanation will now be made on a schematic structure of a sound reproducing system according to a second variation of the sixth embodiment. The sound reproducing system of portable terminal units according to the second variation of the sixth embodiment has a structure comprising two portable terminal units 1$a$ and 1$b$, among three portable terminal units shown in FIG. 31.

The two portable terminal units 1$a$ and 1$b$ are disposed adjacently in the proximity of a listener or listeners 5, and reproduce stereophonic sound and an image.

That is, among the two portable terminal units 1$a$ and 1$b$ disposed at locations mutually apart from each other by a predetermined distance, sound L and an image are reproduced from the portable terminal unit 1$a$ and sound R and an image are reproduced from the portable terminal unit 1$b$.

In this variation, a stereophonic radio coupler 32 transmits sound data of sound L and image data to the portable terminal unit 1$a$ via a radio signal 23$a$, and transmits sound data of sound R and image data to the portable terminal unit 1$b$ via a radio signal 23$b$.

FIG. 33 is an illustration showing a schematic structure of a sound reproducing system of portable terminal units according to a third variation of a sixth embodiment of the present invention. As shown in FIG. 33, the sound reproducing system of portable terminal units according to the third variation of the sixth embodiment has a structure comprising three portable terminal units 1$a$, 1$b$ and 1$c$ and a personal computer 130.

The three portable terminal units 1$a$, 1$b$ and 1$c$ and the personal computer 130 are disposed approximately around a listener or listeners 5, and reproduce surround sound.

That is, among the three portable terminal units 1$a$, 1$b$ and 1$c$ disposed at locations mutually apart from each other by predetermined distances, sound RL is reproduced from the portable terminal unit 1$a$, and sound RR is reproduced from the portable terminal unit 1$b$.

From loudspeakers 131$a$ and 131$b$ of the personal computer 130, sound FL and sound FR are respectively reproduced.

As shown in FIG. 33, a stereophonic radio coupler 32 is connected to a stereophonic output terminal of the personal computer 130, and transmits sound data of sound RL to the portable terminal unit 1$a$ via a radio signal 23$a$, transmits sound data of sound RR to the portable terminal unit 1$b$ via a radio signal 23$b$, and transmits sound data of low frequency range sound LOW to the portable terminal unit 1$c$ via a radio signal 23$c$.

With reference to FIG. 33 again, an explanation will be made on a sound reproducing system of portable terminal units according to a fourth variation of a sixth embodiment of the present invention. As shown in FIG. 33, the sound reproducing system of portable terminal units according to the fourth variation of the sixth embodiment has a structure comprising two portable terminal units 1$a$ and 1$b$ and a personal computer 130.

The two portable terminal units 1$a$ and 1$b$ and the personal computer 130 are disposed approximately around a listener or listeners 5, and reproduce surround sound.

That is, among the two portable terminal units 1$a$ and 1$b$ disposed at locations mutually apart from each other by a predetermined distance, sound RL is reproduced from the portable terminal unit 1$a$, and sound RR is reproduced from the portable terminal unit 1$b$.

From loudspeakers 131$a$ and 131$b$ of the personal computer 130, sound FL and sound FR are respectively reproduced.

Also, a stereophonic radio coupler 32 is connected to a stereophonic output terminal of the personal computer,130, and transmits sound data of sound RL to the portable terminal unit 1$a$ via a radio signal 23$a$ and transmits sound data of sound RR to the portable terminal unit 1$b$ via a radio signal 23$b$.

In the above-mentioned third variation and fourth variation of the sixth embodiment, it is also possible to replace the personal computer 130 with a notebook type personal computer.

FIG. 34A illustrates an example of a structure in which input data supplied to the loudspeakers 131$a$ and 131$b$ of the personal computer 130 shown in FIG. 33 are delayed.

As shown in FIG. 34A, delay elements 132$a$ and 132$b$ are disposed at input sides of the loudspeakers 131$a$ and 131$b$ of the personal computer 130 which reproduce sound FL and sound FR.

As shown in FIG. 34B, when signal transfer delays from the personal computer 130 to the portable terminal units 1$a$ and 1$b$ are not negligible, delay times τp1 and τp2 are set to the delay elements 132$a$ and 132$b$, respectively, to compensate for the signal transfer delays.

When a time delay τ occurs during the signal transfer from the personal computer 130 to each of the portable terminal unit 1$a$ and the portable terminal unit 1$b$, reproduction of sound by the loudspeakers 131$a$ and 131$b$ of the personal computer 130 is delayed by τp1 and τp2, by using these delay elements 132$a$ and 132$b$, respectively.

In this way, it is possible to avoid deterioration of sound quality caused by the signal transfer delay when the portable terminal units are coupled with an information equipment such as a personal computer and the like.

FIG. 35 is a flow chart for explaining a process of selection control of acquired data in a portable terminal unit.

As shown in FIG. 35, in step S441, a control portion 103 of the portable terminal unit determines whether there is a selection requirement of acquired data or not. If there is no selection requirement, the flow exits and process ends.

In step S442, if there is a selection requirement, it is determined whether there is a request for data acquisition via received radio waves or not. If not required, process goes to step S444.

In step S443, if there is a request for data acquisition via received radio waves, sound data/image data are received and reproduced, and process ends.

In step S444, it is determined whether there is a request for data acquisition from an information equipment or not. If there is a request, process goes to step S443, and if there is no request, process goes to step S445.

In step S445, it is determined whether there is a request for data acquisition from a memory portion 117 or not. If there is a request, process goes to step S443, and if there is no request, the flow exits and process ends.

In this way, it becomes possible to easily access multimedia data including various sound data.

In the above, an explanation was made in case multimedia data including sound data is acquired. However, the present invention can be applied to multimedia data which does not include sound data. For example, it is possible for a plurality of portable terminal units to download the same game data to play game between the plurality of portable terminal units, by using the game data.

Also, in the third embodiment of FIG. 7, in the fourth embodiment of FIG. 12, in the fifth embodiment of FIG. 20, in the sixth embodiment of FIG. 29 and the like, it is possible to supply operating power of a portable terminal unit from the equipment and the like from which the portable terminal unit acquires data, when the portable terminal unit acquires the data from the equipment and the like. This method simplifies, the structure of the sound reproducing system and avoids a power shortage of the portable terminal units and the like.

As mentioned above, according to the present invention, sound data is reproduced by using audio loudspeakers of portable terminal units and the like. Also, the sound data is reproduced by the audio loudspeakers in cooperation with an audio equipment and the like, and an image is displayed by the portable terminal units and the like. Therefore, it is possible to reproduce stereophonic sound, low frequency range sound, high frequency range sound and surround sound at any place even outside the home or office. Further, according to the present invention, it becomes possible to easily realize a home theater system which gives a listener or listeners the feeling of being at a live performance.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as falling within the scope of the appended claims.

What is claimed is:

1. A portable terminal unit for acquiring data including sound data, the portable terminal unit comprising:

a sound data reproducing portion adapted for receiving the sound data and decoding the sound data into an analog sound signal, the sound data being in a digital format; and at least one loudspeaker coupled to the sound data reproduction portion, the loudspeaker being disposed for receiving the analog sound signal and reproducing an audible sound corresponding to the sound data and in cooperation with at least one sound device, one of said at least one sound device being the source of said sound data, to give listeners the feeling of being at a live performance by having the portable terminal reproduce the audible sound synchronously with said at least one sound device when said sound data is reproduced, with said sound data shared by the portable terminal and said at lease one sound device;

the portable terminal unit being selected from the group consisting of: portable telephone, personal handy phone system (PHS), cordless telephone, child unit of a party line, and personal digital assistant (PDA), wherein the portable terminal unit is disposed at mutually separate locations and the decoded audible sound is a front-left sound FL, a front-right sound FR, a rear-left sound RL, a rear-right sound RR, and a low sound LOW of a low frequency range.

2. The portable terminal unit as set forth in claim 1, wherein the sound data is included in multimedia data.

3. The portable terminal unit as set forth in claim 1, wherein at least one of the sound devices is another portable terminal unit.

4. The portable terminal unit as set forth in claim 1, further comprising a display for displaying an image based on acquired image data.

5. The portable terminal unit as set forth in claim 1, wherein at least one of the sound devices has a display for displaying an image.

6. A sound reproducing system comprising:

at least one portable terminal unit, selected from the group consisting of portable telephone, personal handy phone system (PUS), cordless telephone, child unit of a party line, and personal digital assistant (PDA), the portable terminal unit being adapted for acquiring data including sound data, each of the at least one portable terminal unit comprising:

a sound data reproducing portion adapted for receiving the sound data and decoding the sound data into an analog sound signal, the sound data being in a digital format; and at least one loudspeaker coupled to the sound data reproduction portion, the loudspeaker being disposed for receiving the analog sound signal and reproducing an audible sound corresponding to the sound data and in cooperation with at least one sound device, one of said at least one sound device being the source of said sound data, to give listeners the feeling of being at a live performance by having the portable terminal reproduce the audible sound synchronously with said at least one sound device when said sound data is reproduced, with said sound data shared by the portable terminal and said at lease one sound device, wherein each at least one portable terminal unit is disposed at mutually separate locations and the reproduced audible sound is a front-left sound FL, a front-right sound FR, a rear-left sound RL, a rear-right sound RR, and a low sound LOW of a low frequency range.

7. A sound reproducing system as set forth in claim 6, wherein the sound data is included in multimedia data.

8. A sound reproducing system as set forth in claim 6, wherein at least one of the sound devices is another portable terminal unit.

9. A sound reproducing system as set forth in claim 6, the portable terminal unit further comprising a display for displaying an image based on acquired image data.

10. A sound reproducing system as set forth in claim 6, wherein at least one of the sound devices has a display for displaying an image.

11. A sound reproducing system as set forth in claim 6, wherein the sound reproducing system has at least two displays disposed in the portable terminal units and/or the sound devices, and the at least two displays display mutually different images.

12. A sound reproducing system as set forth in claim 6, the portable terminal unit further comprising means for dividing and/or distributing the acquired data.

13. A sound reproducing system as set forth in claim 6, wherein the portable terminal unit has a storage for storing the acquired data.

14. A sound reproducing system as set forth in claim 6, the portable terminal unit further comprising a transfer means for transferring the data stored in the storage to at least one of the sound devices.

15. A sound reproducing system as set forth in claim 14, wherein storing of the data into the storage and transferring the data to at least one of other sound devices are performed simultaneously.

16. A sound reproducing system as set forth in claim 6, wherein the portable terminal unit reproduces at least a part of the acquired data while transferring other portion of the acquired data to at least one of other sound devices.

17. A sound reproducing system as set forth in claim 6, wherein the sound device reproduces the data while receiving the data from the portable terminal unit.

18. A sound reproducing system as set forth in claim 6, wherein the reproducing operation of the portable terminal unit and the reproducing operation of the sound device are performed in cooperation with each other.

19. A sound reproducing system as set forth in claim 6, wherein at least two portable terminal units acquire mutually different data respectively, each of the portable terminal units transfers data separately to corresponding one of at least two sound devices, the data acquired in the portable terminal units and the data acquired in the sound devices are reproduced in cooperation with each other.

20. A sound reproducing system as set forth in claim 6, wherein the data are transmitted to and/or received by the portable terminal unit via wireless or wired communication.

21. A sound reproducing system as set forth in claim 6, wherein the data is transmitted from a data delivery service.

22. A sound reproducing system as set forth in claim 6, wherein the data is provided to the portable terminal unit via a storage or a storage medium.

23. A sound reproducing system as set forth in claim 6, wherein the portable terminal unit reproduces the data taking the delay time caused by the transmission of the data from the portable terminal unit to the sound device into consideration.

24. A sound reproducing system as set forth in claim 6, wherein at least two, of the portable terminal units are coupled with different output sides of a data separating connector via cables or wireless coupling.

25. A sound reproducing system as set forth in claim 24, wherein the data separating connector receives data from an information equipment or sound device, and separates and transfers the received data to the portable terminal units.

26. A sound reproducing system as set forth in claim 6, wherein the portable terminal unit and/or sound devices receive an operating electric power from an equipment from which the portable terminal unit and/or sound device acquire the data.

27. A sound reproducing system comprising:

a plurality of portable terminal unit, selected from the group consisting of: portable telephone, personal handy phone system (PUS), cordless telephone, child unit of a party line, and personal digital assistant (PDA), the portable terminal unit being adapted for acquiring data including sound data, each one of the plurality of portable terminal unit comprising:

a sound data reproducing portion adapted for receiving the sound data and decoding the sound data into an analog sound signal, the sound data being in a digital format; and at least one loudspeaker coupled to the sound data reproduction portion, the loudspeaker being disposed for receiving the analog sound signal and reproducing an audible sound corresponding to the sound data and in cooperation with at least another one of said plurality of portable terminal units, to give listeners the feeling of being at a live performance by having the portable terminals synchronously reproduce the audible sound when said sound data is reproduced, with said sound data shared by respective terminals or divided and utilized by respective terminals, wherein each portable terminal unit is disposed at mutually separate locations and the reproduced audible sound is a front-left sound FL, a front-right sound FR, a rear-left sound RL, a rear-flight sound RR, and a low sound LOW of a low frequency range.

28. A sound reproducing system comprising:

a plurality of portable terminal unit, selected from the group consisting of: portable telephone, personal handy phone system (PHS), cordless telephone, child unit of a party line, and personal digital assistant (PDA), the portable terminal unit being adapted for acquiring data including sound data of low frequency range and sound data of high frequency range, at least one of the plurality of portable terminal unit comprising:

a sound data reproducing portion adapted for receiving the sound data of low frequency range and decoding the sound data of low frequency range into an analog sound signal, the sound data of low frequency range being in a digital format; and at least one loudspeaker coupled to the sound data reproduction portion, the loudspeaker being disposed for receiving the analog sound signal and reproducing an audible sound corresponding to the sound data of low frequency range and in cooperation with at least another one of said plurality of portable terminal units, to give listeners the feeling of being at a live performance by having the portable terminals synchronously reproduce the audible sound when said sound data of low frequency range is reproduced, with said sound data of low frequency range shared by respective terminals or divided and utilized by respective terminals; and at lease one of the plurality of portable terminal unit comprising:

a sound data reproducing portion adapted for receiving the sound data of high frequency range and decoding the sound data of high frequency range into an analog sound signal, the sound data of high frequency range being in a digital format; and at least one loudspeaker coupled to the sound data reproduction portion, the loudspeaker being disposed for receiving the analog sound signal and reproducing an audible sound corresponding to the sound data of high frequency range and in cooperation with at least another one of said plurality of portable terminal units, to give listeners the feeling of being at a live performance by having the portable terminals synchronously reproduce the audible sound when said sound data of high frequency range is reproduced, with said sound data of high frequency range shared by respective terminals or divided and utilized by respective terminals, wherein each portable terminal unit is disposed at mutually separate locations and the reproduced audible sound is a front-left sound FL, a front-right sound FR, a rear-left sound RL, a rear-fight sound RR, and a low sound LOW of a low frequency range.

* * * * *